INVENTOR.
IMRE MOLNAR
BY Wm. Walter Owen
ATTY.

Oct. 21, 1958 I. MOLNAR 2,857,467

ALTERNATIVE TRUNKING IN TELEPHONE SYSTEMS
CONTROLLED BY OVERFLOW TRUNKS
AND COMMON DIRECTORS

Filed May 3, 1954 17 Sheets-Sheet 2

INVENTOR.
IMRE MOLNAR
BY Wm. Walter Owen
ATTY.

Oct. 21, 1958 I. MOLNAR 2,857,467

ALTERNATIVE TRUNKING IN TELEPHONE SYSTEMS CONTROLLED BY OVERFLOW TRUNKS AND COMMON DIRECTORS

Filed May 3, 1954 17 Sheets-Sheet 3

INVENTOR.
IMRE MOLNAR
BY Mc Walter Owen
ATTY.

Oct. 21, 1958 I. MOLNAR 2,857,467
ALTERNATIVE TRUNKING IN TELEPHONE SYSTEMS
CONTROLLED BY OVERFLOW TRUNKS
AND COMMON DIRECTORS
Filed May 3, 1954 17 Sheets-Sheet 4

INVENTOR.
IMRE MOLNAR
BY Wm. Watts Crowe
ATTY.

Oct. 21, 1958

I. MOLNAR 2,857,467

ALTERNATIVE TRUNKING IN TELEPHONE SYSTEMS CONTROLLED BY OVERFLOW TRUNKS AND COMMON DIRECTORS

Filed May 3, 1954

17 Sheets-Sheet 5

INVENTOR.
IMRE MOLNAR

BY Wm. Watts Owen

ATTY.

INVENTOR.
IMRE MOLNAR
BY Wm. Walter Owen
ATTY.

Oct. 21, 1958 I. MOLNAR 2,857,467

ALTERNATIVE TRUNKING IN TELEPHONE SYSTEMS CONTROLLED BY OVERFLOW TRUNKS AND COMMON DIRECTORS

Filed May 3, 1954 17 Sheets-Sheet 7

INVENTOR.
IMRE MOLNAR

BY Wm. Walter Owen

ATTY.

Oct. 21, 1958

I. MOLNAR 2,857,467

ALTERNATIVE TRUNKING IN TELEPHONE SYSTEMS CONTROLLED BY OVERFLOW TRUNKS AND COMMON DIRECTORS

Filed May 3, 1954

17 Sheets-Sheet 8

INVENTOR.
IMRE MOLNAR
BY [signature]
ATTY.

INVENTOR.
IMRE MOLNAR
BY Wm. Walter Owen.
ATTY.

Oct. 21, 1958 I. MOLNAR 2,857,467

ALTERNATIVE TRUNKING IN TELEPHONE SYSTEMS CONTROLLED BY OVERFLOW TRUNKS AND COMMON DIRECTORS

Filed May 3, 1954 17 Sheets-Sheet 10

INVENTOR.
IMRE MOLNAR

BY [signature]

ATTY.

INVENTOR.
IMRE MOLNAR
BY Wm. Walter Owen
ATTY.

Oct. 21, 1958 I. MOLNAR 2,857,467

ALTERNATIVE TRUNKING IN TELEPHONE SYSTEMS CONTROLLED BY OVERFLOW TRUNKS AND COMMON DIRECTORS

Filed May 3, 1954 17 Sheets-Sheet 12

INVENTOR.
IMRE MOLNAR

BY Wm. Watts Owen

ATTY.

INVENTOR.
IMRE MOLNAR
BY [signature]
ATTY.

Oct. 21, 1958 I. MOLNAR 2,857,467

ALTERNATIVE TRUNKING IN TELEPHONE SYSTEMS CONTROLLED BY OVERFLOW TRUNKS AND COMMON DIRECTORS

Filed May 3, 1954 17 Sheets-Sheet 14

CODE CHART

| DIGIT | CODE | RELAYS | CYCLES | CONTACTS | | | |
|---|---|---|---|---|---|---|---|
| 1 | WX | WF, XF | 700, 900 | 1441 | 1412 | 1413 | 1445 |
| 2 | WY | WF, YF | 700, 1100 | 1441 | 1422 | 1423 | 1443 |
| 3 | WZ | WF, ZF | 900, 1100 | 1444 | 1453 | 1442 | 1451 |
| 4 | XY | XF, YF | 700, 1300 | 1411 | 1421 | 1414 | 1424 |
| 5 | XZ | XF, ZF | 900, 1300 | 1413 | 1454 | 1455 | 1415 |
| 6 | YZ | YF, ZF | 1100, 1300 | 1423 | 1452 | 1455 | 1425 |
| 7 | W | WF, LF | 700, 1500 | 1441 | 1431 | 1435 | 1446 |
| 8 | X | XF, LF | 900, 1500 | 1413 | 1433 | 1435 | 1416 |
| 9 | Y | YF, LF | 1100, 1500 | 1423 | 1432 | 1435 | 1426 |
| 0 | Z | ZF, LF | 1300, 1500 | 1455 | 1434 | 1435 | 1456 |
| "KP" | | MC | 1100, 1700 | | 1022 | 1021 | |
| "ST" | | MB | 1500, 1700 | | 1031 | 1032 | |

INVENTOR.
IMRE MOLNAR
BY [signature]
ATTY.

Oct. 21, 1958

I. MOLNAR 2,857,467

ALTERNATIVE TRUNKING IN TELEPHONE SYSTEMS
CONTROLLED BY OVERFLOW TRUNKS
AND COMMON DIRECTORS

Filed May 3, 1954

17 Sheets-Sheet 15

INVENTOR.
IMRE MOLNAR

BY Wm. Walter Owen

ATTY.

Oct. 21, 1958

I. MOLNAR 2,857,467

ALTERNATIVE TRUNKING IN TELEPHONE SYSTEMS
CONTROLLED BY OVERFLOW TRUNKS
AND COMMON DIRECTORS

Filed May 3, 1954

17 Sheets-Sheet 16

INVENTOR.
IMRE MOLNAR
BY [signature]
ATTY.

INVENTOR.
IMRE MOLNAR
BY *[signature]*
ATTY.

United States Patent Office 2,857,467

Patented Oct. 21, 1958

2,857,467

ALTERNATIVE TRUNKING IN TELEPHONE SYSTEMS CONTROLLED BY OVERFLOW TRUNKS AND COMMON DIRECTORS

Imre Molnar, Chicago, Ill., assignor to General Telephone Laboratories, Incorporated, a corporation of Delaware Application May 3, 1954, Serial No. 427,061

65 Claims. (Cl. 179—18)

This invention relates in general to automatic telephone systems and more particularly to alternate trunking between a network of telephone exchanges at a time when all the direct trunks between a calling exchange and a called exchange are busy.

The main object of the present invention is the provision of a simplified director, or register sender, and overflow trunks which are only taken into use when all the trunks in a called direct route are busy in order to extend the call over alternate routes to the called exchange.

Another object of the invention is to provide overflow trunks individual to each direct trunk route between a first exchange and a plurality of other exchanges and in which each of the overflow trunks has route determining means controlled by the all trunk busy conditions of said direct trunk routes for determining which of the direct trunk routes will be used as an alternate route.

A further object of the invention is to provide each overflow trunk with code marking means controlled by the route determining means for code marking the routing digits required to extend the call over the alternate routes.

A still further object is the provision of a simplified director, or register sender, which is common to all the overflow trunks and which is controlled by the overflow trunks to transmit the routing digits code marked in the overflow trunk prior to the transmission of the dialled registered digits stored therein after it is seized by the overflow trunk.

Another object is the provision of means whereby the register sender is capable of transmitting decimal digits alone, or decimal digits followed by multi-frequency digits under control of the overflow trunks dependent upon the alternate route being used.

A feature of the invention relates to the means for delaying the transmission of the multi-frequency digits until all, or all but one, of the dialled registered digits are stored in the registers of the register sender.

A further feature relates to the means whereby the first dialled registered digit, or a combination of the first two digits dialled and registered in the register sender, informs the register sender of the total number of digits which are to be transmitted by the sender so that the above-mentioned delay means will preset the register sender in accordance therewith.

Other objects and features of the invention will be better understood after reference to the following description and the appended claims.

The accompanying drawings when arranged in the order shown in Fig. 18 illustrate in sufficient detail a preferred form of carrying out the invention.

Figs. 4 to 8, inclusive, show the detail circuits of one of the overflow trunks.

Figs. 9 to 17, inclusive, show the detail circuits of one of the directors, or register senders.

Figure 1:
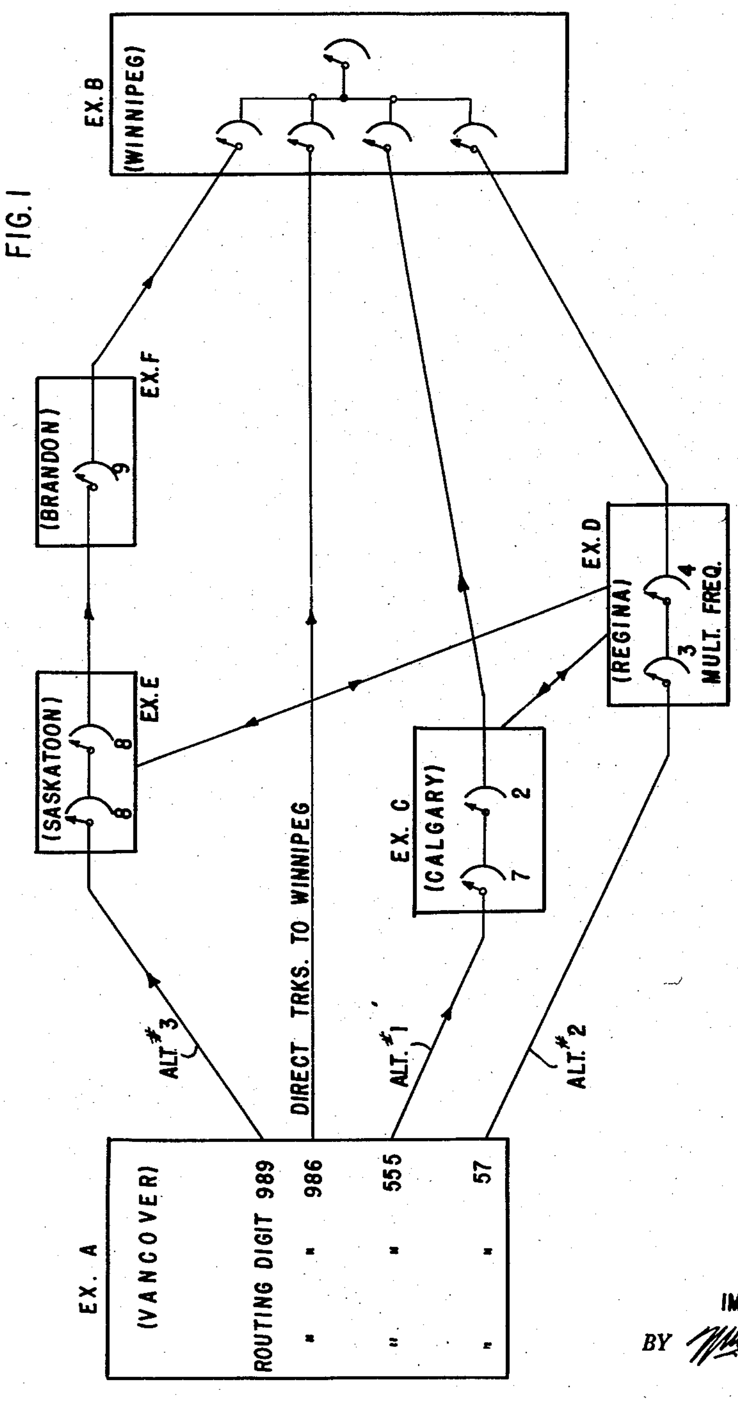
Fig. 1 illustrates in schematic form the trunking arrangement between a network of telephone exchanges.
Figure 18:
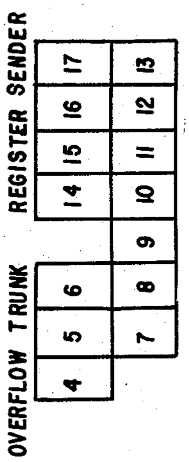

Referring now to Fig. 1 which shows a trunking arrangement between a plurality of exchanges and in which the Vancover exchange A has direct trunks to the following exchanges, Winnipeg exchange B, Calgary exchange C, Regina exchange D, and Saskatoon exchange E for completing calls from exchange A to the respective exchanges. The direct trunks between exchanges A and C are also used as a first choice alternate route for calls from exchange A to B when all the direct trunks between exchanges A and B are busy. The direct trunks between exchanges A and D are also used as a second choice alternate route for calls from exchange A to B when all the direct trunks between exchanges A and B and all the direct trunks between exchanges A and C are busy. In a similar manner the direct trunks between exchanges A and E are also used as a third choice alternate route for calls between exchanges A and B when all direct trunks between exchanges A and B, exchanges A and C, and exchanges A and D are busy. The exchanges C, D and E are connected to the exchange B by other trunks as indicated. In the rectangle representing the Vancover exchange A are shown the numbers of the routing digits which are required to route the call through the automatic switches in Vancover to route the call to the direct trunks to the exchanges E, B, C and D. For example, the digits 9, 8 and 6 operate automatic switches in Vancover to seize one of the direct trunks to the Winnipeg exchange B. Other automatic switches are indicated in the exchanges E, F, C and D with a numeral directly below which indicate the routing digits required to route the call through these last mentioned exchanges when such exchanges are used as tandem exchanges in establishing a call over an alternate route for a call between exchanges A and B.

Figure 2:
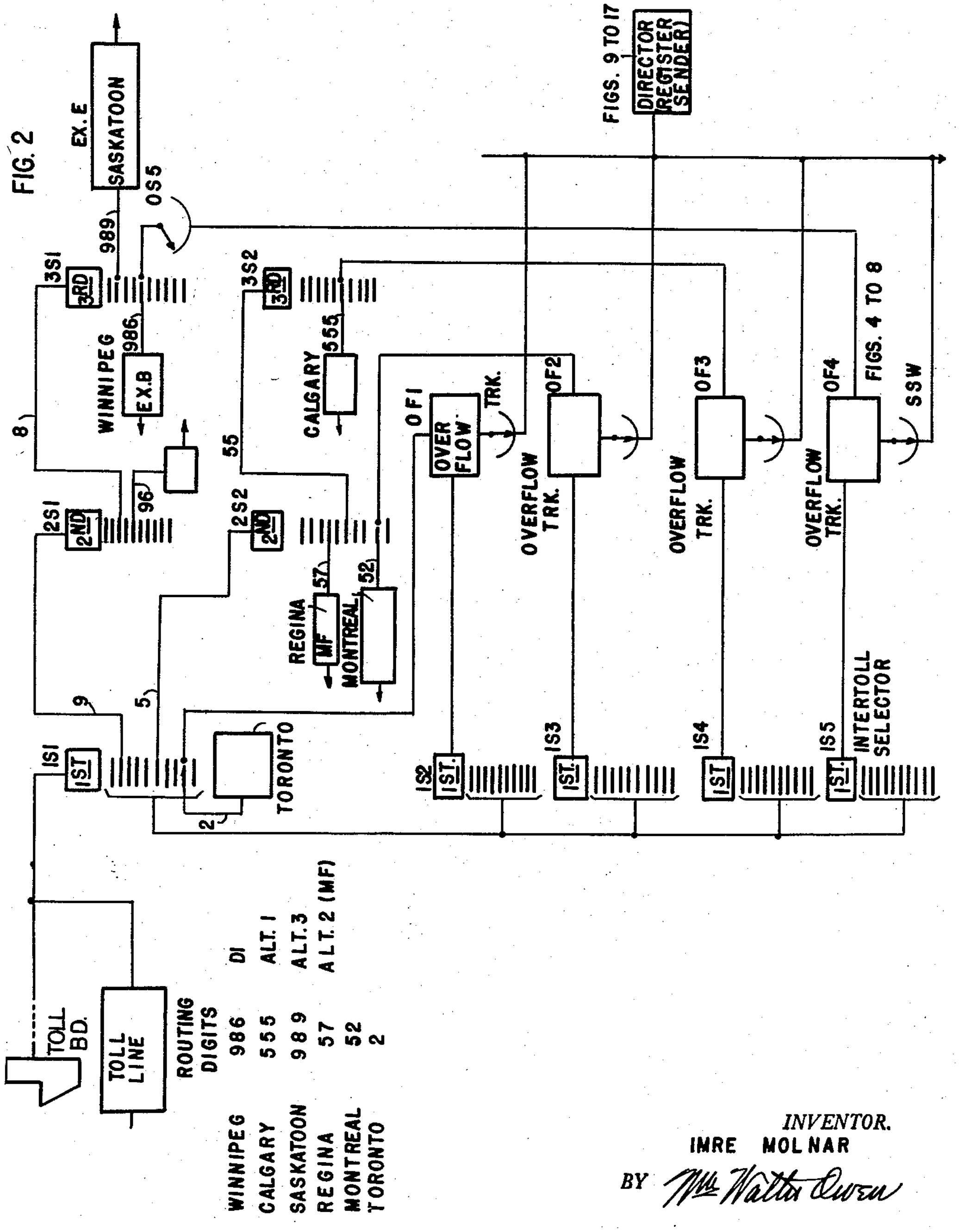
Fig. 2 illustrates the apparatus located in the first exchange (Vancover exchange A) of Fig. 1.

Fig. 2 shows three routes of switches such as first selectors 1S1, second selectors such as 2S1, and third selectors such as 3S1 and their respective level connections in the Vancover exchange A. For example the ninth level of the third selectors 3S1 has access to the direct trunks extending to the Saskatoon exchange E while the sixth level of this third selector has access to the direct trunks to the Winnipeg exchange B and to overflow trunks, such as OF4, either directly or by way of outgoing secondary switches such as OS5. The third selectors 3S2 have access to the direct trunks to the Calgary exchange C and to the overflow trunks OF3 over their fifth levels. Other overflow trunks are also provided as similarly indicated. The overflow trunks are individually connected to first selectors, such as 1S2, 1S3, 1S4 and 1S5 which have their levels of bank contacts multiplied to the levels of bank contacts of the first selectors, such as 1S1, and therefore have access to the same second selectors as selectors 1S1. Each overflow trunk has a hunting switch, such as SSW, for seizing an idle director, or register sender, such register sender being common to all the overflow trunks and being taken into use only when seized by an overflow trunk at a time when the direct trunks, normally used for the call being extended, are all busy.

Figure 3:
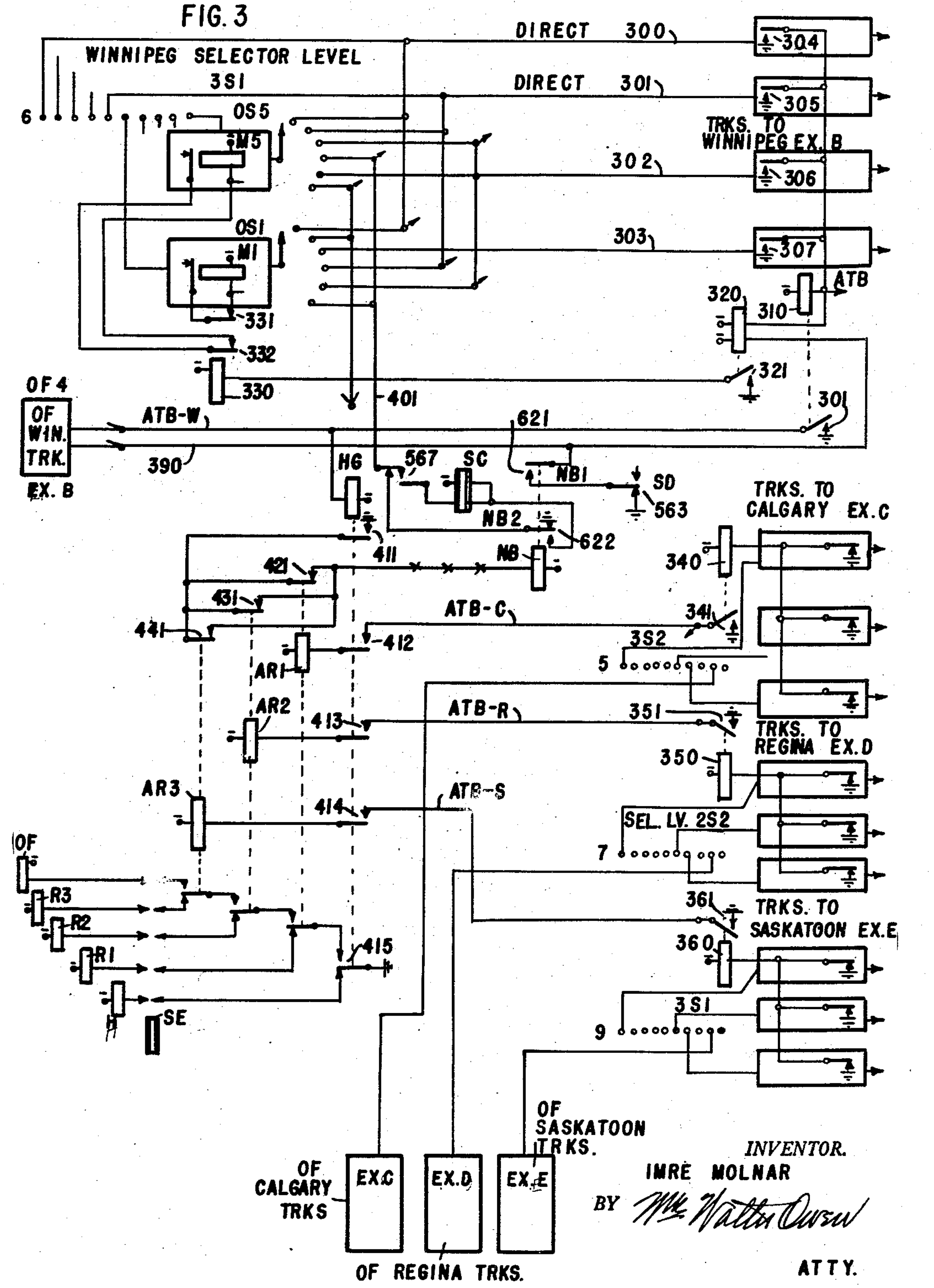
Fig. 3 illustrates in simplified form the all trunk busy circuits for the groups of direct trunks for the exchanges shown in Fig. 1.

Fig. 3 diagrammatically illustrates the all trunk busying circuits for the direct trunk groups from the Vancover exchange A to the exchanges B, C, D and E and a portion of one of the Winnipeg overflow trunks OF4. This portion of the Winnipeg overflow trunk is more fully disclosed in Figs. 4 to 7, inclusive, together with their cooperating control circuits. More specifically the sixth level of selector 3S1 is illustrated in the upper left hand corner and certain of the bank contacts are connected to direct trunks, such as 300 and 301, extending to the Winnipeg exchange B. These direct trunks control an all trunk busy relay ATB 310, in accordance with the all trunk busy condition of these trunks in a well known manner. Similar all trunk busy relays 340, 350 and 360 are provided for the direct trunks to the respective C, D and E exchanges. For example, when all the direct trunks between Vancouver and Winnipeg are busy, the multiple grounds at 304, 305, 306 and 307 are removed from ATB relay 310 to cause it to restore and ground the all trunk busy lead ATB–W to operate relay HG in overflow trunk OF4. In a similar manner the all trunk busy relay 340 restores when all the Calgary direct trunks are busy to ground the all trunk busy lead ATB–C and the all trunk busy relays 350 and 360 similarly ground the all trunk busy leads ATB–R and ATB–S. The alternate route relays of overflow trunk OF4, such as AR1, AR2 and AR3, are controlled over these all trunk busy leads in a manner more fully described hereinafter.

Fig. 3 further illustrates that some of the bank contacts of the sixth level of selector 3S1 extend to outgoing secondary switches, such as OS1, which have some of their bank contacts multipled and connected to the direct trunks while other of their bank contacts are connected to overflow trunks, such as illustrated by the connection to overflow trunk OF4. These outgoing secondary switches may be omitted in which case the overflow bank contacts of the sixth level of selector 3S1 are connected directly to the overflow trunks.

Overflow trunk OF4 is fully illustrated in Figs. 4 to 8, inclusive together with a diagrammatic illustration of the third selector 3S1 and the first inter-toll selector 1S5 previously shown on Fig. 2. The all trunk busy leads ATB–W, ATB–C, ATB–R, and ATB–S of Fig. 3 are shown connected to relay HG and to alternate route relays AR1, AR2 and AR3 when relay HG is operated. These alternate route relays control circuits to route determining relays H, R1, R2, and R3 which in turn control the code marking relays H, RA1, RA2 and RA3. The code marking relays control circuits to code mark the banks of the code switch KS with routing digits in accordance with the code chart illustrated in Fig. 7.

The code switch KS is a well known rotary type of switch which is operated one step each time its operating magnet KSM restores. The code switch has five wipers, and levels of bank contacts; four such wipers being utilized for code marking the routing digits while the fifth level for skipping certain of the routing digit positions when no routing digit is code marked in the other levels.

Figure 7:
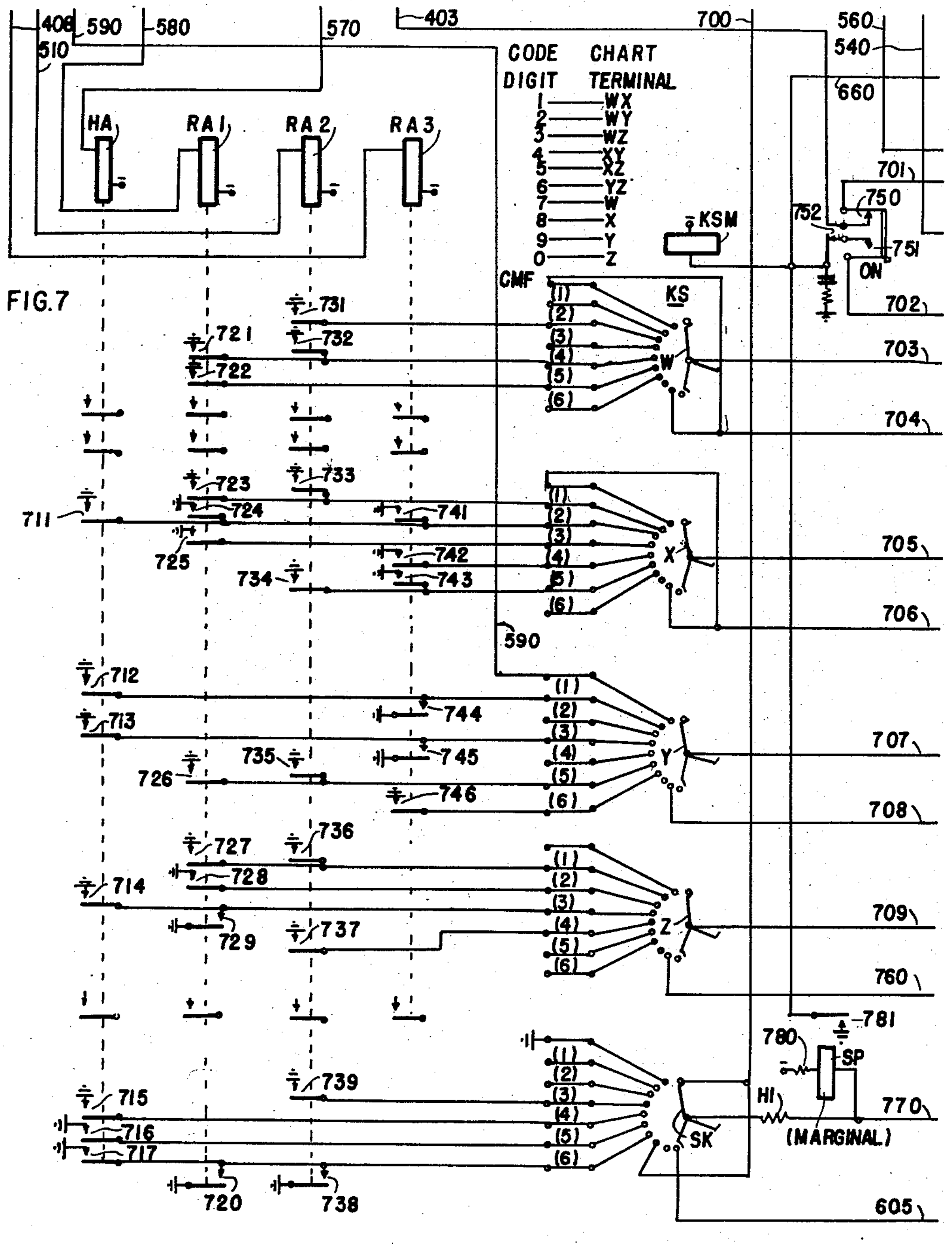
Figure 8:
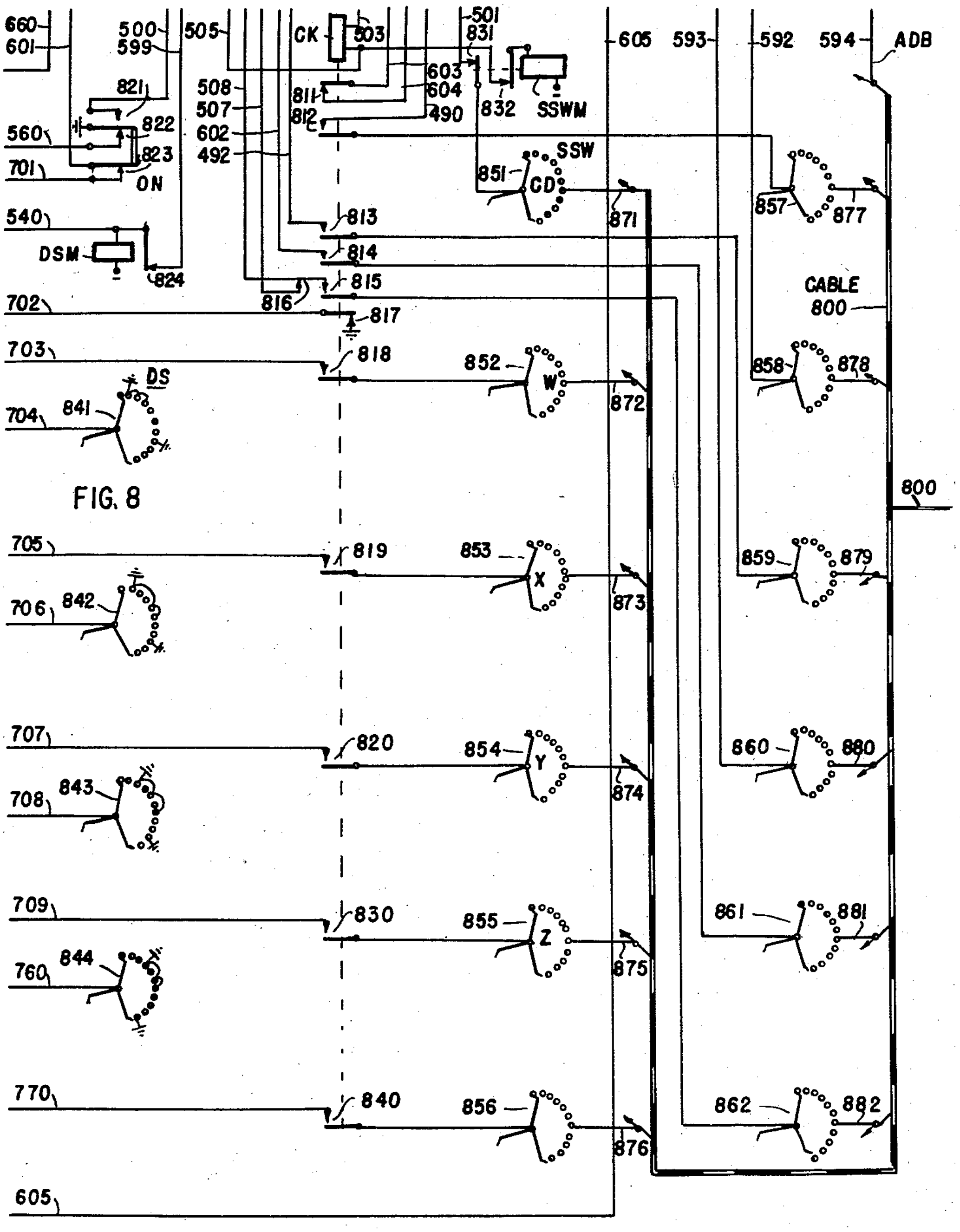
Figure 9:
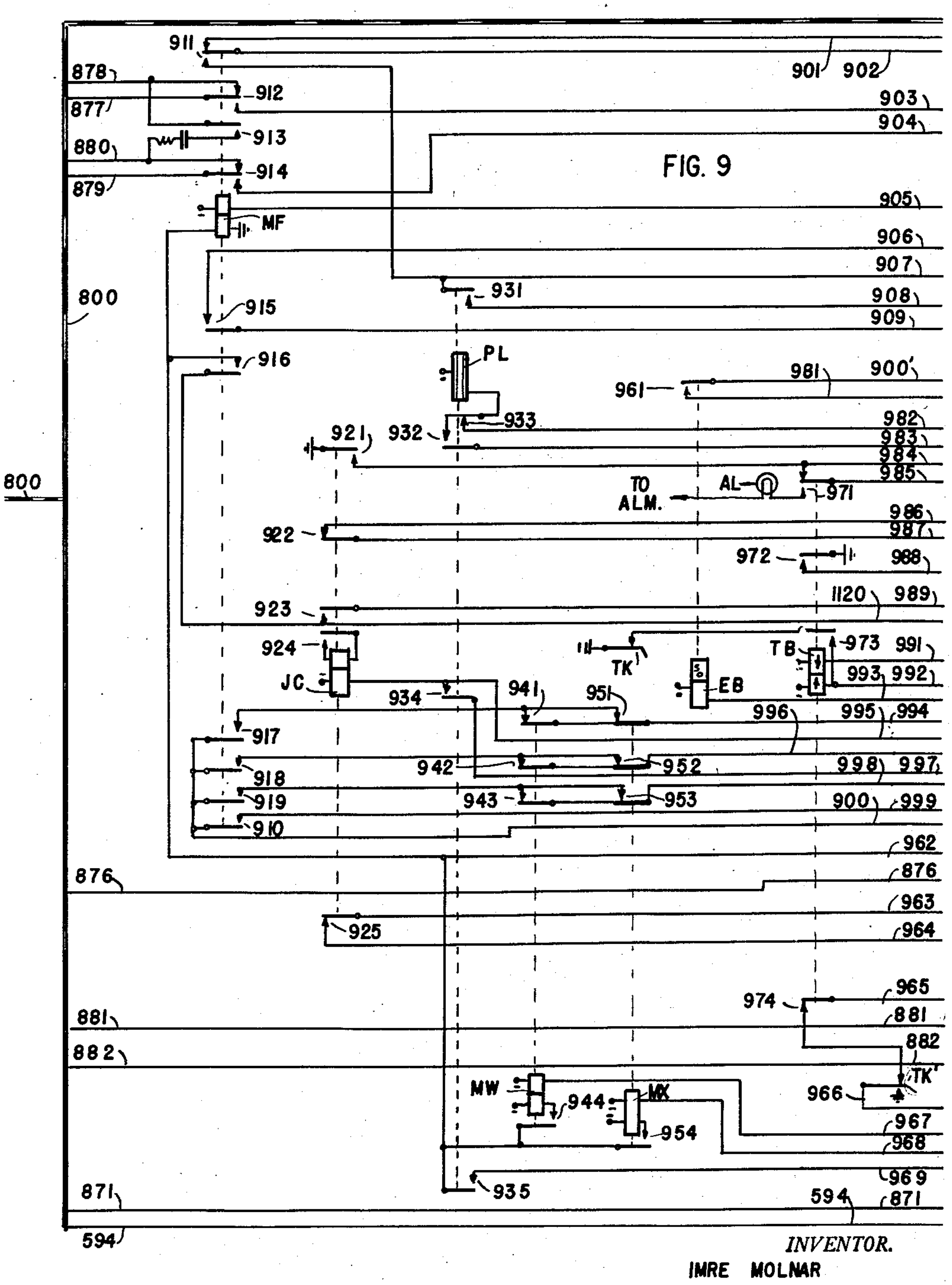
Figure 10:
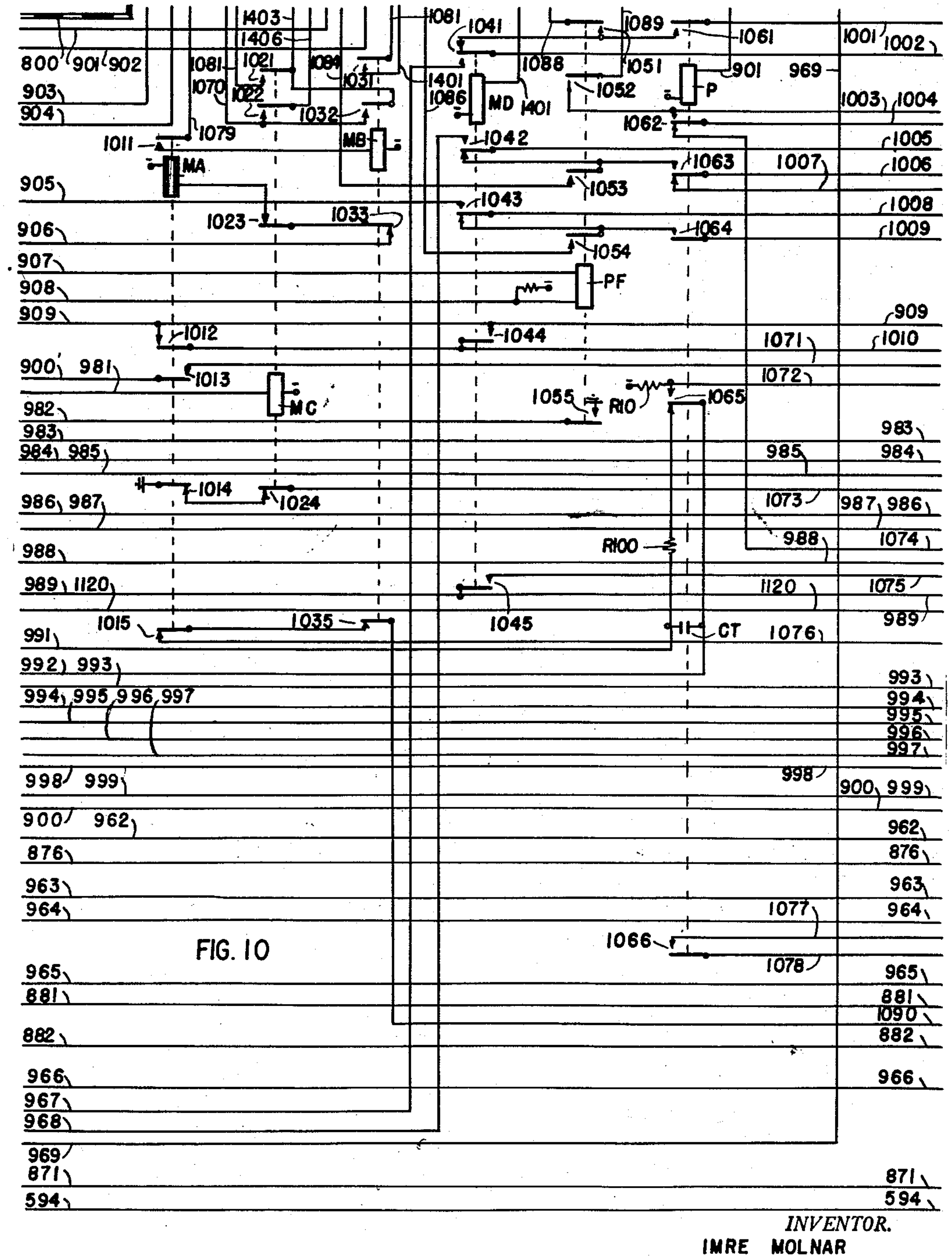

The digit switch DS in Fig. 8 is a similar well known rotary type switch which is operated by the first dialled incoming digit to a position corresponding to such incoming digit. The banks of this digit switch are connected to ground in accordance to the W, X, Y, Z code illustrated in Fig. 7. The selecting switch SSW shown in Fig. 8 is a similar well known rotary type of switch individual to the overflow trunk illustrated and which has access through its wipers and bank contacts to directors, or register senders.

Figure 17:
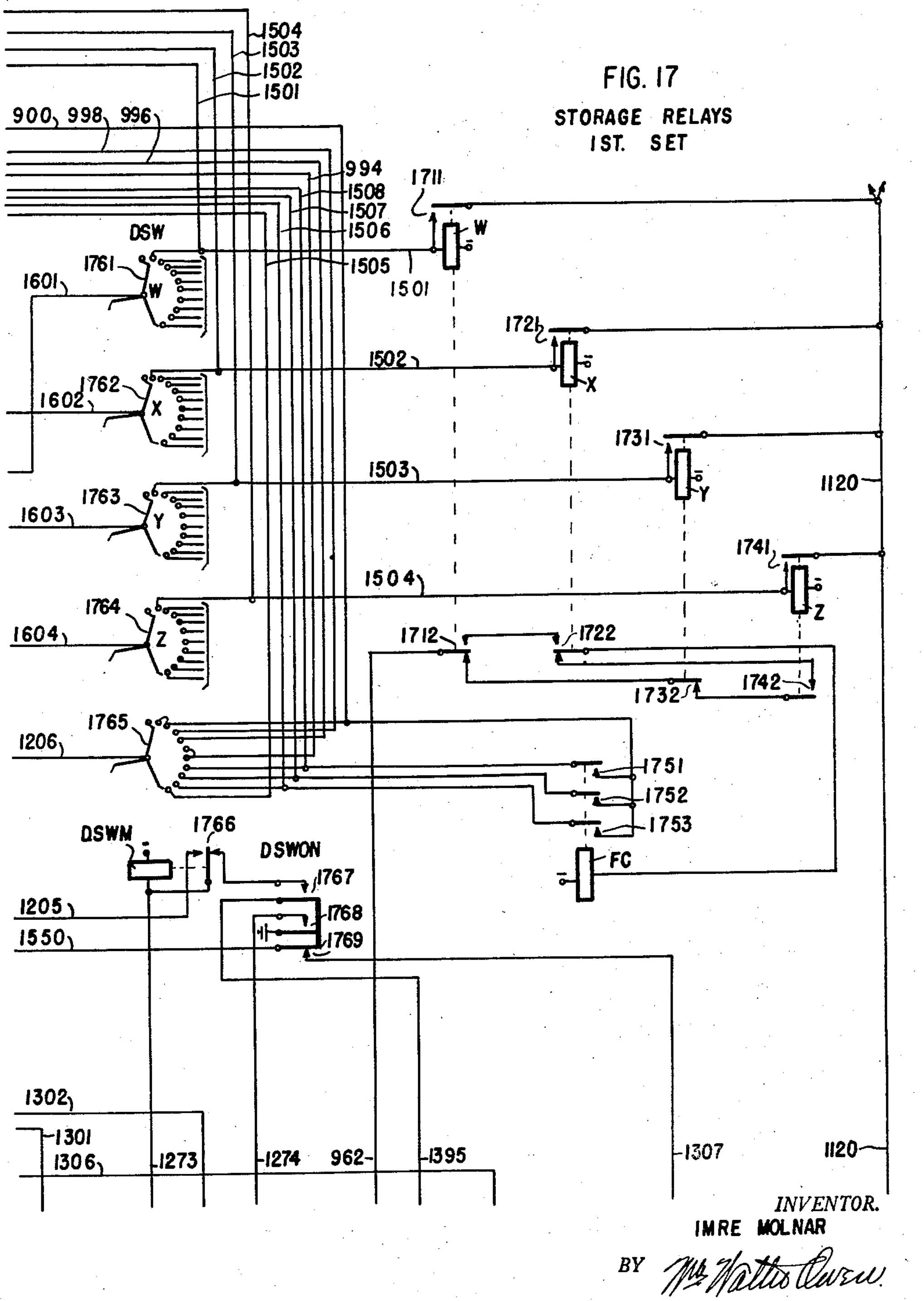

One of the common register senders, or director, is illustrated in Figs. 9 to 17 inclusive, and comprises along with the relays shown a control switch CS (Fig. 15), a sending switch SS (Fig. 16), a register switch RS (Fig. 16), a digit switch DSW, and two time switches PS and TS. Fig. 17 shows the first storage relay set comprising relays W, X, Y and Z accessible from the first bank contacts of the digit switch DSW and it will be understood that similar storage relay sets are accessible from the remaining bank contacts of the digit switch; there being a total of ten storage relay sets of which only the first is illustrated. The above named switches are all of the well known rotary type which have a stepping magnet for moving their wipers one step for each deenergization of the stepping magnet. The control switch CS has ten wipers and ten levels of bank contacts. Four of the levels of the control switch are code levels upon which the routing digits and registered digits are code marked in order to transmit the routing digits as marked in the overflow trunk and to retransmit the dialled in digits which were registered.

Incoming dialled digits are received from the connected overflow trunk and each dialled digit operates the register switch RS to a corresponding position for operating the successive sets of storage relays in accordance with the W, X, Y, Z code. When the register switch RS is first operated to register a digit, such registration is sent over the first position of digit switch DSW to operate the relays in the first storage relay set in accordance with the setting of the register switch. The register switch is restored and reoperated to register the next digit while the digit switch is stepped to its second position to cause the second set of storage relays to register and store the second digit. The remaining dialled digits are registered and stored in the remaining sets of storage relays. The wipers 1521 to 1524 of the control switch are stepped over their respective levels to successively connect the code markings of the successive routing digits and then the code markings of the successive registered digits to the banks of the sending switch SS. The sending switch SS is operated step by step until it finds the coded marking then connected thereto by the control switch. During this operation of the sending switch pulses are being transmitted to extend the call. The sending switch and the pulsing stops when the connected code marking is found and then the sending switch is reoperated a predetermined distance in order to provide an interdigital pause between the transmission of successive digits. The control switch is stepped to the next marking position and the same cycle is repeated until all the routing digits and the registered digits have been transmitted.

Figure 11:
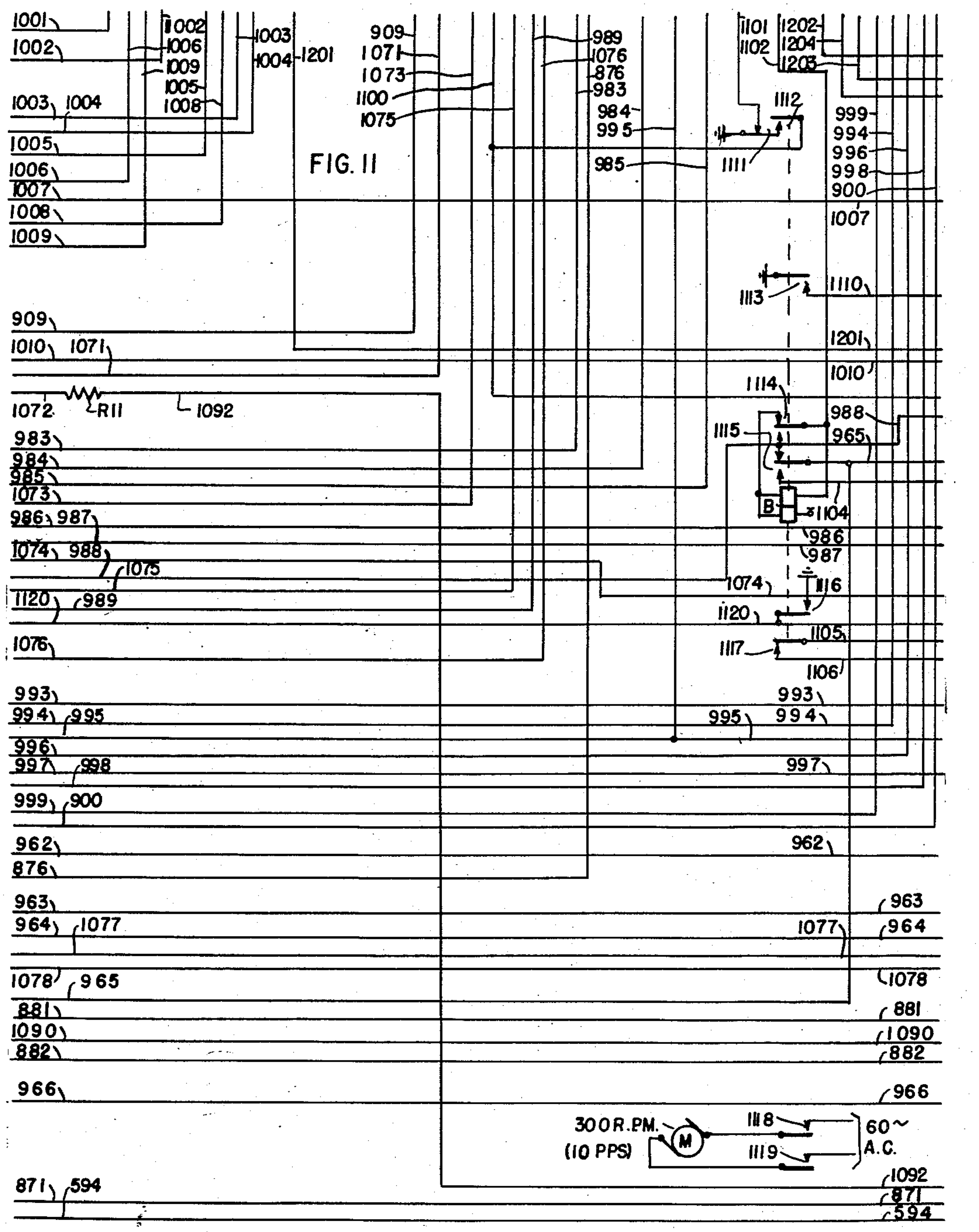
Figure 12:
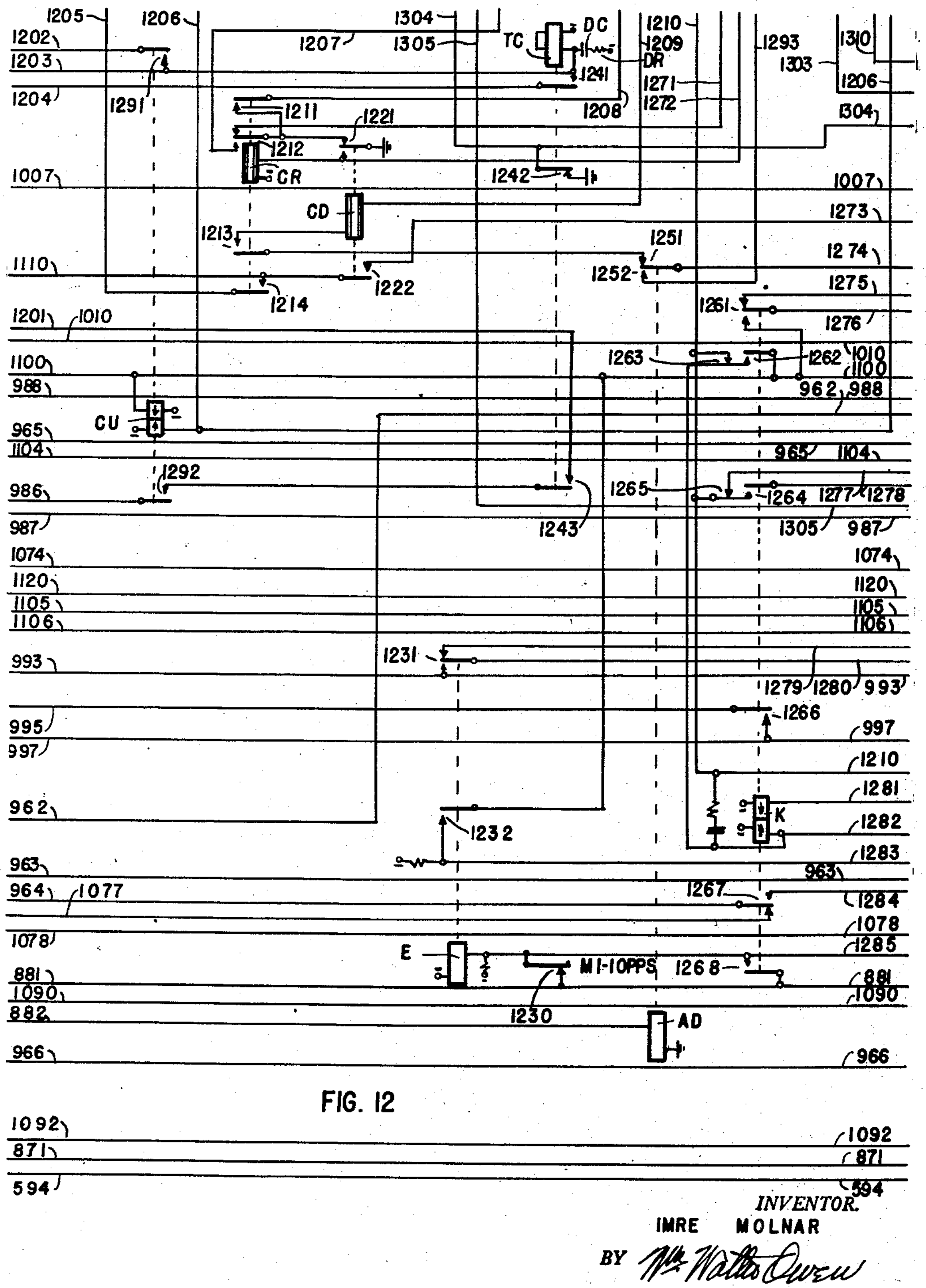
Figure 13:
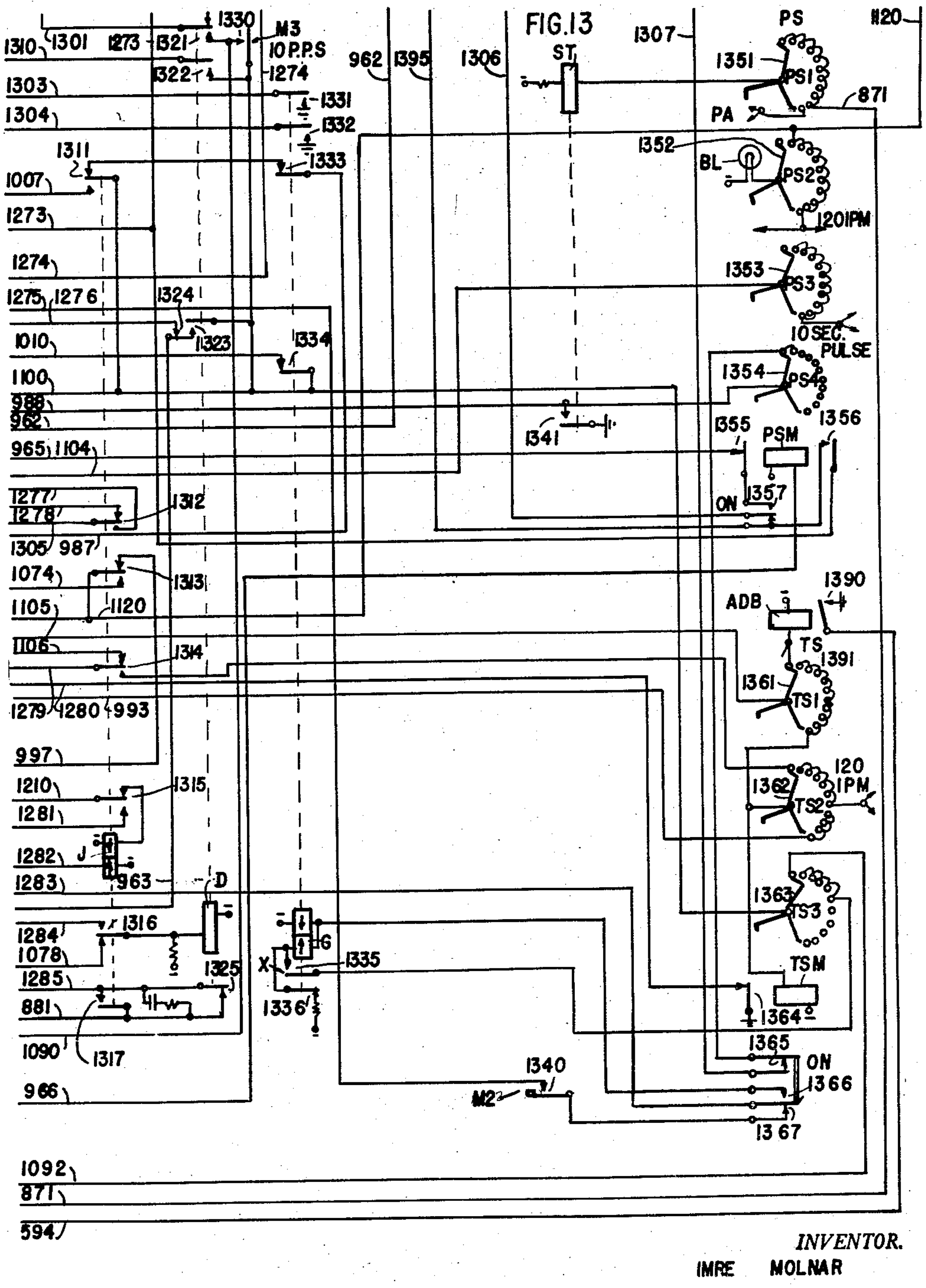

Wiper 1525 of the control switch CS has access to the transmitting control level of bank contacts which controls the transmission as well as the type of transmission to be sent out by the register sender. Wiper 1530 has access to the step control level of bank contacts which controls the stepping of the code switch KS in the overflow trunk and the stepping of the control switch. Wiper 1528 has access to the automatic stepping control level of bank contacts which controls the automatic stepping of the control switch. Wiper 1527 has access to the time control level of bank contacts which controls a two second timer. Wiper 1526 has access to the delay control level of bank contacts which in cooperation with the level of bank contacts accessible to the wiper 1765 of the digit switch DSW controls transmission delay means to inform the register sender when digit transmission is to be initiated. And wiper 1529 has access to the position indication level to indicate the operated position of the control switch. A motor M is shown in Fig. 11 which is operated to control pulsing contacts 1230 in Fig. 12 and pulsing contacts 1330 and 1340 in Fig. 13 at the rate of ten pulses per second.

Figures 14, 14A:
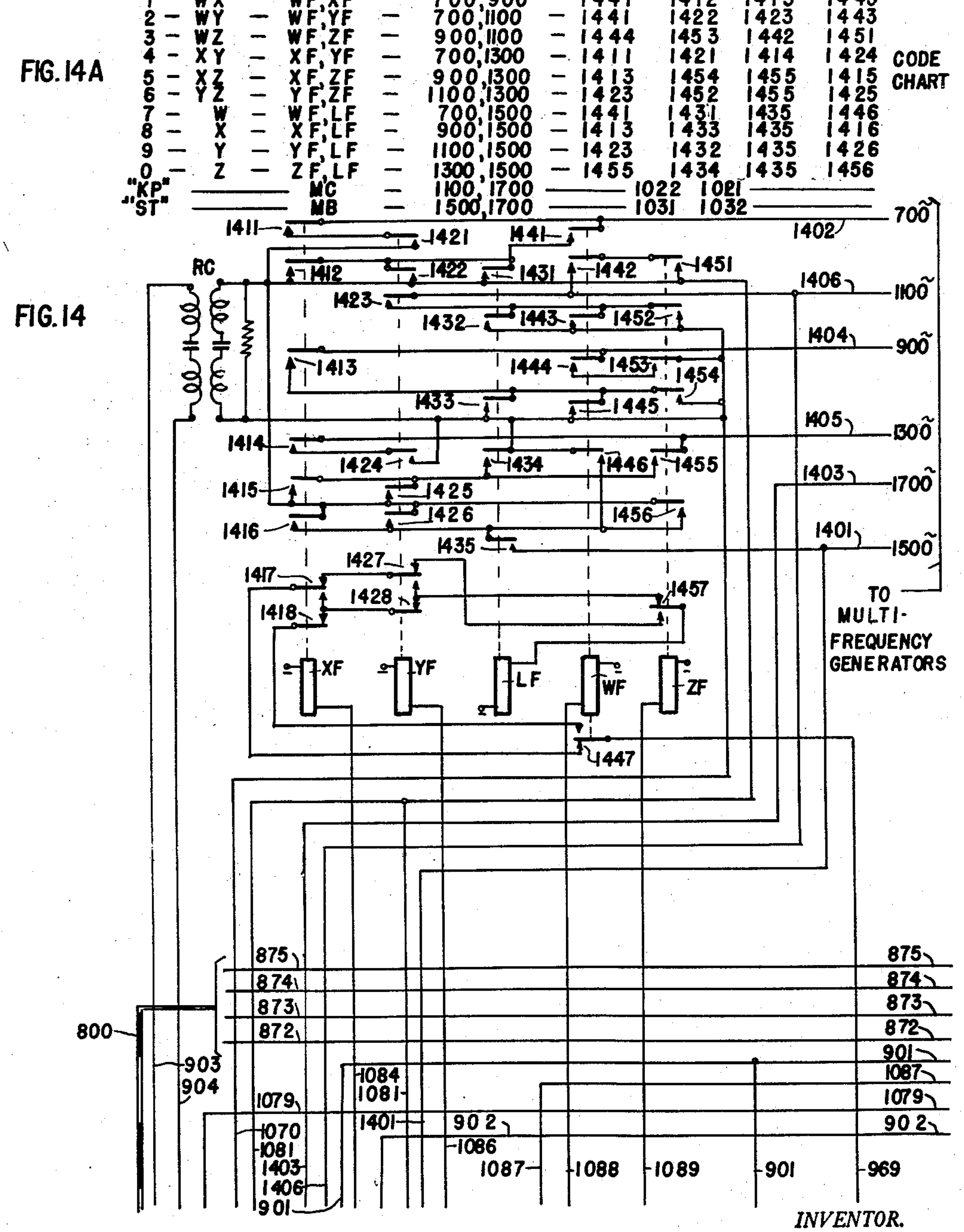
Figure 15:
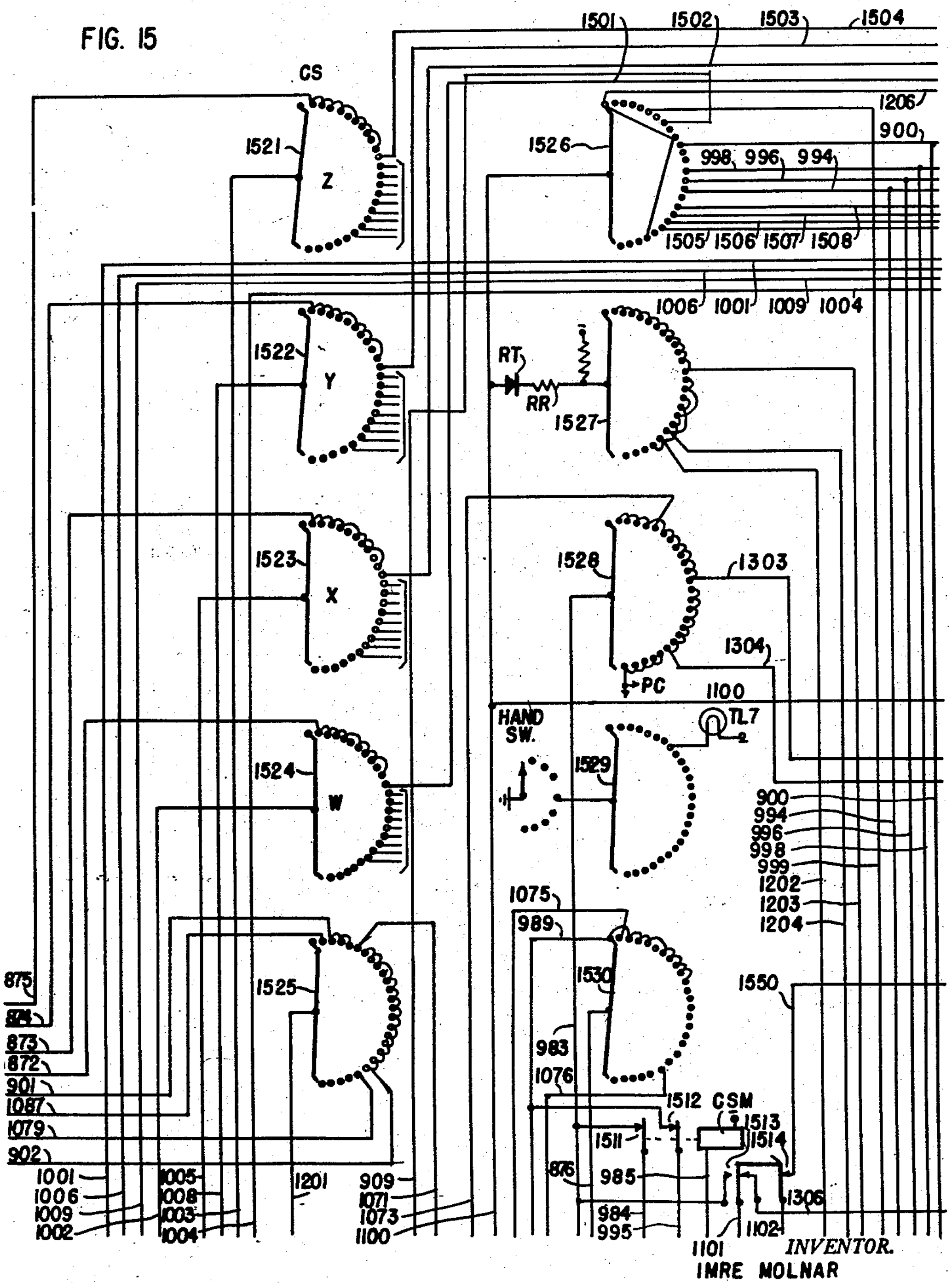
Figure 16:
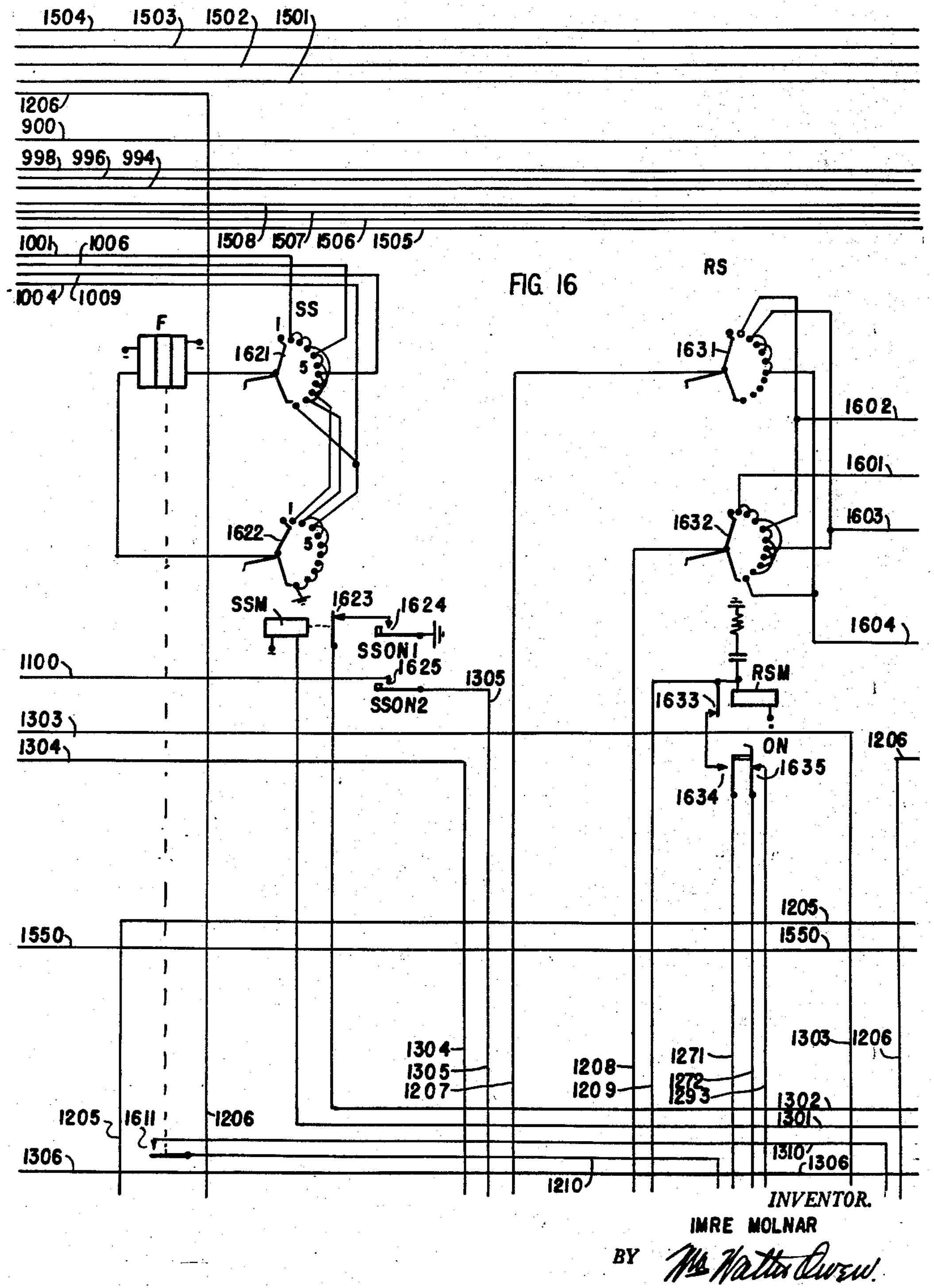

A code chart is shown in Fig. 14A for indicating the code of multi-frequency digit transmission. The first vertical column indicates the digit, or special conditioning or stop signal, the second column indicates the W, X, Y, Z code, the third column indicates the relays which are operated for each coded digit, the fourth column indicates the two frequencies used for each multi-frequency digit, and the remaining columns indicate the contacts which are closed to connect the two frequencies to the outgoing transmitting circuit.

*General description*

A toll call may be originated from a toll board at the Vancover exchange A or may be received over an incoming toll line for a called subscriber in the Winnipeg exchange B. A transmitting means, such as an operator sender, or register sender, sends decimal digits to operate the automatic switches in the Vancover exchange A to route the call over direct trunks to the Winnipeg exchange B, and then transmits further digits through these switches to complete the desired call in the Winnipeg exchange. In case all of the direct trunks between Vancover and Winnipeg are busy, then one of the operated switches in the Vancover exchange will seize an overflow trunk instead one of the direct trunks. Another register sender, or director, common to all the overflow trunks is seized in response to the seizure of the overflow trunk and the digits transmitted by the first sender is registered and stored in the seized overflow trunk and in the seized second register sender. The seized overflow trunk code marks routing digits for causing the call to be routed over one or more alternate routes dependent upon the busy condition of these alternate routes. The second register sender is controlled by the code marked routing digits in the connected overflow trunk to first transmit the routing digits as marked in the overflow trunk to route the call through automatic switches in the Vancover exchange to the selected alternate route. This selected alternate route includes direct trunks between the Vancover exchange A and another exchange which now acts as a tandem exchange for completing the desired call. The routing digits also route the call through this other, or tandem exchange, over other connecting trunks to the desired called Winnipeg exchange B, after which the second register sender then retransmits the registered and stored digits. In case the chosen alternate route is by way of a tandem exchange requiring transmission of multi-frequency digits, the seized overflow trunk controls the second register sender to first transmit decimal routing digits to route the call through the automatic switches in the Vancover exchange, second, to transmit multi-frequency routing digits to route the call through the tandem exchange, and then retransmits the registered and stored digits as multi-frequency digits to the tandem exchange. These latter digits being translated in any well known manner to control the switches in the Winnipeg exchange B to complete the desired connection.

Figure 4:
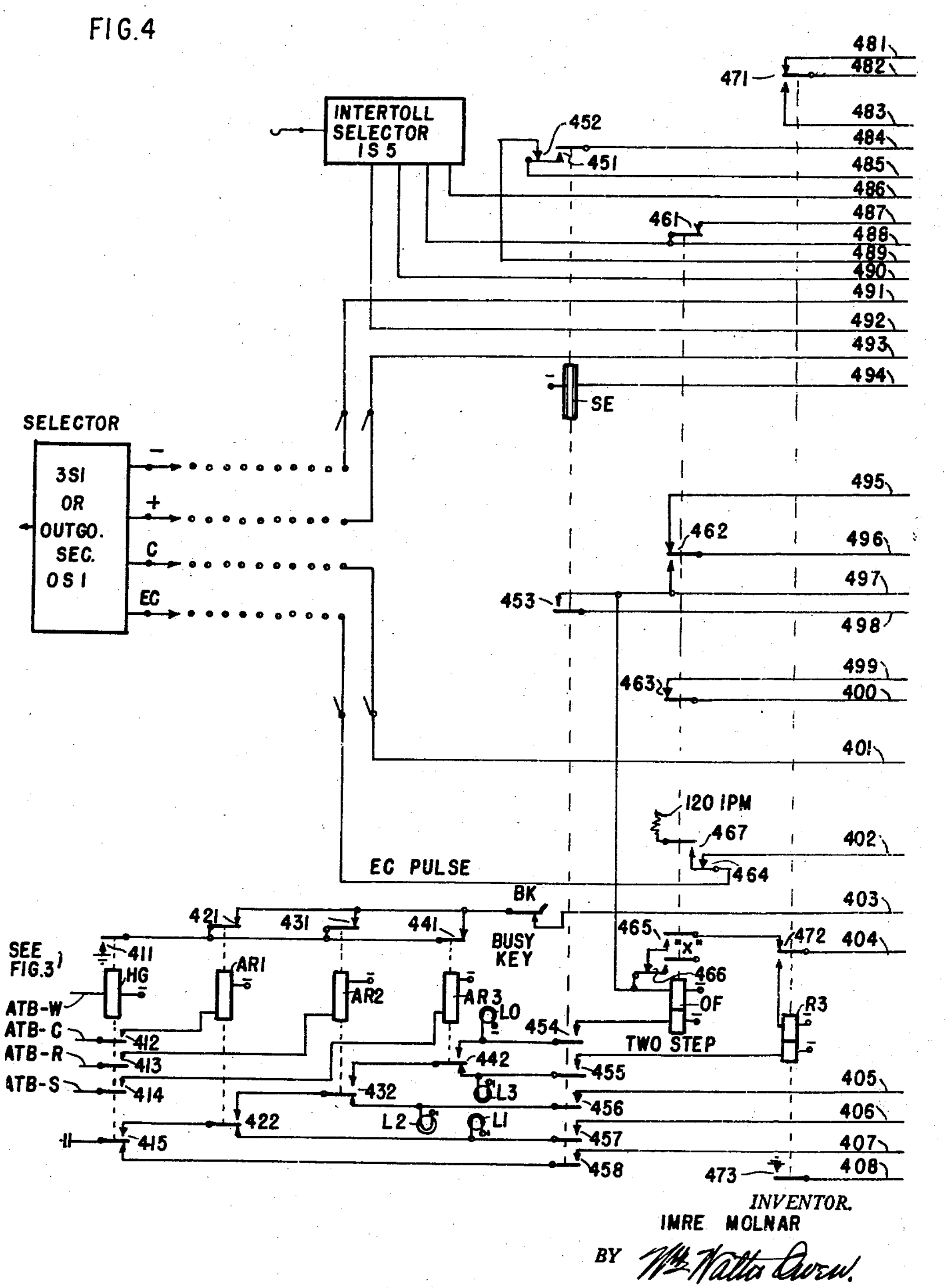
Figure 5:
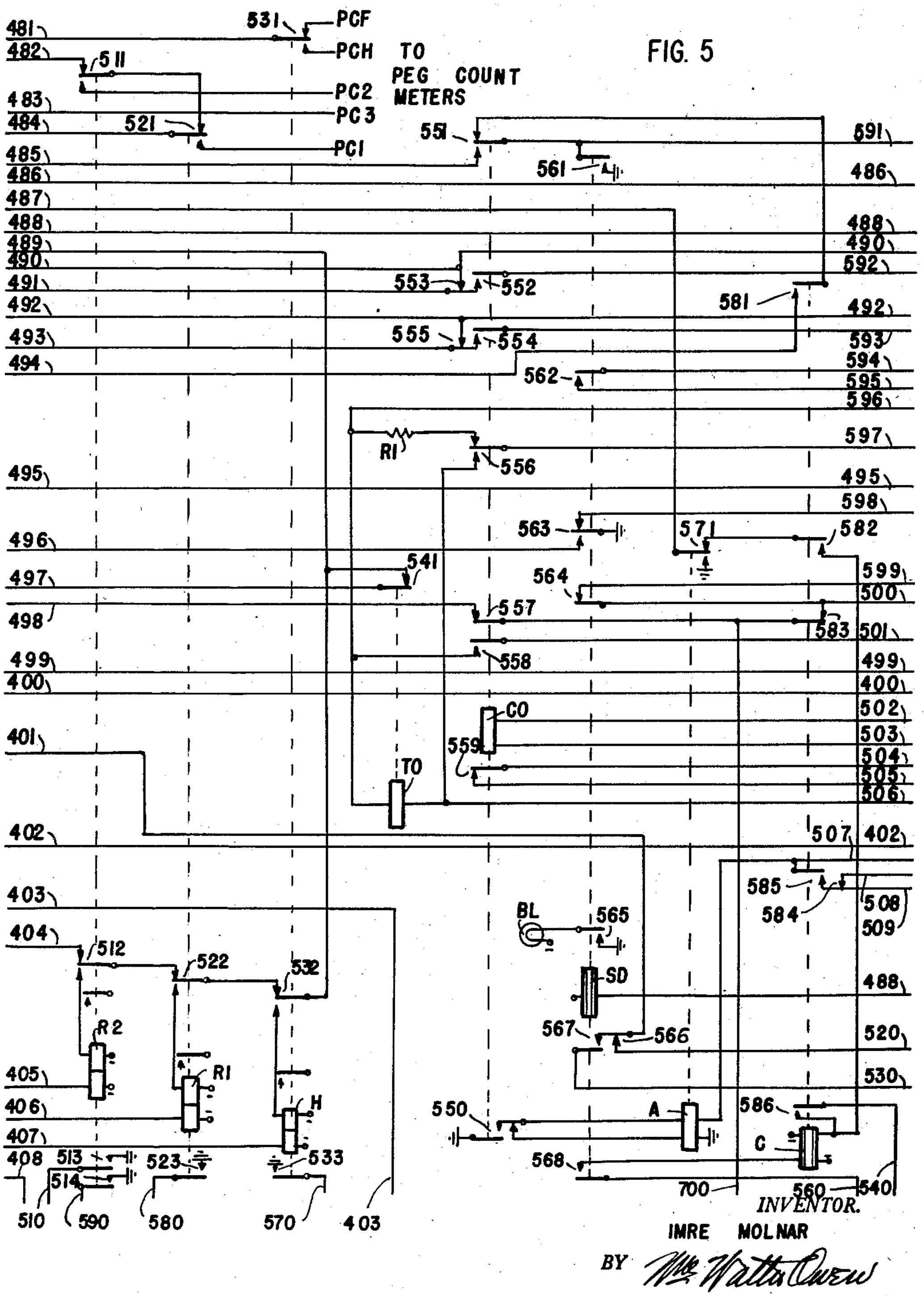
Figure 6:
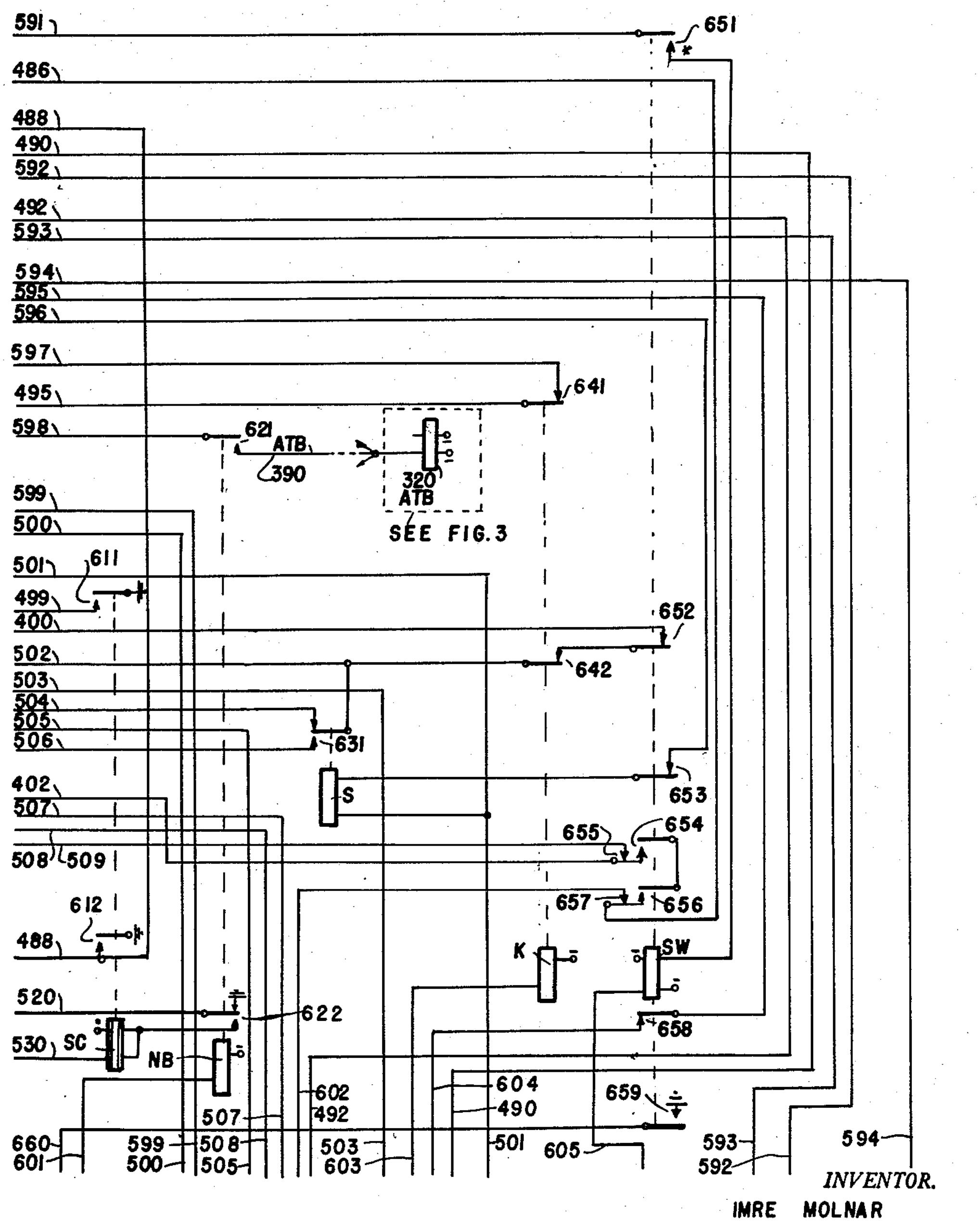

Having given a general description of the invention a detail description will now be given and it will now be assumed that all of the direct trunks to Winnipeg from the selector switches and from the outgoing secondary switches in Vancover are busy. When each trunk is taken into use, a multiple ground, such as shown at contacts 304–307 (Fig. 3), is disconnected from the all trunk busy common lead. When all trunks are busy the circuit to the ATB relay 310 is opened; ATB relay 310 restores and at contacts 311 grounds the Winnipeg all trunk busy conductor ATB–W to operate relay HG (Figs. 3 and 4). Relay HG at contacts 412, 413 and 414 prepares circuits for the alternate route relays AR1, AR2 and AR3.

Relay AR1 corresponds to the first choice alternate trunk route on calls from Vancover to Winnipeg and is operated only in case the Calgary all trunk busy conductor ATB–C is grounded. When all of the trunks from Vancover to Calgary are busy, the ATB relay 340 restores to ground conductor ATB–C at contacts 341.

Relay AR2 corresponds to the second choice alternate trunk route on calls from Vancover to Winnipeg and is operated only in case the Regina all trunk busy conductor ATB–R is grounded. When all the trunks from Vancover to Regina are busy, the ATB relay 350 restores to ground conductor ATB–R at contacts 351.

Relay AR3 corresponds to the third choice alternate trunk route on calls from Vancover to Winnipeg and is only operated in case the Saskatoon all trunk busy conductor ATB–S is grounded. When all the trunks from Vancover to Saskatoon are busy, the ATB relay 360 restores to ground conductor ATB–S at contacts 361.

Relay OF is operated when all direct and all of the alternate routes are all busy to stop futile operations of the apparatus.

Relays R1, R2, R3, H and slave relays RA1, RA2, RA3, and HA are code marking relays which operate contacts to code mark the required digits through the code marking frame CMF and to the banks of code switch KS in accordance with the available route.

Relay HG, also at contacts 411 completes a circuit for energizing relay NB providing at least one of the alternate routes is available. This circuit may be traced as follows: ground, contacts 411, any one of the multipled contacts 421, 431 or 441, busy key BK, conductor 403, off-normal contacts 750, conductor 701, off-normal contacts 823, and relay NB to battery.

Relay NB at contacts 621 connects ground at contacts 563, via conductor 598 to all trunk busy conductor 390 to maintain relay 320 operated as long as an overflow trunk is available. At back contacts 622, relay NB removes the busy ground from conductor 401 to remove the artificial busy condition. At make contacts 622, relay NB connects battery through the upper low resistance winding of SC to mark this overflow trunk idle and selectable from the banks of the selectors or outgoing secondary switches.

The relay 320 (Fig. 3) is maintained operated as long as any of the direct Winnipeg trunks are idle and is also maintained energized when any of the overflow Winnipeg trunks are idle at a time when all the direct Winnipeg trunks are busy. In case all the Winnipeg direct trunks and overflow trunks are busy relay 320 will restore and at contacts 321 complete a circuit for operating relay 330. Relay 330 opens circuits to the stepping magnets M1–M5 of all the outgoing secondary switches OS1 to OS5 at contacts, such as contacts 331 and 332 to prevent needless rotation of the secondary switches when no idle outlet is provided therefor.

It will now be assumed that an incoming toll call for Winnipeg, incoming over the toll line or from the toll board, has seized the third selector 3S1 and in response to the digit 6 the selector is operated vertically to the sixth level after which the wipers are rotated in search of an idle trunk in the well-known manner. In case all direct trunks to Winnipeg are busy the selector wipers are rotated to seize an idle Winnipeg overflow trunk, such as shown in Figs. 4 to 8, inclusive. Such an overflow trunk may be selected from the last few bank contacts of the selector, or if outgoing secondary switches are provided, such a selector may seize an outgoing secondary which in turn in a well-known manner will rotate its wipers to seize an overflow trunk. As previously described relays HG and NB in the overflow trunks are operated whenever the direct Winnipeg trunks are busy and the selector, or the outgoing secondary switch, seizes one of the overflow trunks marked idle by the battery potential through the upper low resistance winding of relay SC. The circuit for operating relay SC may be traced as follows: from the grounded C wiper of the selector (or outgoing secondary switch seized by the selector), conductor 401, contacts 566, conductor 520, make contacts 622, and through the upper low resistance winding of relay SC to battery.

Relay SC at contacts 611 prepares a circuit for operating relays CO and CK which are normally short-circuited over contacts 559 and 631 and also completes a circuit for operating the stepping magnet SSWM of the director hunting switch SSW as follows: ground, contacts 611, conductor 499, contacts 463, conductor 400, contacts 652, 642, back contacts 631, conductor 504, contacts 559, conductor 505, interrupter contacts 832 and the winding of stepping magnet SSWM to battery. At contacts 612 relay SC grounds conductor 488 to condition intertoll selector 1S5 for operation and also operates relay SD.

When this overflow trunk is seized the A relay (Fig. 5) is operated over the EC wiper of the seizing switch as follows: from ground through the high resistance lower winding of relay A, normally closed contacts 550, through the upper low resistance winding of A, conductor 507, contacts 816, conductor 508, contacts 584, conductor 509, contacts 655, conductor 402, contacts 464, EC bank contact and EC wiper of the seizing switch to battery on the EC lead in the selector 3S1. Due to the high resistance lower winding of relay A a "stop-dial" signal is transmitted back over the EC lead to stop further pulsing by the calling sender until an idle director is selected and seized by switch SSW. This high resistance signal tells the calling sender to stop transmission of further pulsing in the well-known manner until the low resistance winding alone is connected to the EC lead as described in the H. W. Balzer application Serial No. 181,508, filed August 25, 1950, now issued on December 14, 1954 as Patent 2,697,134. Relay A at contacts 571 places a multiple ground on conductor 488 by way of contacts 461.

Slow-to-operate relay SD, upon operating, at contacts 561 prepares circuits for relays SE and SW and at contacts 562 prepares a circuit for operating relay K over conductor 594 in case all of the common directors are busy. At back contacts 563 relay SD removes one of the multiple grounds from ATB relay 320 and at make contacts 563 closes part of the director test circuit for test relay S. At contacts 564 relay SD opens part of the restoring circuit of the DS switch; at contacts 565 lights the seizure traffic lamp; at contacts 566 opens the low resistance idle battery circuit through the upper winding of relay SC while at contacts 567 substitutes the lower high resistance winding of relay SC in series with the upper low resistance winding of relay SC to mark this overflow trunk busy over conductor 401. The high resistance winding of relay SC is sufficient to prevent the test relay in another seizing switch from operating and seizing this engaged overflow trunk. At contacts 568 relay SD completes a circuit for operating the slow-to-release relay C as follows: from ground off-normal contacts 822 of switch DS, conductor 560, contacts 568 and lower winding of relay C to battery.

Relay C at contacts 581 completes a circuit for operating relay SE as follows: from ground contacts 561, 551, 581, conductor 494, winding of slow-to-release relay SE to battery. At contacts 582 relay C prepares a point in the pulsing circuit to maintain relay C operated during pulsing and at contacts 586 prepares a further point in the pulsing circuit to stepping magnet DSM of switch DS. At contacts 583 relay C opens a point in the circuit to relay SP to prevent its premature operation. At contacts 585 relay C substitutes a new circuit for relay A independent of contacts 816 as follows: ground through the high resistance winding of relay A, contacts 550, upper low resistance winding of relay A, contacts 585, conductor 509, contacts 655, conductor 402, contacts 464, selector bank contacts and wiper, and to the pulsing EC lead in the selector.

Relay SE at contacts 451 prepares a point in the circuit for the peg count meters, at contacts 454, 455, 456, 457 and 458 prepares circuits for the respective code marking route relays OF, R3, R2, R1 and H, and at contacts 453 prepares a circuit for overflow relay OF which is effective only in case an operator has completed dialling the first digit into the overflow trunk before an idle director is seized.

Stepping magnet SSWM is operated over the circuit previously traced even though the wipers of switch SSW may be standing on the multiple bank contacts terminating an idle director. This arrangement is provided to enable another director, different from the director last used, to be taken into use so that if the last director used was faulty it would not be used on the next call. Stepping magnet SSWM, upon operating, positions its stepping pawl preparatory to stepping the wipers and at interrupter contacts 832 interrupts its own circuit. Magnet SSWM restores to step the wipers one step and recloses its interrupter springs. In case the wipers of switch SSW are in engagement with a busy director, the director test relay S is partially shunted from ground from the other overflow trunk connected to this busy director. This busying circuit may be traced from the said other overflow trunk as follows: ground contacts 563 of relay SD of the other overflow trunk, conductor 496, back contacts 462, conductor 495, contacts 641, conductor 597, make contacts 556, winding of relay TO, contacts 558, conductor 501, interrupter contacts 831, wiper 851 of switch SSW in the said other overflow trunk and engaged bank contacts, conductor 871 which is multipled to a similar bank contact of the switch SSW in the present overflow trunk. This shunt busying circuit continues over wiper 851, interrupter contacts 831, winding of relay S, contacts 653, conductor 596, resistance R1, back contacts 556, conductor 597, contacts 641, conductor 495, contacts 462, conductor 496, and make contacts 563 to ground. Dut to this shunt circuit, test relay S will not operate when the wipers of the switch SSW are in engagement with the multiple bank contacts terminating a busy director. Stepping magnet SSWM continues to operate and restore to step the wipers of switch SSW until wiper 851 of the overflow trunk engages the bank contact of an idle director. In an idle director battery potential through the winding of director start relay ST (Fig. 13) will be applied to conductor 871 of cable 800 for operating the test relay S. This circuit may be traced as follows: from ground make contacts 563, conductor 496, back contacts 462, conductor 495, contacts 641, conductor 597, back contacts 556, resistance R1, conductor 596, contacts 653, winding of test relay S, conductor 501, interrupter contacts 831, wiper 851 and engaged bank contact, conductor 871, multipled bank contacts of switch PS engaged by wiper 1351, and through the winding of start relay ST and resistance to battery. Both relays S and ST operate over this circuit; the operation of relay ST conditioning the seized director for operation as will be described subsequently.

In case all of the directors are busy, the all director busy relay K (Fig. 6) is operated to prevent the hunting operation of switch SSW. When all directors are busy the all director busy relay ADB (Fig. 13) restores and at contacts 1390 grounds conductor 594 of cable 800. Relay K is operated from grounded conductor 594, over contacts 562, conductor 595, contacts 658, conductor 604, contacts 811, and winding of relay K to battery. At contacts 641 relay K opens the operating circuit of test relay S to prevent its operation and at contacts 642 opens the stepping circuit to stepping magnet SSWM to prevent its operation and the stepping of switch SSW.

When an idle director is seized and test relay S is operated as previously described, the short circuit around relays CD and CK is removed at back contacts 631 (now open) of relay S and relays CO and CK now operate over the following circuit: ground contacts 611, conductor 499, contacts 463, conductor 400, contacts 652 and 642, conductor 502, winding of relay CO, conductor 503, winding of relay CK, interrupter contacts 832 and winding of stepping magnet SSWM to battery. Due to the high resistance windings of relays CO and CK the stepping magnet SSWM is not operated in this circuit. At make contacts 631 relay S prepares a temporary circuit for relay TO and increases the ground potential on the test bank contact by way of the windings of relays TO and S to prevent another SSW switch from seizing this director.

Relay CO, upon operating, at back contacts 551 opens the circuit to slow-to-release relay SE, at make contacts 551 completes a circuit for operating a peg count meter dependent upon the operated condition of the code marking relays R1, R2 and R3, at contacts 552 connects the negative lead 491 from selector 3S1 via conductor 592 and wiper 858 to conductor 878, at contacts 553 disconnects lead 491 from lead 490 extending to intertoll selector 1S5 at contacts 554 connects the positive lead 493 from selector 3S1 via conductor 593 and wiper 860 to conductor 880, at contacts 555 disconnects lead 493 from lead 492, at back contacts 556 opens the energizing circuit of relay S, at make contacts 556 closes the circuit to operate time out relay TO, at contacts 557 opens a point in the operating circuit to the upper winding of relay OF to prevent the operation of relay OF after an idle director is seized, at contacts 558 closes a short-circuit around relay S, and at contacts 559 opens another point in the previously described short-circuit for relays CO and CK. At contacts 550 relay CO removes the "stop-dial" signal by disconnecting the high resistance lower winding of relay A and by substituting direct ground through the upper low resistance winding of relay A.

Relay CK, upon operating, at contacts 811 opens the circuit to the all director busy relay K to prevent its operation; at contacts 812 connects the negative lead 491 from selector 3S1 to the negative lead 490 of selector 1S5 over contacts 552, conductor 592, wiper 858, conductor 878, contacts 912, conductor 877, wiper 857, contacts 812 and conductor 490; at contacts 813 connects the positive lead 493 of selector 3S1 to the positive lead 492 of selector 1S5 over contacts 554, conductor 593, wiper 860, conductor 880, contacts 914, conductor 879, wiper 859, contacts 813 and conductor 492; at contacts 814 connects the EC pulsing lead 486 of seletor 1S5 to the outgoing director pulse lead 881 by way of wiper 861, conductor 602, and contacts 657; at contacts 815 prepares a circuit for connecting the EC pulse lead to the director incoming pulse lead 882 over wiper 862; at contacts 816 opens a point in the original energizing circuit of relay A, at contacts 817 opens the restoring circuit of code switch KS, at contacts 818 connects the W wiper of code switch KS to the director W code lead 872 by way of wiper 852 and conductor 703, at contacts 819 connects the X wiper of code switch KS to the director X code lead 873 by way of wiper 853 and conductor 705, at contacts 820 connects the Y wiper of code switch KS to the director Y code lead 874 over wiper 854 and conductor 707, at contacts 830 connects the Z wiper of code switch KS to the director Z code lead 875 over wiper 855 and conductor 709, and at contacts 840 prepares a circuit for relay SP and for transmitting control signals back and forth between the overflow trunk and the director over control lead 876.

The circuit for initially operating relay TO may be traced from ground contacts 611, conductor 499, contacts 463, conductor 400, contacts 652, 642 and 631, conductor 506, winding of time-out relay TO, conductor 596, contacts 653, winding of relay S, conductor 501, interrupter contacts 831, wiper 851, conductor 871, multipled bank contacts of switch PS, wiper 1351, and winding of start relay ST and resistance to battery. The time-out relay TO opens its contacts 541 to prevent the operation of relay OF which latter relay is operated in case the director does not clear out within ninety seconds after seizure. After relay CO closes its contacts 556 and 558, relay TO is held operated from ground at contacts 563, conductor 496, contacts 462, conductor 495, contacts 641, conductor 597, contacts 556, relay TO, contacts 558, onductor 501, contacts 831, wiper 851, conductor 871 to director start relay ST as previously described. Relay CO also closes a short-circuit around test relay S to cause it to restore as follows: from the lower terminal of relay S, conductor 501, contacts 558, conductor 596, contacts 653 to the upper terminal of relay S.

When the director is seized by the overflow trunk, relay E (Fig. 12) in the director is energized from ground over the low resistance winding of the pulsing relay (not shown) of selector 1S5, EC pulsing conductor 486, contacts 657, conductor 602, contacts 814, wiper 861, director outgoing pulsing conductor 881, contacts 1325, conductor 1285, and winding of relay E to battery.

It was previously assumed that all the direct trunks to Winnipeg were busy at the time the overflow trunk was seized by selector 3S1, or by an outgoing secondary switch, such as 0S1. In order to describe the alternate routing it will first be assumed that at least one trunk is available in the first alternate route by way of the trunks to Calgary and therefore relay AR1 is not operated. As previously described relay HG was operated from the all trunk busy circuit ATB–W of the direct trunks to Winnipeg causing relays NB, SC, A, SD, C and SE in the seized Winnipeg overflow trunk to operate. After operation of relay SE, relay R1 is operated from ground make contacts 415, break contacts 422, contacts 457, conductor 406, lower winding of relay R1 to battery. At contacts 521 prepares a circuit for operating peg count meter for the first alternate route, which is completed when relay CO operates, from ground contacts 561, make contacts 551, conductor 485, contacts 451, conductor 484, and make contacts 521 to peg count meter PC1 and battery. At make contacts 522 relay R1 prepares a locking circuit for itself, such locking circuit being completed when relay SE restores after seizure of an idle director. This locking circuit is delayed until the director is seized in order to use an idle direct Winnipeg trunk in case one of such trunks became idle before the director is seized. At contacts 523 relay R1 completes a circuit for operating slave relay RA1 over conductor 580. As will be seen by referring to Fig. 2 that in order to reach the Calgary trunks, it is necessary to transmit three routing digits 5, 5 and 5; the first digit 5 operating the intertoll selector 1S5 to the fifth level which is multipled to the fifth level of the first selectors, such as 1S1. Selector 1S5 rotates in its fifth level and selects an idle second selector such as selector 2S2. Selector 2S2 is operated by the second digit five to its fifth level where it hunts and selects a third selector, such as selector 3S2. Selector 3S2 is then operated by the third digit 5 to its fifth level where it hunts for an idle trunk to Calgary. Since relay RA1 corresponds to the first Winnipeg alternate route via the Calgary trunks, it is necessary for relay RA1 to code mark the banks of the code switch KS through terminals of the code marking frame CMF in accordance with the digits required to route the call to the Calgary trunks and in accordance with additional digits which route the call through Calgary to trunks connecting Calgary with Winnipeg as illustrated in Fig. 1.

A code chart is shown in Fig. 7 illustrating the code markings required in the banks of the code switch KS for the respective digits. For example for the first routing digit 5, the second bank contacts accessible to wipers X and Z will be grounded; for a second routing digit 1 the third bank contacts accessible to wipers W and X will be grounded; and for the third routing digit 0 the fourth bank contact accessible to wiper Z will be grounded. In case any one of the available six routing digits is to be skipped, the corresponding digit position bank contact accessible to the skip wiper SK of switch KS is grounded. The bank contacts of the code switch KS are connected to a code marking frame CMF as shown, and the different slave code marking relays, when operated, complete circuits for grounding the required terminals of the code marking frame CMF and the banks of the code switch.

Code marking slave relay RA1, upon operating, at contacts 723 and 727 grounds the second bank contacts accessible to wipers X and Z, respectively, in accordance with the code XZ for the first routing digit 5. At contacts 724 and 728 relay RA1 grounds the third bank contacts accessible to wipers X and Z for the second routing digit 5. At contacts 725 and 729 relay RA1 grounds the fourth bank contacts accessible to wipers X and Z for the third routing digit 5. At contacts 721 relay RA1 grounds the fifth bank contact accessible to wiper W for the fourth routing digit 7. At contacts 722 and 726 relay RA1 grounds the sixth bank contacts accessible to wipers W and Y for the fifth routing digit 2. Since only two additional routing digits are required to route the call through the Calgary switching center to Winnipeg, the available sixth routing digit is skipped by relay RA1 grounding, at contacts 720, the seventh bank contact accessible to wiper SK. From the foregoing description the operation of relays R and RA1 has code marked the bank contacts of the code switch KS to control the director to transmit the digits 5, 5, 5, 7 and 2 to establish a connection over the first choice alternate route via Calgary to Winnipeg.

*Dialling the first digit of the office code*

Returning now to the description and at the time when an idle director was seized by the overflow trunk to route the call by way of the first choice Calgary alternate trunk group, it will be remembered that relays HG, NB, SC, A, SD, C, SE, R1, RA1, CO, CK and TO in the overflow trunk are operated and relays E and ST in the director are operated. Shortly after relay CO operated, slow-to-release relay SE restores. At contacts 451 relay SE opens the circuit to the peg count meter C1 and at contacts 452 closes a locking circuit for relay R1 as follows: ground contacts 561 and 551, conductor 485, contacts 452, conductor 489, contacts 532 and 522, and the upper winding of relay R1 to battery. At contacts 453 opens a point in the circuit to the upper winding of relay OF and at contacts 457 opens the original energizing circuit of relay R1 after its locking circuit is closed. It will also be remembered that at contacts 550, the operation of relay CO on seizure of the director, removed the "stop-dial" signal by disconnecting the high resistance winding and substituting the low resistance winding of relay A. The removal of the "stop-dial" signal enables the calling operator's sender to start transmission of the keyed digits in the well-known manner as set forth in the H. W. Balzer application Serial No. 181,508, filed August 25, 1950, now Patent 2,697,134. The overflow trunk is now ready to receive the first incoming digit transmitted over the incoming toll line, or from the operator's toll board, to the selector 3S1 and over the EC pulse lead to relay A in the overflow trunk. The incoming digits transmitted over the incoming toll line comprise the usual three digit Winnipeg office code followed by the four or five digit subscriber's number.

In response to the pulses of the first Winnipeg office code digit, relay A is restored a corresponding number of times. Each time relay A restores a ground pulse is transmitted to relay C and to stepping magnet DSM as follows: ground contacts 612, conductor 488, contacts 461, conductor 487, back contacts 571 of relay A, contacts 582, one path through the upper winding of relay C to battery and the other path by way of contacts 586, conductor 540 and winding of magnet DSM to battery. Slow-to-release relay C is maintained operated over its upper winding during the pulsing period after its original energizing circuit is opened at off-normal springs 822. Magnet DSM energizes to open its interrupter springs 824 and to position its stepping pawl preparatory to stepping the wipers of switch DS. On termination of each pulse, magnet DSM restores to reclose its interrupter springs and to step the wipers one step. Off-normal springs 821 close and off-normal springs 822 and 823 open when the wipers are stepped off-normal. Contacts 821 prepares a point in the restoring circuit of switch DS and also prepares a circuit for grounding skip wiper SK, contacts 822 opens a point in the original operating circuit of relay C and contacts 823 opens the circuit of relay NB which restores. At contacts 621 relay NB opens a point in the circuit to ATB relay 320, at make contacts 622 opens the original circuit of relay SC and at back contacts 622 grounds conductor 520 to prepare a circuit for marking this overflow trunk busy in the banks of the selector, or in the outgoing secondary switch. The wipers 841 to 844, inclusive, of switch DS are accordingly stepped to positions corresponding to the first digit of the Winnipeg office code and shortly thereafter the slow-to-release relay C restores when relay A is maintained operated after transmission of the first office code digit.

At contacts 582 relay C opens the maintaining circuit to relay C to prevent its reoperation on subsequent dialled digits and at contacts 583 completes a circuit for operating relay JC in the director as follows: ground off-normal contacts 821, conductor 500, contacts 583, conductor 700, normal bank contact and SK wiper of code switch KS, high resistance H1, conductor 770, contacts 840, wiper 856, conductor 876, wiper 1530 of director control switch CS and normal bank contact, interrupter bank contacts 1512, conductor 995, lower winding of relay JC to battery. At contacts 584 relay C connects the incoming EC pulse lead to the director incoming pulse relay AD as follows: battery over the EC pulse lead from selector 3S1, contacts 464, conductor 402, contacts 655, conductor 509, contacts 584, conductor 508, contacts 815, wiper 862, conductor 882, and winding of director pulse relay AD to ground. At contacts 585 relay C disconnects the overflow trunk pulse relay A from the EC pulse lead to restore relay A and at contacts 586 opens the stepping circuit to magnet DSM. From the foregoing it will be seen that the first digit of the office code is stored in the digit switch DS after which the incoming pulsing circuit is transferred to the director in order to register the remaining digits of the office code and the subscriber's number in the director.

When relay JC in the director, in response to relay C restoring, is operated to ground conductor 876, marginal relay SP is operated as follows ground, contacts 1116, conductor 1120, contacts 923, conductor 989, bank contacts and wiper 1530, conductor 876, bank contact and wiper 856, contacts 840, conductor 770, winding of relay SP and resistance 780 to battery. At contacts 781 relay SP operates stepping magnet KSM which positions its pawl preparatory to stepping the wipers of code switch KS and operates contacts 752.

When relay JC in the director restores in response to the energization of stepping magnet CSM, ground is removed from conductor 876 to cause relay SP to restore. Relay SP releases stepping magnet KSM to step the wipers of the code switch into engagement with their first bank contacts.

The first bank contact accessible to the Y wiper of the code switch KS is grounded only in case the call is to be routed through exchanges requiring multi-frequency pulsing which will be described more fully hereinafter. The first bank contact accessible to the skip wiper SK of code switch KS is normally grounded with the result that ground through high resistance H1 is connected to conductor 876 to cause director relay JC to reoperate after the director control switch wipers have taken one step from normal into engagement with their first bank contacts. Relay JC in the director now reoperates the stepping magnet of the director control switch CS and grounds conductor 876 to reoperate relay SP which at contacts 781 again operates stepping magnet KSM. The operation of the control switch stepping magnet opens the circuit of relay JC which now restores to release the control switch stepping magnet and to remove ground from conductor 876 to restore relay SP. The director control switch CS now steps to its second position. When relay SP restores stepping magnet KSM restores to step the wipers of the code switch KS to their second positions where the first routing digit is marked in code by relay RA1.

When relay P in the director is operated the code markings of the first routing digit is marked in the banks of the director sending switch SS as follows: ground contacts 723, terminals of CMF and jumper, second bank contact and X wiper of code switch KS, conductor 705, contacts 819, wiper 853 and bank contact, X conductor 873, multipled bank contacts and X wiper 1523 of control switch CS, conductor 1005, back contacts 1042, make contacts 1063, X conductor 1006, multipled fourth, fifth and eighth bank contacts accessible to wiper 1621 and the first bank contact of wiper 1622; from ground contacts 727, terminals and jumper of code marking frame CMF, second bank contact and Z wiper of code switch KS, conductor 709, contacts 830, wiper 855 and bank contact, Z conductor 875, multipled bank contacts and Z wiper 1521, conductor 1003, make contacts 1062, Z conductor 1004, tenth bank contact of wiper 1621 and the third, fifth and sixth bank contacts of wiper 1622. As previously described the first routing digit of the first choice alternate route is the digit 5 and accordingly the fifth bank contacts accessible to both wipers 1621 and 1622 of sending switch SS are simultaneously grounded from the code switch KS in accordance with the code XZ corresponding to digit 5.

Relay JC in the director is operated after transmission of the first routing digit to again ground conductor 876 and reoperate relay SP. At contacts 781 relay SP reoperates stepping magnet KSM. When relay JC restores in response to the operation of stepping magnet CSM ground is removed from conductor 876 to restore relay SP. Relay SP causes stepping magnet KSM to restore and step the wipers of the code switch KSM to their third positions. The second routing digit 5 is coded in the third bank contacts of the X and Z banks of switch KS by contacts 724 and 728 and with director control switch CS in second position and with director relay P operated the banks of the director switch SS are code marked in accordance with the second routing digit 5.

After transmission of the second routing digit by the director relay SP is again operated and restored by director relay JC momentarily grounding conductor 876 as previously described. The operation and release of relay SP causes the code switch KS to step to its fourth position where the third routing digit is marked by contacts 725 and 729. This code marking is extended to be banks of the sending switch SS as described later in the detail director descriptions.

In a similar manner apparent from the foregoing description the third, fourth and fifth routing digits are sequentially marked in the fourth, fifth and sixth bank contacts of the code switch KS. Since a sixth routing digit is not required to route the call through Calgary, the sixth routing digit is skipped. In order to skip this digit contacts 720 of relay RA1 grounds the seventh bank contact and skip wiper SK to in turn ground conductor 876 which causes relay JC to operate thereby causing both the control switch CS and the code switch KS to advance another step as explained later in the operating description of the director.

After transmission of all the routing digits by the director, the code switch KS is advanced to its eighth position and, when relay C restores after the digit switch DS has been dialled in accordance with the first digit of the office code, skip wiper SK of code switch KS and conductor 876 is again grounded to again advance the wipers of both the code switch KS and the control switch CS. The code switch KS is now advanced to its ninth position in which the operated digit switch DS now marks the code switch in accordance with code of the registered first office code digit. The code switch KS remains in this position until the director retransmits the first digit of the office code in a manner to be described more fully hereinafter.

*Director operation*

When the director is seized by an overflow trunk, start relay ST and relay E are operated as previously described Relay ST at contacts 1341 operates stepping magnet PSM over the following circuit: ground contacts 1341, conductor 988, back contacts 1115, conductor 965, contacts 974, trouble-release key TK′, conductor 966 and winding of stepping magnet PSM to battery. Relay ST at contacts 1341 also closes a circuit for operating relay B, which however, is made slow to operate due to the short circuit around its upper winding through back contacts 1114. The circuit for operating relay B may be traced from ground contacts 1341, wiper 1354 of switch PS and its normal or multipled first bank contact, off-normal contacts 1365 of switch TS, conductor 1307, off-normal contacts 1769 of switch DSW, conductor 1550, off-normal contacts 1514 of switch CS, conductor 1102, back contacts 1114 and through the lower winding of relay B to battery.

Magnet PSM, upon operating, at contacts 1356 completes a circuit for operating stepping magnet DSWM of switch DSW, before relay B operates. This circuit may be traced from ground contacts 1111, conductor 1101, closed off-normal contacts 1513, conductor 1306, closed off-normal contacts 1357, contacts 1356, conductor 1273, and winding of stepping magnet DSWM to battery. Magnet DSWM operates to position its stepping pawl and operates interrupter springs 1766.

Shortly after magnets PSM and DSWM are energized the slow-to-operate relay B is operated and at contacts 1112 relay B grounds hold conductor 1100 and completes circuits for both windings of differential relay CU as follows: ground contacts 1112, conductor 1100 through the upper winding of relay CU to battery and the other path through wiper 1526 and engage normal bank contact, conductor 1206 and the lower winding of relay CU to battery. Relay CU, being differential, does not operate when both windings are simultaneously energized. At contacts 1111 relay B opens the circuit to magnet DSM, at contacts 1113 prepares a new holding circuit for DSM, at back contacts 1114 opens the short-circuit of its upper winding and at make contacts 1114 locks itself are both windings in series to ground at contacts 1341. At back contacts 1115 relay B opens the circuit to magnet PSM, at contacts 1116 grounds conductor 1120 and the multipled bank contacts accessible to wiper 1352 of switch PS and also prepares a locking circuit to relay JC. At contacts 1117 relay B opens one of the circuits to the all-director-busy relay ADB and at contacts 1118 and 1119 completes an obvious circuit for operating the pulse generating motor M which operates cams (not shown) to operate pulsing springs 1230 (Fig. 12), 1340 (Fig. 13), and 1330 (Fig. 13) at ten pulses per second.

Stepping magnet PSM restores when its circuit is opened to step wipers 1351, 1352, 1353 and 1354 one step into engagement with their first bank contacts, closes interrupter springs 1355, opens springs 1356, and operates off-normal contacts 1357. The circuit to start relay ST is maintained over wiper 1351 and the busy lamp BL is illuminated over wiper 1352 and grounded conductor 1120. Wiper 1353 connects the ten second pulse lead, which is grounded every ten seconds, to magnet PSM by way of conductor 1104, make contacts 1115, conductor 965, contacts 974, key TK′, and conductor 966 to operate switch PS every ten seconds. Wiper 1354 maintains the original energizing circuit to relay B closed in the first position of switch PS. Interrupter contacts 1355 reclose to prepare the restoring circuit for switch PS and at contacts 1356 opens another point in the circuit of magnet DSM. At off-normal contacts 1357 prepares another point in the restoring circuit for switch PS and opens another point in the energizing circuit of magnet DSM.

Stepping magnet DSWM restores when its circuit is opened to step wipers 1761 to 1765 one step to engage the first set of W, X, Y, Z storage relays and to ground conductor 900 which is effective when multi-frequency pulses are to be transmitted from the director. Back contacts 1766 and off-normal contacts 1767 prepares the restoring circuit for switch DSW, off-normal contacts 1768 grounds conductor 1274 to prepare a circuit for relay CR, and off-normal contacts 1769 opens the original energizing circuit of relay B which is now locked energized.

When relay E was energized in series with the line relay (not shown) in selector 1S5 over conductors 486 and 881 as previously described in response to the seizure of the director by the overflow trunk, contacts 1231 completes a circuit for operating relay EB and contacts 1232 prepares a circuit for relay G. The circuit for relay EB may be traced as follows: ground interrupter contacts 1364, conductor 1280, make contacts 1231, conductor 993, and winding of slow-to-operate relay EB to battery. Relay EB at contacts 961 prepares a circuit for relay MC.

The operation of pulsing springs 1230 for transmitting outgoing pulses over conductor 881 to selector 1S5 by motor M are ineffective at this time because these pulsing springs are short-circuited at contacts 1325 of relay D over conductors 881 and 1285. Pulsing springs 1330 for operating sending switch SS are ineffective at this time because relay D is not operated, and pulsing springs 1340 for operating relay D are ineffective because relay P is not operated. The above described operations take place in response to the seizure of the director by an overflow trunk.

After seizure of the director and after the first digit of the office code is stored in switch DS in the overflow trunk, director relay JC is operated when the overflow relay C restores and grounds conductor 876 and incoming pulse relay AD is operated over the EC pulse lead from selector 3S1 and conductor 882 when overflow relay C restores as previously described.

Relay AD at make contacts 1252 completes a circuit for operating relay CR as follows: ground off-normal contacts 1768 of switch DSW, conductor 1274, contacts 1252, conductor 1293, closed off-normal contacts 1635 of register switch RS, conductor 1272 and winding of relay CR to battery. Slow-to-release relay CR at contacts 1211 and 1212 grounds wipers 1632 and 1631 of switch RS preparatory to coding the subsequent dialled digits and controlling the sequential operations of the storage relay sets accessible to the digit switch DSW. At contacts 1213 relay CR prepares a circuit for operating relay CD and stepping magnet RSM in series and at contacts 1214 prepares a temporary holding circuit for magnet DSM.

Relay JC at contacts 921 grounds conductor 985 by way of contacts 971 for operating stepping magnet CSM of control switch CS, at contacts 922 disconnects ground from wiper 1525, at contacts 923 closes a locking circuit for relay JC until interrupter springs 1512 of switch CS operate, at contacts 923 also grounds conductor 876 to operate the marginal relay SP (Fig. 7) in the overflow trunk, at contacts 924 shorts its upper winding to make relay JC slow-to-release, and at contacts 925 opens a point in the circuit for relay D. The locking circuit for relay JC may be traced from grounded conductor 1120, contacts 923, conductor 989, interrupter contacts 1512, and conductor 995 to relay JC. The circuit for operating marginal relay SP in the overflow trunk may be traced from grounded conductor 1120, contacts 923, conductor 989, multipled bank contacts and wiper 1530, conductor 876 to the overflow trunk, bank contact and wiper 856 of switch SSW, contacts 840, conductor 770, winding of relay SP, and resistance 780 to battery. Marginal relay SP is only operated when direct ground is placed on conductor 876 and will not operate when skip wiper SK of switch KS is grounded due to the high resistance H1.

Stepping magnet CSM of the control switch energizes over the above traced circuit preparatory to stepping its wipers and at interrupter contacts 1512 opens both the original energizing and locking circuits of relay JC to cause it to restore and at interrupter contacts 1511 disconnects ground from wiper 1528.

Relay JC, upon restoring, at contacts 921 opens the circuit to magnet CSM, at contacts 922 prepares a circuit for relay MD, at contacts 923 opens a point in its own locking circuit and the circuit of overflow trunk relay SP which restores, at contacts 924 removes the short-circuit to enable quick operation of JC, and at contacts 925 prepares the circuit to relay D.

Stepping magnet CSM restores, steps its wipers 1521 to 1530 one step, operates off-normal contacts 1513 and 1514, and recloses contacts 1511 and 1512. Off-normal contacts 1513 prepares the restoring circuit for switch CS and off-normal contacts 1514 opens a point in the energizing circuit of relay B. Wipers 1521 to 1524 prepare circuits for code marking the routing digits in the banks of the sending switch SS, wiper 1525 prepares a circuit for relay MD, wiper 1526 opens the previously traced circuit to the lower winding of differential relay CU which now operates over the circuit including its upper winding, wiper 1527 completes a circuit for operating fast-to-operate (but slow-to-release) relay TC over conductor 1203, wiper 1529 prepares a circuit for operating the first trouble lamp (not shown), and wiper 1530 prepares a new circuit for reoperating relay JC.

Relay TC, upon operating, at contacts 1243 prepares a circuit for relay MD. Differential relay CU, upon operating, at contacts 1291 multiples the first twenty-one bank contacts accessible to wiper 1527 by way of contacts 1241 and conductors 1202, 1203 and 1204, and at contacts 1292 completes the circuit for operating relay MD. This circuit may be traced from grounded conductor 1100, back contacts 1311 and 1333, conductor 987, contacts 922, conductor 986, contacts 1292 and 1243, conductor 1201, wiper 1525 and its first bank contact, conductor 1087 and relay MD to battery.

Relay MD at contacts 1041, 1042, and 1043 prepare circuits for operating relays MX, MW and MF, which relays are operated only when the director is to transmit multifrequency pulses. At contacts 1045 prepares a circuit for operating relay JC which circuit is completed when conductor 876 is grounded in the overflow trunk as a result of the skip wiper SK of switch KS engaging its first bank contact which is grounded. The circuit for operating relay JC may be traced as follows: ground first bank contact and skip wiper SK of code switch KS in the overflow trunk, high resistance H1, conductor 770, contacts 840, wiper 856 and bank contact conductor 876, wiper 1530 of director control switch CS and first bank contact, conductor 1075, contacts 1045, conductor 989, contacts 1512, conductor 995 and relay JC to battery.

Relay JC operates and at contacts 921 again energizes stepping magnet CSM, at contacts 922 opens the circuit of relay MD which restores, at contacts 923 again locks itself and again grounds conductor 876 this time over contacts 1045, conductor 1075, first bank contact and wiper 1530 to again operate relay SP in the overflow trunk, at contacts 924 again shorts its upper winding, and at contacts 925 prepares a circuit for relay D. Relay MD, upon restoring at back contacts 1041, 1042 and 1043 prepares circuits for code marking the banks of the sender switch SS in accordance with the routing digits, and at 1045 opens the last traced energizing circuit of relay JC as well as the circuit for operating relay SP of the overflow trunk over conductor 876 and second bank contact of wiper 1530.

Stepping magnet CSM energizes and at contacts 1512 opens the locking circuit of relay JC which restores slowly due to its short-circuited upper winding. Relay JC, upon restoring, opens the circuit of magnet CSM at contacts 921 to cause magnet CSM to restore and step the wipers of the control switch CS to their second bank contacts and at contacts 925 prepares the circuit to relay D.

When wipers 1521 to 1524 engage their second bank contacts, the director is in a position to receive the code marking of the first routing digit from the overflow trunk. Wiper 1525 completes a circuit for operating relay P, wiper 1529 prepares a circuit for the second trouble lamp (not shown) and wiper 1530 prepares a circuit for operating relay JC only in case the first routing digit is to be skipped. The circuit for operating relay P may be traced as follows: grounded conductor 1100, back contacts 1311 and 1333, conductor 987, contacts 922, conductor 986, contacts 1292 and 1243, conductor 1201, wiper 1525 and second bank contact, conductor 901 and winding of relay P to battery. Relay P at make contacts 1061, 1063, 1064 and 1062 marks the banks of the sending switch SS with the W, X, Y, Z code of the first routing digit marked in the second position of the banks of the code switch KS in the overflow trunk. At contacts 1065 relay P completes a circuit for the slow-to-operate time relay TB and at contacts 1066 completes a circuit for operating relay D.

Time relay TB has two windings wound in opposing directions and is arranged in a time circuit so that the relay operates only after two seconds delay. It will be noted that ground from conductor 1100 is connected over wiper 1363 and conductor 1092 through resistance R11 to make contacts 1065 of relay P and to resistance R10 and battery to provide a so-called voltage divider to limit the current flow over contacts 1065 to the condenser CT and the lower winding of relay TB. When contacts 1065 close, condenser CT is gradually charged causing current flow in the upper winding of relay TB, which is in opposition to the current flow in the lower winding with the result that relay TB does not fully operate until condenser CT is fully charged whereupon the lower winding is then effective to operate the contacts of relay TB. The values of the resistances R10, R11, the windings of relay TB and condenser CT are such that relay TB will not operate until a lapse of two seconds after its circuit at make contacts 1065 is closed. When relay P closes its back contacts 1065 the condenser CT is discharged through resistance R100 so that the two second time interval is again prepared and effective when relay P is reenergized. Relay P is operated and released for each digit transmission and since the normal time for each digit transmission is much less than two seconds, relay TB normally would not operate and therefore relay TB is not operated unless trouble of two seconds duration, or over, occurs.

Relay D is energized in response to the operation of relay P at a time when the motor pulsing springs 1340 are closed as follows: grounded conductor 1100, contacts 1232, conductor 1283, off-normal contacts 1367, motor interrupter contacts 1340, conductor 1275, back contacts 1261, conductor 1276, contacts 1324, conductor 963, contacts 925, conductor 964, back contacts 1267, conductor 1077, contacts 1066, conductor 1078, back contacts 1316, and winding of relay D to battery. At contacts 1323 relay D closes a locking circuit for itself from grounded conductor 1100 to conductor 963 and thence over the remainder of the original circuit of relay D before its original circuit is opened at contacts 1324. At contacts 1322 relay D prepares circuits for relays J and K and at contacts 1325 opens the short around the motor pulsing contacts 1230 to enable pulsing contacts 1230 to transmit outgoing pulses to the selector 1S5 over conductors 881 and 486. At contacts 1321 relay D closes a circuit over motor pulsing contacts 1330 for operating stepping magnet SSM of the sender switch as follows: grounded conductor 1100, make contacts 1321, conductor 1301 and winding of magnet SSM to battery. Impulse transmission of the first routing digit now takes place and at the same time the director may receive the remaining digits of the dialled office code and the subscriber's number.

*Sending of routing digits*

The routing digits are marked in the banks of the overflow code switch KS in accordance with the available route. As previously described the code switch KS is in second position, the control switch CS is in second position and as a result of the operation of relay P the fifth bank contacts accessible to both wipers 1621 and 1622 of sending switch SS are grounded with the code marking of digit 5 (XZ).

The motor pulsing contacts 1230, 1330, and 1340 are operated in synchronism to open their respective circuits. Contacts 1340 is utilized for operating relay D and is ineffective while relay D is locked over contacts 1323. Pulsing contacts 1230 is effective to transmit outgoing pulses to selector 1S5 after relay D removes the short at contacts 1325. The pulsing circuit for operating selector 1S5 may be traced from ground through the line relay (not shown) of selector 1S5, conductor 486, contacts 657, conductor 602, contacts 814, wiper 861 and bank contact, conductor 881, now open pulsing contacts 1230, and winding of relay E to battery. Each time pulsing contacts 1230 are opened the line relay of the selector 1S5 is restored to operate the selector in the well-known manner. Pulsing contacts 1330 transmit corresponding pulses to operate sending switch SS as follows: grounded conductor 1100, make contacts 1321, conductor 1301 and winding of stepping magnet SSM to battery. Stepping magnet SSM is energized when pulsing contacts 1330 close to position its stepping pawl and to operate interrupter springs 1623. When contacts 1330 open, simultaneously with pulsing contacts 1230, magnet SSM restores to step its wipers, reclose springs 1623, and operate off-normal contacts 1624 and 1625. Selector 1S5 and sending switch SS are simultaneously operated for each interruption of the pulsing springs and on the fifth step of switch SS wipers 1621 and 1622 simultaneously engage the bank contacts, grounded over conductors 1006 and 1004, for operating shunt-field relay F. As is well known shunt-field relay F will not operate its contacts when only one of its windings alone is energized. Relay F at contacts 1611 completes circuits to both windings of differential relay J and to only the lower winding of differential relay K. These circuits may be traced from grounded conductor 1100, contacts 1322, conductor 1310, contacts 1611, conductor 1210, one circuit extending by way of back contacts 1315 and upper winding of relay J to battery and the second circuit extending by way of contacts 1263 and lower windings of relays K and J to battery. Relay J, being differential, will not operate when both windings are energized but relay K, since only its lower winding is energized, now operates.

Relay K at back contacts 1261 opens the original energizing circuit of relay D and at front contacts 1261 prepares a new circuit for relay D. At contacts 1262 relay K closes a new circuit for the lower windings of relays K and J before contacts 1263 open and at contacts 1264 closes a new circuit for the upper winding of relay J from grounded conductor 1100, off-normal contacts 1625 of switch SS, conductor 1305, back contacts 1312, conductor 1278, contacts 1264, conductor 1210, back contacts 1315 and upper winding of relay J to battery. At contacts 1266 relay K completes a new circuit for operating relay JC from grounded conductor 1120, back contacts 1313, conductor 997, contacts 1266, conductor 995, and lower winding of relay JC to battery. At back contacts 1267 relay K opens the locking circuit of relay D which now restores and at front contact 1267 prepares a new circuit for relay D, and at contacts 1268 closes a shunt around the pulsing contacts 1230 to prevent transmission of subsequent pulses to the selector line relay, thereby stopping the sending after five outgoing impulses have been sent.

Relay D, upon restoring, at front contacts 1321 opens the pulsing circuit to stepping magnet SSM and completes the restoring circuit of switch SS as follows: ground off-normal contacts 1624, interrupter contacts 1623, conductor 1302, back contacts 1321, conductor 1301 and winding of stepping magnet SSM to battery. SSM operates its interrupter springs 1623 to open its own circuit with the result that stepping magnet intermittently steps its wipers to normal at which time off-normal springs 1624 and 1625 open and relay F restores.

Relay JC, upon operating, at contacts 921 again operates stepping magnet CSM, at contacts 922 opens the circuit to relay P which restores, at contacts 923 again completes its locking circuit and again grounds conductor 876 to operate relay SP in the overflow trunk, and at contacts 925 opens a further point in the circuit to relay D.

Relay P, upon restoring, at make contacts 1061 to 1064 disconnects code marking of the routing digits from the banks of the sending switch, and at contacts 1065 again opens the circuit of time relay TB before relay TB is operated.

Off-normal springs 1624, upon opening, stops the wipers of sending switch SS in normal position and off-normal contacts 1625 opens the circuit through the upper winding of differential relay J thereby causing relay J to operate since its lower winding alone is now energized. Relay J at back contacts 1311 opens a further point in the circuit of relay P, at front contacts 1311 grounds the fifth bank contact of wiper 1621, at front contacts 1313 grounds the fifth bank contact of wiper 1622, and at contacts 1317 shunts pulsing springs 1230 over conductors 881 and 1285 to prevent transmission of outgoing pulses during the interdigital pause.

Stepping magnet CSM operates its interrupter springs 1512 to open the circuit to relay JC which restores after an interval. Relay JC at contacts 923 opens a point in its own locking circuit and disconnects ground from conductor 876 to cause overflow trunk relay SP to restore and step the overflow code switch KS to its third position, which is marked in code in accordance with the second routing digit. At contacts 921 relay JC restores magnet CSM to step the wipers of control switch CS to their third bank contacts in order to control the sending of the second routing digit.

*Inter-digital pause*

In order to provide a time interval, commonly referred to as the inter-digital pause, between transmission of successive outgoing routing digits, relay D is reoperated, when relay JC restores, to again operate sending switch five steps to provide a predetermined pause between digits. Relay D is reoperated from grounded conductor 1100, contacts 1261, conductor 1276, contacts 1324, conductor 963, contacts 925, conductor 964, make contacts 1267, conductor 1284, make contacts 1316, and winding of relay D to battery. Relay D locks itself through contacts 1323 before opening contacts 1324 and at contacts 1321 again closes the pulsing circuit through pulsing contacts 1330 to stepping magnet SSM. At contacts 1324 relay D opens one of the shunt circuits around the outgoing pulsing springs 1230, such springs, however, still being shunted at contacts 1268 and 1317.

The operation of relay J has grounded the fifth bank contacts of wipers 1621 and 1622 for the purpose of operating shunt-field relay F after the sending switch SS takes five steps in order to provide an inter-digital pause between successive outgoing digits. Stepping magnet SSM is intermittently operated over pulsing contacts 1330 to step the wipers 1621 and 1622 five steps into engagement with their fifth bank contacts at which time circuits for both windings of relay F are completed as follows: the first circuit extending from grounded conductor 1120, make contacts 1313, conductor 1074, back contacts 1062, Z conductor 1004, fifth bank contact and wiper 1622, and left hand winding of relay F to battery; and the second circuit extending from grounded conductor 1100, make contacts 1311, conductor 1007, back contacts 1063, X conductor 1006, fifth bank contact and wiper 1621, and right hand winding of relay F to battery. Relay F at contacts 1611 completes a circuit through the upper winding of relay K and since both windings of differential relay K are now energized relay K restores its operated contacts. At contacts 1267 relay K opens the locking circuit of relay D which restores, closes a circuit through the lower windings of relays K and J via off-normal contacts 1625, front contacts 1312, 1265 and 1263 and for the upper winding of K via make contacts 1315, and at contacts 1268 removes another shunt from pulsing contacts 1230. Relay D restores and at contacts 1321 opens the pulsing circuit to stepping magnet SSM and closes the self-restoring circuit to SSM for restoring switch SS to normal. Relay D at contacts 1325 again shorts pulsing contacts 1230. Sending switch SS restores to normal in the same manner as previously described and at off-normal contacts 1625 opens all circuits to relays K and J thereby causing relay J to restore. Relay J at make contacts 1311 and 1313 removes the ground marking from the banks of switch SS to remove the inter-digital pause marking, at contacts 1315 prepares a circuit for the upper winding of relay J, at contacts 1316 prepares a circuit for relay D, at contacts 1317 removes one of the shunt circuits around pulsing contacts 1230 and at back contacts 1311 again completes the circuit for operating relay P this time through the third bank contact accessible to wiper 1525 of switch CS.

*Second routing digit*

When relay P reoperates in response to the deenergization of relay J, the director is in a condition to initiate the sending of the second routing digit registered in the third position of the overflow code switch KS. The second routing digit is transmitted in the same manner as described for the transmission of the first routing digit. Relay P at contacts 1061 to 1064 marks the code of the second routing digit in the banks of sending switch SS, at contacts 1065 again recloses the circuit to time relay TB to restart the time interval, and at contacts 1066 recloses the original energizing circuit for relay D over contacts 1232, 1367, 1340, 1261, 1324, 925, 1267, 1066 and 1316. Relay D at contacts 1324 locks itself operated, at contacts 1322 prepares the previously traced circuits for relays K and J, at contacts 1325 removes the last short from around pulsing contacts 1230, and at contacts 1321 closes the pulsing circuit, including pulsing contacts 1330, for operating stepping magnet SSM of the sending switch SS.

In the same manner as previously described pulsing contacts 1230 transmits pulses over conductors 881 and 486 to selector 1S5, which has now switched through and seized a second selector, such as selector 2S2 (Fig. 2), to operate the line relay (not shown) of selector 2S2, and pulsing contacts 1330 operate the stepping magnet SSM until wipers 1621 and 1622 simultaneously engage a grounded bank contact at which time circuits for operating shunt-field relay F are completed. Since the second routing digit for this first choice alternate route is the digit 5 the following circuits are completed for operating relay F: ground contacts 724, terminals and jumper of code marking frame CMF, third bank contact and X wiper of code switch KS, conductor 705, contacts 819, X wiper 853 and bank contact, X conductor 873, third bank contact and X wiper 1523 of control switch CS, conductor 1005, back contacts 1042, make contacts 1063, X conductor 1006, fifth bank contact and wiper 1621 of sending switch SS, and right-hand winding of shunt-field relay F to battery; the other circuit extends from ground contacts 728, terminals and jumper of CMF, third bank contact and Z wiper of code switch KS, conductor 709, contacts 830, wiper 855 and bank contact, Z conductor 875, third bank contact and Z wiper 1521 of control switch CS, conductor 1003, make contacts 1062, Z conductor 1004, fifth bank contact and wiper 1622 of switch SS, and left-hand winding of relay F to battery.

In the same manner as previously described relay F at contacts 1611 completes circuits for differential relays K and J, causing relay K alone to operate as only the lower winding of relay K is energized while both windings of differential relay J are simultaneously energized. Relay K operates and shunts pulsing springs 1230 at contacts 1268 to prevent transmission of further outgoing pulses to selector 2S2. At contacts 1267 relay K opens the locking circuit of relay D to cause relay D to restore and at contacts 1266 completes the circuit for reoperating relay JC. Relay D, upon restoring, at contacts 1321 opens the pulsing circuit to SSM, closes the restoring circuit for restoring switch SS to normal and shunts pulsing contacts 1230 at contacts 1325 as previously described. Sending switch SS restores to normal opening the circuits to relay F and opening off-normal contacts 1624 and 1625. Relay JC reoperates and at contacts 923 again locks itself and again grounds conductor 876 to operate overflow trunk relay SP which in turn operates the stepping magnet KSM of the code switch KS. At contacts 921 relay JC reoperates the stepping magnet CSM of the control switch CS and at contacts 922 opens the circuit of relay P which restores. Relay P restores to disconnect the banks of the sending switch SS from control switch CS at contacts 1061 to 1064 and at contacts 1065 opens the circuit to time relay TB before relay TB can fully operate. Stepping magnet CSM energizes in response to the operation of relay JC and at interrupter springs 1512 opens the locking circuit of relay JC to cause JC to restore after an interval. When sending switch SS returns to normal and opens off-normal contacts 1625 the circuit through the upper winding of differential relay J is opened and relay J now operates since its lower winding alone is now energized. Relay J, upon operating, grounds the fifth bank contacts in both banks of switch SS to mark the inter-digital pause as previously described and at contacts 1317 again shunts pulsing contacts 1230. Relay JC restores when stepping magnet CSM is energized and at contacts 923 disconnects ground from conductor 876 to cause overflow trunk relay SP to restore and step the wipers of the code switch to their fourth positions to mark the code switch with the code of the third routing digit. At contacts 921 relay JC restores stepping magnet CSM to step the wipers of the control switch to their fourth positions for controlling the sending of the third routing digit, and at contacts 925 reoperates relay D over operated contacts of relays K and J to initiate the operation of switch SS to provide the inter-digital pause between transmission of the second and third routing digits. Relay D locks over contacts 1323 and closes the pulsing circuit to SSM over contacts 1321. Magnet SSM steps the wipers of the switch SS until both wipers 1621 and 1622 simultaneously engage grounded bank contacts, such bank contacts being the fifth bank contacts marked by the operation of relay J at contacts 1311 and 1313. Relay F is operated as previously described when the inter-digital pause marking is found by switch SS. Relay F at contacts 1611 completes the previously traced circuit over contacts 1322, 1611 and 1315 for energizing the upper winding of differential relay K to cause it to restore. Relay K, upon restoring, at contacts 1267 opens the locking circuit to relay D which restores and at contacts 1268 opens a shunt from impulsing contacts 1230. Relay D, upon restoring, at contacts 1321, again closes the self-restoring circuit for switch SS and at contacts 1325 again shunts pulsing contacts 1230. Sending switch SS and relay F restores and off-normal contacts 1625 open all the circuits to differential relays K and S causing relay J to restore. Relay J, upon restoring, at back contacts 1311 reoperates relay P, at back contacts 1311 and 1313 removes the inter-digital marking from the SS switch banks, and at contacts 1317 removes one of the shunts from pulsing contacts 1230.

*Third routing digit*

When relay P reoperates in response to the restoration of relay J, the director is in a condition to initiate the sending of the third routing digit registered in the fourth position of the overflow trunk code switch KS. The third routing digit is transmitted in the same manner as described for the first and second routing digits and this third routing digit now operates the third selector, such as selector 3S2 (Fig. 2), to select an idle trunk extending to Calgary. Since these detail circuits were described previously, only a brief description will now be given of the operations performed during the transmission of the third routing digit and the subsequent inter-digital pause. Relay P, upon operating, closes the third routing digit code markings from the fourth set of bank contacts of the overflow code switch KS to the banks of the sending switch SS and operates relay D. Relay D locks, operates the sending switch SS and opens contacts 1325 to remove the shunt from pulsing contacts 1230. Sending switch SS operates step-by-step and when both its wipers reach the bank contacts which are grounded with the code of the third routing digit the shunt-field relay F operates. At the same time that the sending switch SS is operated pulsing contacts 1230 transmit outgoing pulses to operate the third selector 3S2. Relay F, operating, causes differential relay K to operate. Relay K opens the locking circuit to relay D which restores, operates relay JC, and shunts pulsing contacts 1230 to stop outgoing pulse transmission. Relay D restores closing the restoring circuit for sending switch SS and closing shunt around pulsing contacts 1230. Relay F restores. Relay JC locks, operates overflow relay SP, energizes stepping magnet CSM, and opens the circuit of relay P which restores. Relay P removes the code marking of the third routing digit from the banks of the sending switch. When the sending switch SS returns to its normal position differential relay J operates. The energization of stepping magnet CSM causes relay JC to restore after an interval and the operation of relay J marks the banks of the sending switch in accordance with the time interval set for the inter-digital pause. Relay JC, upon restoring, causes the overflow relay SP to restore to step the code switch KS to its fifth position to mark the fourth routing digit, restores stepping magnet CSM to step the control switch to its fifth position, and reoperates relay D to initiate the inter-digital pause. Relay D closes the operating circuit to sending switch SS which steps its wipers to the marked fifth bank contacts at which time relay F operates. Relay F causes differential relay K to restore and the latter relay causes relay D to restore. Relay D restores causing the sending switch SS to restore to normal. Relay F and sending switch SS restore and relay J releases when sending switch SS reaches its normal position.

Relays MA and MC are only operated in case the director is to transmit multi-frequency pulses and, since these relays are not operated in this example, a circuit may be traced from the fifth bank contact engaged by wiper 1528 for operating stepping magnet CSM as follows: ground contacts 1014 and 1024, conductor 1073, fifth bank contact and wiper 1528, conductor 983, interrupter contacts 1511, conductor 984, contacts 971, conductor 985 and winding of stepping magnet CSM to battery. Magnet CSM energizes and opens its own circuit at contacts 1511 whereupon magnet CSM restores and steps the wipers of switch CS to their sixth bank contacts. The control switch CS therefor automatically steps from its fifth position to its sixth position in case no multi-frequency pulses are to be transmitted.

In this case a new circuit for operating relay P may be traced as follows: grounded conductor 1100, back contacts 1311 and 1333, conductor 987, contacts 922, conductor 986, contacts 1292 and 1243, conductor 1201, wiper 1525 and its sixth bank contact connected to conductor 902, back contacts 911, conductor 901, and winding of relay P to battery.

*Fourth routing digit*

When relay P reoperates in response to switch CS stepping to its sixth position, the director is in condition to initiate the sending of the fourth routing digit registered in the fifth position of the overflow code switch KS. The fourth and fifth routing digits are used to route the call through Calgary to engage a trunk line extending to Winnipeg and for purposes of illustration the fourth and fifth routing digit are assumed to be the digits 7 and 2. The code marking for the fourth routing digit 7 is marked on the fifth bank contact of the W wiper by contacts 721 of relay RA1. As previously described relay P causes relay D to operate and relay D and the pulsing contacts 1330 and 1230 cause the sending switch SS to make seven steps and to transmit seven outgoing pulses. The code marking for digit 7 (*w*) comprises ground from contacts 721 connected to the seventh bank contact of wiper 1621 and the direct ground connection on the seventh bank contact of wiper 1622. When sending switch SS reaches its seventh position relay F operates from the markings in the banks of switch SS. The same cycle of relay operations takes place during the transmission of the fourth routing digit and the inter-digital pause, the code switch KS is advanced to its sixth position to mark the fifth routing digit, and the control switch CS is advanced to its seventh position as previously described.

The fifth routing digit 2 is now transmitted in a manner apparent from the foregoing description. The code marking for this digit extends from ground contacts 722 and the sixth bank contact of the W wiper of code switch KS to the second bank contact of sending switch SS and from ground contacts 726, the sixth bank contact of the Y wiper of code switch KS and the second bank contact of sending switch SS. After the inter-digital pause operations take place, following the transmission of the fifth routing digit, the overflow code switch is operated to its seventh position to mark the sixth routing digit and the director control switch is operated to its eighth position.

*Sixth routing digit*

Since only five routing digits are required to route the call through Calgary to Winnipeg trunks, the sixth routing digit in this instance is skipped and relay RA1 at contacts 720 grounds the skip wiper SK of switch KS in its seventh position to cause the director to skip the sending of the sixth routing digit. In this case relay JC is operated from ground contacts 720, terminals and jumper of CMF, seventh bank contact and skip wiper SK, resistance H1, conductor 770, contacts 840, wiper 856 and bank contact, conductor 876, wiper 1530 and its eighth bank contact, contacts 1512, conductor 995, and lower winding of relay JC to battery. Relay JC at contacts 921 energizes stepping magnet CSM and magnet CSM at contacts 1512 opens the circuit of relay JC. Relay JC at contacts 923 again operates overflow relay SP to control the code switch KS. Relay JC restores to release stepping magnet CSM and relay SP. Relay SP, restoring, causes the code switch KS to step to its eighth position and magnet CSM steps the wipers of the control switch CS to their ninth positions. The lower winding of differential relay CU is now energized over the following circuit: grounded conductor 1100, wiper 1526 and ninth bank contact, conductor 1206 and lower winding of relay CU to battery.

If, by this time, the first digit of the office code has been dialled to set overflow digit switch DS, then the eighth bank contact of the skip wiper SK is grounded to operate relay JC from off-normal contacts 821 of switch DS, conductor 500, contacts 583, conductor 700, eighth bank contact and skip wiper SK, high resistance H1 and thence over the previously traced circuit, this time including the ninth bank contact and wiper 1530 of control switch CS, to relay JC. Relay JC and stepping magnet CSM cooperate as previously described to step the wipers of the control switch CS to their tenth position and relay JC again operates and restores relay SP to cause the overflow code switch KS to step to its ninth position which is marked in code by switch DS with the first dialled office code digit.

The director with control switch CS in position ten is arranged to delay the sending of the dialled office code digits until all three office code digits have been registered, the first dialled office code digit being registered in the banks of the overflow trunk digit switch DS and the second and third dialled office code digits being stored in the storage relay sets, such as shown in Fig. 17. This delay is accomplished by maintaining differential relay CU energized over both its windings. As long as relay CU is energized over both its windings contacts 1292 are maintained open and relay P cannot operate to initiate impulse transmission. The circuit for energizing the lower winding of relay CU may be traced from grounded conductor 1100, wiper 1526 and tenth bank contact, conductor 900, first and second bank contacts and wiper 1765 of digit switch DSW, conductor 1206 and lower winding of differential relay CU to battery. Wiper 1765 of digit switch DS is not stepped to its third bank contact until after the third office code digit is registered.

*Dialling the second office code digit*

It was previously described how the first office code digit was registered in the digit switch DS in the overflow trunk and how the incoming pulsing circuit was transferred to the incoming pulse relay AD in the director. A description will now be given of the operations performed in response to the dialling of the second and third office code digits and the subscriber's number. In the director it will be remembered that pulse relay AD is operated, that the digit switch DSW has been operated to its first position to engage the first set of storage relays, such as W, X, Y and Z, and that slow-to-release relay CR has been operated as previously described. Assuming the Winnipeg second office code digit is the digit 8, then the circuit to relay AD is interrupted eight times causing eight deenergizations and energizations of pulse relay AD. Each time relay AD deenergizes a circuit may be traced for operating relay CD and stepping magnet RSM as follows: ground off-normal contacts 1768, conductor 1274, back contacts 1251, contacts 1213, winding of slow-to-release relay CD, conductor 1209 and winding of stepping magnet RSM of the register switch RS. Each time relay AD reenergizes the circuit to relay CD and stepping magnet RSM is opened. Relay CD, being slow-to-release, maintains its contacts closed during operations of the pulsing relay AD while stepping magnet RSM steps its wipers one step on each deenergization. Since magnet RSM is operated and restored eight times the wipers 1631 and 1632 are operated to engage their eighth bank contacts. On the first step of the register switch RS off-normal contacts 1634 close to prepare its restoring circuit and at off-normal contacts 1635 opens the original energizing circuit of relay CR which is now held operated from contacts 1221 of relay CD. Relay CD, upon operating, at back contacts 1221 disconnects ground from wipers 1631 and 1632 of register switch RS during their stepping operations, at make contacts 1221 holds relay CR energized, and at contacts 1222 completes a circuit for energizing stepping magnet DSWM from ground contacts 1113, conductor 1110, contacts 1222, conductor 1273, and winding of stepping magnet DSWM to battery. Magnet DSWM operates closing a locking circuit for itself as follows: grounded conductor 1110, contacts 1214, conductor 1205, closed interrupter contacts 1766 and winding of DSWM to battery.

A short interval after stepping the register switch RS, relay CD restores and at make contacts 1221 opens the circuit to slow-to-release relay CR while at back contacts 1221 relay CD grounds both wipers 1631 and 1632 over make contacts 1212 and 1211 and conductors 1207 and 1208 during the release time of relay CR. Since the wipers 1631 and 1632 are in their eighth positions a circuit may now be traced from grounded wiper 1632 and its eighth bank contact, conductor 1602, X wiper of digit switch DSW in first position, conductor 1502 and winding of relay X of the first set of storage relays to battery. Relay X at contacts 1721 completes a locking circuit for itself to grounded conductor 1120.

A short interval after relay CD restores, slow-to-release relay CR restores and at make contacts 1211 and 1212 disconnects ground from the wipers of the register switch. At contacts 1214 relay CR opens the locking circuit of stepping magnet DSWM to cause it to release and step the wipers of the digit switch to their second bank contacts. At contacts 1213 opens the pulsing circuit to the register switch and at back contacts 1212 completes the circuit for restoring the register switch to its normal position. This circuit may be traced as follows: ground back contacts 1221 and 1212, conductor 1271, off-normal contacts 1634, interrupter contacts 1633 and winding of stepping magnet RSM to battery. Magnet RSM at contacts 1633 interrupts its own circuit to restore the register wipers 1631 and 1632 to normal at which time the off-normal contacts 1634 open the restoring circuit in the well known manner. Off-normal contacts 1635 close when switch RS reaches normal to reenergize relay CR from ground at contacts 1768, conductor 1274, contacts 1252, conductor 1293, contacts 1635, conductor 1272 and relay CR to battery. In response to dialling the second office code digit, the register switch RS was set in a corresponding position to operate the X storage relay in the first set which locks up, after which the register switch restores to normal in readiness to receive the next incoming digits, and the digit switch DSW is advanced to its second position the bank contacts which are connected to the second set of storage relays (not shown).

The third office code digit operates relay AD, relay CD, and the register switch RS, after which relay CD restores to operate the storage relays of the second set in accordance with the third office code digit. When relay CR restores the digit switch DSW is advanced to connect to the succeeding storage relay set and the register switch RS is restored to normal in the same manner as described for the second office code digit.

In a similar manner the five digits of the subscriber's number are registered in corresponding storage relay sets; the digit switch DSW advancing one step after each digit registration and the register switch being operated and restored for each digit received.

When the digit switch DSW has advanced beyond its second position, or after all the office code digits have been registered, the circuit including conductors 900 and 1206 and wipers 1526 and 1765 through the lower winding of differential relay CU is opened with the result that relay CU now closes contacts 1292 to reoperate relay P over the previously traced circuit, this time including the tenth bank contact accessible to wiper 1525 of control switch CS.

*Retransmitting first office code digit*

When relay P reoperates after transmission of the routing digits and after registration of the office code digits, the director is in condition to initiate the retransmission of the three office code digits. The code switch KS in the overflow trunk is in its ninth position and the overflow digit switch DS is in its ninth position, having registered the first office code digit 9 to ground the Y conductor 874 by way of ground ninth bank contact and wiper 843, conductor 708, ninth bank contact and Y wiper of code switch KS, conductor 707, contacts 820, wiper 854, and bank contact to Y conductor 874. This ground extends over conductor 874, tenth bank contact and Y wiper 1522, conductor 1008, back contacts 1043, contacts 1064, conductor 1009 to the ninth bank contact of sending switch SS accessible to wiper 1621. The ninth bank contact accessible to wiper 1622 is permanently grounded and now, since, only the ninth bank contacts accessible to both wipers 1621 and 1622 are simultaneously grounded, the first office code digit nine is now registered in the banks of the sending switch SS. Relay P in addition to marking the banks of the sending switch in accordance with the code of the first office code digit also recloses the circuit to time relay TB at contacts 1065 to restart the time interval, and at contacts 1066 recloses the circuit for operating relay D. Relay D at contacts 1324 locks itself, at contacts 1322 prepares the circuits to relays K and J, at contacts 1323 removes the short from around pulsing contacts 1230, and at contacts 1321 closes the pulsing circuit, including pulsing contacts 1330, for operating the stepping magnet SSM of the sending switch as previously described.

In the same manner as previously described pulsing contacts 1230 transmit pulses over conductors 881 and 486 through switches 1S5, 2S2, 3S2 (Fig. 2) and the switches in Calgary (indicated in Fig. 1) to the seized trunk connecting Calgary and Winnipeg. Pulsing contacts 1330 operate stepping magnet SSM until wipers 1621 and 1622 each simultaneously engage a grounded bank contact, in this case the ninth bank contact, at which time shunt field relay F is operated. Relay F at contacts 1611 completes circuits for differential relays K and J, causing relay K alone to operate as only its lower winding is energized while both windings of relay J are energized. Relay K operates contacts 1268 to shunt pulsing springs 1230 to stop further pulse transmission. At contacts 1267 relay K opens the locking circuit of relay D and at contacts 1266 reoperates relay JC. Relay D, upon restoring, opens the pulsing circuit to magnet SSM at contacts 1321, closes the restoring circuit for restoring switch SS to normal and shunts pulsing contacts 1230 at contacts 1325 as previously described. Sending switch SS restores to normal opening circuits to relay F and opening off-normal contacts 1624 and 1625. Relay JC reoperates and at contacts 923 again locks itself and again grounds conductor 876 to operate overflow trunk relay SP which in turn operates stepping magnet KSM of code switch KS. At contacts 921 relay JC reoperates stepping magnet CSM and at contacts 922 opens the circuit of relay P which restores. Relay P restores to disconnect the banks of the sending switch SS from the control switch at contacts 1061 to 1064 and at contacts 1065 opens the circuit to time relay TB before relay TB can fully operate. Stepping magnet CSM energizes in response to the operation of relay JC and at interrupter springs 1512 opens the locking circuit of relay JC to cause relay JC to restore. When the sending switch reaches normal position and opens off-normal contacts 1625 the circuit through the upper winding of relay J is opened and relay J now operates. Relay J grounds the fifth bank contacts in both banks of the sending switch SS to mark the inter-digital pause, and again shunts pulsing contacts 1230. Relay JC restores when stepping magnet CSM is energized and at contacts 923 disconnect ground from conductor 876 to cause the overflow relay SP to restore and step the wipers of the code switch KS to its tenth position. At contacts 921 relay JC restores stepping magnet CSM to step the wipers of the control switch CS to their eleventh position for controlling the retransmission of the second office code digit, and at contacts 925 reoperates relay D over operated contacts of relay K and J to reinitiate the operation of the sending switch SS to provide the inter-digital pause between the transmission of the first and second office code digits. Relay D locks over contacts 1323 and closes the stepping circuit to magnet SSM over contacts 1321. Magnet SSM steps the wipers of switch SS until both wipers 1621 and 1622 simultaneously engage grounded contacts marked by relay J at which time relay F operates. Relay F at contacts 1611 completes the previously traced circuit for energizing the upper winding of differential relay K to cause it to restore. Relay K at contacts 1267 opens the locking circuit to relay D and shunts pulsing contacts 1230 at contacts 1268. Relay D at contacts 1321 again closes the self-restoring circuit for switch SS and at contacts 1325 again shunts pulsing contacts 1230. Sending switch SS and relay F restore and off-normal contacts 1625 open all the circuits to differential relays K and J causing relay J to restore. Relay J at contacts 1311 reoperates relay P, removes the inter-digital marking from the banks of the sending switch SS and removes one of the shunts around contacts 1230. When relay P reoperates in response to relay J restoring, the director is in condition to retransmit the second office code digit which is registered in the first relay storage set.

*Retransmission of second office code digit*

The retransmission of the second office code digit is similar to that described for the transmission of the first office code digit except that the code markings for this second digit is registered in the first set of storage relays. With the code switch CS in eleventh position, the wipers 1521 to 1524 are connected over conductors, 1504, 1503, 1502 and 1501 to the first set of storage relays and, since this storage relay set has been operated in accordance with the code of the second office code digit, one or two of the conductors 1501 to 1504 are grounded. For example, it was assumed that the second office code digit was eight and that relay X of this first relay set operated and locked to grounded conductor 1120. Contacts 1721 of relay X in addition to completing a locking circuit for relay X also grounds X conductor 1502 thereby grounding the eleventh bank contact engaged by wiper 1523. When relay P reoperates this ground is extended to the upper bank of the sending switch from wiper 1523 over conductor 1005, contacts 1042, and 1063, X conductor 1006 to the eighth bank contact. With the eighth bank contact in the lower bank of the sending switch permanently grounded the code of digit 8 is now marked in the banks of the sending switch. As previously described relay P causes relay D to operate and relay D and pulsing contacts 1330 and 1230 cause the sending switch SS to take eight steps and to retransmit the eight outgoing pulses of the second office code digit. When the sending switch SS reaches its eighth bank contacts relay F is operated. The same cycle of relay operations take place during the transmission of the second office code digit and the interdigital pause and the control switch CS is advanced to its twelfth position to control the transmission of the third office code digit.

The third office code digit is now transmitted in a manner similar to that described for the transmission of the second office code digit. The code, for marking the third office code digit, is dependent upon the operated relay or relays in the second storage relay set since the operated storage relays ground one or more code marking conductors, similar to conductors 1501 to 1504, connected to the twelfth bank contacts accessible to wipers 1521 to 1524 of the control switch CS. When the relay P reoperates, this code marking is extended to the banks of sending switch SS to control the transmission of the third office code digit. After retransmission of this third digit the sending switch is again operated to provide the inter-digital pause and the control switch is advanced to its thirteenth position to control the transmission of the first registered digit of the subscriber's number.

The digits of the subscriber's number are registered on the successive storage relay sets and these digits are retransmitted in the same manner as described for the transmission of the second and third office code digits.

The director is arranged to delay the sending of any digit of the subscriber's number until such digit is registered in the corresponding storage relay set and the digit switch DSW has advanced to its next bank contact after such registration. This delay is accomplished by maintaining relay CU energized over both its windings and as long as differential relay CU is energized over both its windings contacts 1292 are maintained open and relay P cannot operate to initiate pulse transmission. For example, after retransmitting the three office code digits control switch CS is stepped to its thirteenth position and if the first digit of the subscriber's number has not yet been registered the digit switch DSW is in its third position and the lower winding of relay CU is energized from grounded conductor 1100, wiper 1526 and its thirteenth bank contact, conductor 998, third bank contact and wiper 1765, conductor 1206, and lower winding of relay CU to battery. With both windings of relay CU energized contacts 1292 are maintained open and relay P cannot reoperate. Wiper 1765 of the digit switch is not stepped to its fourth bank contact until the first digit of the subscriber's number is registered in the third set of storage relays. In a similar manner relay CU is controlled over subsequent positions of the control and digit switches and over conductors 996 and 994 to prevent retransmission of the corresponding subscriber's digits until such digits are registered and the digit switch steps to open the circuit through the lower winding of relay CU at which time relay CU operates contacts 1292 to complete the circuit for relay P. Differential relay CU will, therefore, be operated as long as there are more digits stored than have been transmitted.

From the foregoing description it has been shown how the seizure of an overflow trunk causes an idle director to be associated with the seized overflow trunk, how the director has transmitted five routing digits (the sixth routing digit being skipped) under control marking from the overflow trunk to route the call via the first alternate trunk route to the desired destination, how the first office code digit is registered in the overflow trunk while the remaining digits of the office code and the subscriber's number are registered on director storage relay sets, and how the director retransmits these registered digits to complete the call.

*Release of director*

After the director has finished retransmitting all of the registered digits the control switch CS and the digit switch DSW are in positions for energizing both windings of differential relay CU. For example, with the control switch CS in position 18 and the digit switch DSW in position eight, the lower winding of relay CU is simultaneously energized with its upper winding from grounded conductor 1100, wiper 1526 and its eighteenth bank contact, conductor 1507, eighth bank contact and wiper 1765, conductor 1206 and lower winding of differential relay CU. Relay CU maintains its contacts 1291 open for a period of time to permit the slow-to-release relay TC to restore. It should be mentioned at this time that relay TC is held operated over wiper 1527 and conductor 1203 while the control switch CS is in its first twelve positions, over wiper 1527 and its thirteenth, fourteenth, seventeenth, eighteenth, twentieth, and twenty-first bank contacts and conductor 1202 while contacts 1291 are closed, and over wiper 1527 and its fifteenth, sixteenth, and nineteenth bank contacts and conductor 1204 while contacts 1241 of relay TC are closed. When contacts 1291 of the differential relay CU open, condenser DC and resistance DR delay the restoration of relay TC in a well known manner for a time period of approximately two seconds. In case relay CU does not reclose contacts 1291 within a two seconds time period relay TC restores. Relay TC at contacts 1243 opens a further point in the circuit to relay P, and at contacts 1242 completes a circuit for self-interrupting stepping magnet CSM until wiper 1528 engages its twenty-first bank contact. This circuit may be traced from ground, contacts 1242, conductor 1304, multipled bank contacts and wiper 1528, conductor 983, interrupter contacts 1511, conductor 984, contacts 971, conductor 985, and winding of stepping magnet CSM to battery. This self stepping circuit is opened when wiper 1528 engages its twenty-first bank contact and wiper 1530 now closes a circuit to initiate the release of the overflow trunk. This latter circuit may be traced from grounded conductor 1100, pulsing contacts 1330, conductor 1090, contacts 1035 and 1015 of relays MB and MA, conductor 1076, twenty-first bank contact and wiper 1530, conductor 876, bank contact and wiper 856, contacts 840, conductor 770, resistance H1, skip wiper SK and tenth bank contact, conductor 605 and lower winding of release relay SW to battery. A branch of this latter circuit may be traced from conductor 770 through the winding of relay SP, resistance 780 to battery for operating relay SP. Relay SP at contacts 781 energizes stepping magnet KSM of code switch KS.

Release relay SW completes a locking circuit for itself from ground contacts 561, conductor 591, contacts 651 and upper winding of relay SW to battery. At contacts 652 relay SW opens the circuit of relay CO and CK, at contacts 653 prepares the operating circuit to relay S, at contacts 654 and 656 connects the EC pulse lead of switch 3S1 to selector 1S5, at contacts 655 opens the circuit of director relay AD, at contacts 657 disconnects the outgoing pulsing lead 881 from selector 1S5 and opens the circuit of the director relay E, and at contacts 658 opens another point in the circuit of relay K. At contacts 659 relay SW closes a circuit over conductor 660 for energizing stepping magnet KSM to maintain the code switch KS in its tenth position until release relay SW restores.

Relay CO, upon restoring, at contacts 551 opens the locking circuit of relay R1 which now restores, at contacts 552 to 555 connects the negative and positive leads of selector 3S1 to selector 1S5 and disconnects these leads from the director, at contacts 556 and 558 opens the circuit to relay TO and to director start relay ST and the short around relay S as well as removing the busy ground marking potential from the director, at contacts 559 recloses the short around relays CO and CK, and at contacts 550 connects the lower and upper windings of relay A in series.

Relay CK, upon restoring, at contacts 812 disconnects the negative lead 490 of selector 1S5 from the director, at contacts 813 disconnects the positive lead 492 of selector 1S5 from the director, at contacts 816 prepares the circuit for relay A, at contacts 817 prepares the restoring circuit for code switch KS, at contacts 818, 819, 820, 830 and 840 disconnects the code switch from the director, and at contacts 840 also opens the circuit to relay SP and the initial energizing circuit of release relay SW.

Relay R1, upon restoring, at contacts 523 opens the circuit to relay RA1 which restores and removes the ground code markings from the banks of the code switch KS. Relay TO restoring prepares the circuit to relay OF and relay SP without effect at this time. Relays SC, SD and SW are held in operated position until the connection is released and selector 3S1 is restored to open the circuit relay SC.

In the director relays AD and E restored in response to the operation of overflow relay SW. At back contacts 1251 relay AD completes a circuit for reoperating relay CD and stepping magnet RSM through operated contacts 1213 of relay CR. At contacts 1222 relay CD again energizes stepping magnet DSM which again locks energized over contacts 1214. Relay E opens the circuit to relay EB which restores without effect at this time.

The start relay ST restored in response to the restoration of overflow relay CO and at contacts 1341 opens the circuit of relay B which quickly restores. At contacts 1111 relay B closes the self-restoring circuit for control switch CS and a circuit to peg count meter PC over the last multipled contacts of wiper 1528, at contacts 1112 disconnects ground from conductor 1100 controlling the circuits of relays P, CU and TB, at contacts 1113 opens the locking circuit to DSWM which deenergizes and steps the digit switch DSW another step, at contacts 1114 recloses the shunt around its upper winding, at contacts 1115 opens the stepping circuit to magnet PSM, at contacts 1116 opens the locking circuits to the operated storage relays to cause their release, at contacts 1117 recloses one of the circuits to common relay ADB, and at contacts 1118 and 1119 opens the circuit of motor M to stop the operation of pulsing contacts 1230, 1330 and 1340.

The circuit for restoring control switch CS to normal may be traced from ground contacts 1111, conductor 1101, closed off-normal contacts 1513, conductor 983, interrupter contacts 1511, conductor 984, contacts 871, conductor 985 and winding of stepping magnet CSM to battery. Magnet CSM operates in the manner of a buzzer to restore the wipers to normal at which time off-normal contacts 1513 open the self-restoring circuit. The closure of off-normal contacts 1513 completes a self-restoring circuit for switch PS as follows: ground contacts 1111, conductor 1101, back contacts 1513, conductor 1306, closed off-normal contacts 1357, interrupter contacts 1355, conductor 965, contacts 974 and TK', conductor 966 and winding of stepping magnet PSM to battery. When the wipers of switch PS is restored to normal the make contacts 1357 open to open the self-restoring circuit of switch PS, and at back contacts 1357 closes a self-restoring circuit for restoring digit switch DSW. The circuit may be traced as follows: ground contacts 1111, conductor 1101, back contacts 1513, conductor 1306, closed contacts 1357, conductor 1395, off-normal contacts 1767, interrupter contacts 1766 and winding of magnet DSWM to battery. Interrupter contacts 1766 intermittently opens the circuit of magnet DSWM until the wipers of switch DSW are restored to normal where the off-normal contacts 1767 opens this self-restoring circuit, off-normal contacts 1769 prepares the circuit to relay B and off-normal contacts 1768 opens the circuit to relay CD and magnet RSM. At contacts 1221 relay CD opens the circuit of relay CR which now restores. Magnet RSM restores and steps the wipers of register switch off-normal closing off-normal contacts 1634. When relay CR restores a self-restoring circuit for switch RS is completed from ground back contacts 1221 and 1212, conductor 1271, off-normal contacts 1634, interrupter contacts 1633 and magnet RSM to battery. When the wipers of switch RS are restored to normal, contacts 1634 opens the self-restoring circuit to stop switch RS in normal position. All of the director switches and all relays are now restored to normal.

*Director again seizable before being fully restored*

It should possibly be mentioned at this time that the director is again seizable as soon as relay CO in the connected overflow trunk restores and removes the busying ground which guards the director against seizure by another overflow trunk, even though all of the switches and relays in the director are not yet fully restored. Usually the director is guarded against reseizure until all switches and relays are fully restored but in this instance, after the release restoring operations are initiated and before completion thereof, the director is reseizable by another overflow trunk. This arrangement is permissible because this other overflow trunk maintains a "stop-dial" condition for incoming pulsing until a director is seized and because the first incoming digit is stored in this other overflow trunk after reseizure of the director. The combined time interval resulting from the removal of the "stop-dial" condition plus the time required to store the first incoming digit in this other overflow trunk is more than sufficient to permit the reseized director switches and relays to fully restore and be conditioned to receive the second incoming digit; such digit being the first digit to be registered and stored in the director.

When the call is terminated by the calling operator ground is removed from the C lead of selector 3S1 in the well known manner thereby opening the holding circuit of relay SC. Relay SC, upon restoring at contacts 611 opens a point in the circuit to magnet SSWM, at contacts 612 opens the circuit of relay SD and disconnects ground from conductor 488 to cause the release of selector 1S5 and the switches beyond in a well known manner. Relay SD, upon restoring, at contacts 561 opens the locking circuit to relay SW which now restores, at contacts 564 closes the restoring circuit for switch DS, at contacts 565 extinguishes the busy lamp, and at contacts 566 grounds the C lead 401 to mark this overflow trunk busy until relay NB is operated as previously described.

The circuit for restoring digit switch DS to normal may be traced as follows: ground, off-normal contacts 821, conductor 500, contacts 564, conductor 599, interrupter contacts 824 and winding of stepping magnet DSM to battery. Stepping magnet DSM energizes and opens its own circuit at contact 824 to thereby operate the magnet like a buzzer to step the wipers of switch DS to normal at which time the off-normal contacts 821 open to stop the switch in its normal position.

Relay SW, upon restoring, at contacts 651 opens a point in its own locking circuit and at contacts 659 opens the circuit which has been maintaining stepping magnet KSM energized. When magnet KSM restores the wipers of the code switch KS are restored to their normal positions. All of the apparatus in the overflow trunk is now restored and may be again seized.

*Direct trunks available after seizure of an overflow trunk*

Provisions are made in the overflow trunks to route the call over direct trunks to the desired destination in case one of the direct trunks becomes available before seizure of an idle director. In order to describe this condition, it will be remembered that the overflow trunk, as described, was seized when all the Winnipeg trunks were busy and it will now be assumed that, before a director is seized by the overflow trunk, one of the Winnipeg direct trunks becomes idle and available for use. All-trunk-busy relay HG restores when one of the direct trunks becomes idle and at make contacts 415 opens the circuit to relay R1 before it is locked up over its locking circuit and upper windings, such locking circuit being completed as a result of relay SE restoring after a director has been seized. At back contacts 415 relay HG completes a circuit over contacts 458 and conductor 407 for operating relay H.

Relay R1 restores and causes its slave relay RA1 to restore and remove the code markings from the banks of the code switch KS and relay H causes its slave relay HA to be operated over contacts 533 and conductor 570. Contacts 711 to 714 grounds the bank contacts of the code switch KS in accordance with the three necessary digits 9, 8 and 6; that is, contacts 712 grounds the Y bank contact for the first digit 9, contacts 711 grounds the X bank contact for the second digit 8, and contacts 713 and 714 ground the Y and Z bank contacts for the third digit 6. Since no fourth, fifth and sixth routing digits are now required to route the call to the Winnipeg trunks, contacts 715, 716 and 717 ground the fourth, fifth and sixth digit skip positions in the SK banks.

The director is seized in the same manner as previously described and in this case overflow relay HA (instead of alternate #1 relay RA1) is operated to mark the code for the direct trunks to Winnipeg. The detail operations from here on are similar to that previously described for the first choice alternate route and will therefore be described briefly. The first Winnipeg office code digit is stored in the overflow digit switch DS, the second and third office code digits are stored in storage relay sets in the director as well as the subscriber digits. During the time the office code digits and the digits of the subscriber's number is being stored in the director, the director sends the routing digits registered in the overflow trunk for operating the switches, such as 1S5 (Fig. 2), 2S1 and 3S1 to seize an idle direct trunk to Winnipeg. These three routing digits are 9, 8 and 6 and are marked in the seized overflow trunk by the operation of relay HA. At the proper time these marked digits are transmitted to the director for controlling the transmission thereof by the director. Since no fourth, fifth or sixth routing digit is required to route the call to Winnipeg, the fourth, fifth and sixth routing digits are skipped under control of the skip markings in the overflow trunk in a manner apparent from the description previously given for skipping the sixth routing digit for the first choice alternate route. When all of the office code digits have been registered, the director retransmits these registered digits, the first of which is registered in the digit switch DS in the overflow trunk and the remaining two in the director register relay groups. The remaining digits, comprising the subscriber's number are retransmitted when registered in the succeeding relay storage sets.

*Stop-dial condition*

During the setting up of a connection one or more of the automatic switches may require an additional hunting time which may be greater than the inter-digital pause between transmission of successive digits, and it is common practice to send back to the sender a "stop-dial" signal which prevents the sending of the subsequent digit until an idle outlet has been selected by the switch. This "stop-dial" signal comprises a high-resistance ground signal which is maintained on the outgoing pulsing lead until the idle outlet is selected and the next switch in the train is ready to receive pulses. A system employing this "stop-dial" signal is shown and described in the application of Harvey W. Balzer, Serial No. 181,508, filed August 25, 1950, now Patent No. 2,697,134. In the present application when a "stop-dial" high-resistance ground signal is received back from the outgoing switch train, the director relay E, being marginal, restores to cause the director to stop sending until the "stop-dial" signal is removed at which time the relay E is reoperated. The circuit for controlling relay E extends from the switch in the switch train provided with this high-resistance ground signal over the intervening switch, or switches, to the inter-toll selector 1S5, conductor 486, contacts 657, conductor 602, contacts 814, wiper 861 and engaged bank contact, conductor 881 to relay E. It was previously described how the initiation of impulse transmission required the energization of relay D and since the circuit for operating relay D includes the operated contacts of relay E, relay D cannot reoperate as long as relay E is maintained in restored position. The circuit for operating relay D extending from grounded conductor 1100, contacts 1232 of relay E (now open), conductor 1283, off-normal contacts 1367, pulsing contacts 1340, conductor 1275, back contacts 1261, conductor 1276, contacts 1324, conductor 963, contacts 925, conductor 964, back contacts 1267, conductor 1077, contacts 1066, conductor 1078, back contacts 1316, and relay D to battery. It was previously described how the differential relay J operated its contacts during pulse transmission and did not restore its contacts until at the end of the inter-digital pause when the sending switch SS restored to normal. The relay J therefore has its contacts operated at the time the "stop-dial" signal is received and when relay E is deenergized. Under these conditions a circuit may be traced for operating the stepping magnet TSM of time switch TS as follows: ground interrupter contacts 1364, conductor 1280, back contacts 1231 of relay E, conductor 1279, make contacts 1314, normal bank contact and wiper 1362, and winding of stepping magnet TSM. Magnet TSM at interrupter contacts 1364 interrupts its own circuit causing switch TS to take one step and open off-normal contacts 1365 and 1367, the latter contacts opening a further point in the circuit for reoperating relay D. Wiper 1363 advancing from its normal bank contact to its first bank contact opens the circuit to the time relay TB to prevent the operation of relay TB. The first six bank contacts accessible to wiper 1362 are multipled and connected to a pulsing lead which is grounded every one-half second thereby causing the stepping magnet TSM to operate and step its wipers every one-half second until it engages its seventh bank contact. The wipers remain in this position until relay E is reoperated in response to the removal of the "stop-dial" signal. That is, the high-resistance ground signal is removed and a low-resistance ground is substituted therefor and relay E is reoperated. Relay E now completes a circuit for restoring switch TS to normal as follows: ground interrupter contact 1364, conductor 1280, make contacts 1231 of relay E, conductor 993, multipled seventh, eighth, ninth and tenth bank contacts and wiper 1362, and winding of stepping magnet TSM to battery. Magnet TSM again interrupts its own circuit to step its wipers back to normal to reclose the circuit to time relay TB and to restore its off-normal contacts to normal position. The closure of off-normal contacts 1367 now completes the previously traced circuit for reoperating relay D whereupon impulse transmission is now resumed.

Usually toll operator positions are now equipped with key senders which do not send impulses until the "stop-dial" signal is removed while older installed toll positions may be equipped with the ordinary telephone dial and a "stop-dial" lamp signal. It may happen that at a toll operator's position equipped with the ordinary dial, the toll operator starts to dial before the "stop-dial" signal on her panel is dark. In case the operator dials the first digit to the overflow trunk before an idle director is seized and therefore before the "stop-dial" signal is removed, the call will be completed only in the event that the director has been seized and relay CO is operated on seizure before the series relay C falls back at the end of the first digit.

In case the C relay falls back after the first dialled digit before seizure of the director and before the operation of relay CO, the overflow relay OF is fully operated over its upper winding and contacts of relay SE. Relay OF disconnects the incoming pulsing lead and transmits 1201PM back to the toll position thereby indicating that this call cannot be completed and that the operator should release from this connection and try again.

*All trunks busy*

In case any of the switches in the outgoing switch train encounter an all-trunk-busy condition, due to all available trunks in the desired group being busy, a flash-busy signal is transmitted back to the director. This flash-busy signal comprises alternate low and high resistance pulses transmitted back from the switch train through selector 1S5 and over conductors 486 and 881 for intermittently operating relay E. When relay E restores in response to the high resistance pulse the circuit for operating stepping magnet TSM is again completed to cause switch TS to step to its first position and the circuit to relay D is held open by off-normal contacts 1367 to prevent reoperation of relay D. In the same manner as previously described a circuit is completed through wiper 1362 to cause switch TS to step every one-half second. In this case, due to the flash-busy signal alternately causing relay E to restore and reoperate, the relay E is reoperated before the switch TS has advanced to its seventh position. Now, when relay E reoperates a circuit may be traced for energizing both windings of differential relay G as follows: ground conductor 1100, contacts 1232 of relay E, conductor 1283, off-normal contacts 1366 through the upper winding of relay G to battery and also through the opposing lower winding of relay G, contacts 1336 and resistance to battery. The relay G is of the differential type which operates its X contacts 1335 in response to an inductive surge when the circuits to relay G are opened. When relay E again restores in response to the connection of the high-resistance pulse of the busy flash, the circuits through the windings of relay G are opened at contacts 1232 and an inductive kick is generated in relay G which is sufficient to cause X contacts 1335 to close. The closure of contacts 1335 now completes an aiding circuit through both windings of relay G in series for completely operating relay G. This circuit may be traced from grounded conductor 1100, wiper 1363 in engagement with any one of its first five multipled bank contacts, X contacts 1335 and through the lower and upper windings of relay G in series to battery. In this series circuit the lower winding now assists the upper winding to fully operate relay G. Relay G is held operated over this circuit until the switch TS is stepped beyond these five multipled bank contacts and during this time the control switch CS is automatically stepped into engagement with its twenty-first bank contact.

Relay G at contacts 1331 grounds the multipled bank contacts connected to conductor 1303 and accessible to wiper 1528, at contacts 1332 grounds the conductor 1304 and the multipled bank contacts connected to conductor 1304 also accessible to wiper 1528. The grounding of these bank contacts now completes a circuit for self-interrupting stepping magnet CSM to step the wipers of switch CS to their twenty-first bank contacts at which point wiper 1528 no longer engages a grounded bank contact. This circuit may be traced from the bank contacts grounded over conductors 1303, 1073 and 1304, wiper 1528, conductor 983, interrupter contacts 1511, conductor 984, contacts 971, conductor 985, and winding of stepping magnet CSM to battery. At contacts 1333 relay G opens the circuit to relay P, at contacts 1334 opens a circuit which is effective during multi-frequency pulsing, and at contacts 1336 disconnects the battery feed through the associated resistance from the lower winding of relay G.

When control switch CS reaches its twenty-first position a pulsing circuit is completed for pulsing overflow relay SP to cause the overflow code switch KS to step to its tenth position where a circuit is completed for operating the overflow release relay SW. The pulsing circuit for operating relay SP may be traced as follows: grounded conductor 1100, pulsing contacts 1330, conductor 1090, contacts 1035 and 1015 (conductor 1076, twenty-first bank contact and wiper 1530, conductor 876, bank contact and wiper 856 of switch SSW, contacts 840, conductor 770, relay SP and resistance 780 to battery. Relay SP is pulsed by contacts 1330 causing contacts 781 to pulse stepping magnet KSM to rotate its wipers step by step until skip wiper SK engages its tenth bank contact. On the next pulse by contacts 1330 relay SP and magnet KSM energize and the following circuit is also completed by this same ground pulse for operating release relay SW; this ground pulse extending by way of conductor 770, high resistance H1, wiper SK and its tenth bank contact, conductor 605, and lower winding of relay SW to battery. Relay SW at contacts 659 grounds conductor 660 to maintain magnet KSM energized after relay SP releases to hold the code switch KS in its tenth position until relay SW restores.

Release relay SW in the same manner as previously described completes a locking circuit for itself at contacts 651, opens the circuits of relays CO and CK at contacts 652, at contacts 654 and 656 connects the EC lead of switch 3S1 to selector 1S5 to transfer the all-trunk-busy signal to selector 3S1, at contacts 655 opens the circuit to the director AD relay, and at contacts 657 opens the circuit to the director relay E.

As previously described relays CO and CK restore causing selector 3S1 to be connected through the overflow trunk to selector 1S5, the disconnection of the director, the restoration of relays R1, ST, RA1, TO and SP if operated. The director is released in the same manner as previously described in response to relays AD, E and ST restoring.

*Second choice alternate route*

In case both the Winnipeg trunks and the first choice Calgary alternate trunks are all busy when the overflow trunk is seized then relays HG and AR1 are both operated over their all-trunk-busy circuits ATB–W and ATB–C. The operation of these two relays causes the operation of the second choice alternate code marking relay R2 over contacts 415, 422, 432 and 456, and conductor 405. Relay R2 operates its slave relay RA2 over contacts 513 and conductor 510 and at contacts 514 grounds conductor 590 to ground the first Y bank contact through CMF. In a manner similar to that described for the other slave code marking relays, relay RA2 grounds the bank of code switch KS in accordance with the required routing digits. In addition, the first Y bank contact is grounded by relay R2 to transmit a ground signal to the director to inform the director that some of the digits to be transmitted by the director must be multi-frequency pulses instead of the usual "step-by-step," or decimal pulses, as will be described more fully hereinafter. Contacts 733 and 736 mark the first routing digit 5 in the X and Z banks, contacts 731 mark the second routing digit 7 in the W bank, and contacts 739 marks the space for the third routing digit in the skip bank SK to skip the third routing digit as only two routing digits are needed to route the call to the second choice alternate Regina trunks. These Regina trunks terminate in Regina in the well known cross-bar type of switches which require multi-frequency digits to cause their operation so that any further digit transmission on this call to Winnipeg must be of the multi-frequency type. At contacts 732 and 737 relay RA2 marks the third routing digit 3 in the W and Z banks in the space normally allotted to the fourth routing digit. Contacts 734 and 735 mark the fourth routing digit 4 in the X and Y banks in the space normally assigned to the fifth routing digit. Contacts 738 grounds the sixth digit SK bank contact to skip transmission of the next routing digit as none is needed to route the call through Regina to trunks to Winnipeg.

The seizure of the director and the operations of the overflow trunk and director are substantially the same as that previously described for step-by-step pulsing in regard to the transmission of the first two routing digits and the skipping of the third routing digit and will, therefore, be briefly described in conjunction with any new circuit operations which will be described in detail.

After the first Winnipeg office code digit is stored in the overflow digit switch DS, the overflow relay C restores after the dialling of this digit to operate relay JC in the director. Relay JC restores when the stepping magnet CSM of the director control switch CS operates to cause the wipers of the overflow code switch KS to step to their first position bank contacts. The control switch CS is stepped to its first bank contact position by the restoration of magnet CMS when relay JC restores. In position one of the control switch CS relays TC and CU are operated to cause the operation of relay MD, all as previously described.

Relay MD at contacts 1045 completes the circuit previously traced for operating relay JC when conductor 876 is grounded in the overflow trunk as a result of skip wiper SK of switch KS engaging its grounded first bank contact. Relay MD at contacts 1044 prepares a circuit for relay MA and at contacts 1043 completes a circuit for relay MF as follows: ground (Fig. 5) contacts 514, conductor 590, first bank contact and Y wiper of code switch KS, conductor 707, contacts 820, wiper 854 and bank contact of switch SSW, Y conductor 874 in cable 800, multipled bank contacts and wiper 1522 of director control switch CS, conductor 1008, make contacts 1043, conductor 905, and upper winding of relay MF to battery. At make contacts 1041 and 1042 relay MD prepares circuits for relays MX and MW which are completed only in case the digit "1" is dialled as the first digit in a special code, such as an "operator" code which will be described more fully hereinafter.

Relay MF completes a locking circuit for itself from ground conductor 1120 at contacts 916, and at contacts 915 completes a circuit for operating relay MA as follows: grounded conductor 1100 (Fig. 13), contacts 1334, conductor 1010, contacts 1044, conductor 909, contacts 915, conductor 906, contacts 1033 and 1023 and winding of relay MA to battery. Relay MF at back contacts 912 and 914 disconnects the negative and positive talking leads of selector 3S1 from the negative and positive talking leads of selector 1S5 and at front contacts 912 and 914 connects the left-hand windings of repeat coil RC in bridge of the negative and positive talking leads 490 and 492 of selector 1S5 to prepare for the transmission of frequency signals. At contacts 913 relay MF connects a condenser and a resistance in bridge of the negative and positive leads 491 and 493 of switch 3S1 by way of the overflow trunk. At back contacts 911 relay MF opens one of the circuits to relay P to prevent its operation during frequency sending and at front contacts 911 prepares the circuit to relay PF which is substituted for relay P during frequency pulsing. At contacts 910 relay MF prepares circuits which are effective in position six of the control switch CS for controlling differential relay CU and relay PF in order to determine when frequency pulsing should start dependent upon the dialed code as will be more fully explained hereinafter. At contacts 917, 918 and 919 relay MF likewise prepares circuits for determining when frequency pulsing is to start.

Relay MA at contacts 1011 prepares a circuit for relay MB, at contacts 1013 prepares a circuit for relay MC, at contacts 1014 disconnects ground from the fifth bank contact accessible to wiper 1528 of control switch CS, at contacts 1015 prepares another circuit for relay MB, and at contacts 1012 shunts contacts 1044 to complete a locking circuit for itself over its energizing circuit independent of contacts 1044 of relay MD.

Relay JC operates in response to the operation of relay MD and at contacts 921 again energizes stepping magnet CSM, at contacts 922 opens the circuit to relay MD which restores, at contacts 923 again locks itself and again grounds conductor 876 this time over contacts 1045, conductor 1075, first bank contact and wiper 1530 to again operate relay SP, at contacts 924 again shorts its upper winding, and at contacts 925 prepares a circuit for relay D. Relay MD restoring at back contacts 1041, 1042 and 1043 prepares circuits for code marking the bank contacts for sender switch SS in accordance with the routing digits, and at contacts 1045 open the initial energizing circuit to relay JC as well as the circuit for operating relay SP in the overflow trunk.

Stepping magnet CSM energizes and at contacts 1512 opens the locking circuit of relay JC which restores slowly. Relay JC restoring opens the circuit to magnet CSM at contacts 921 to cause magnet CSM to restore and step the wipers of the control switch to their second bank contacts. Wipers 1521 to 1524 are now in position to receive the code marking of the first routing digit from the overflow trunk. Wiper 1525 completes the previously traced circuit for operating relay P.

Relay P at front contacts 1061, 1063, 1064 and 1062 marks the banks of sending switch SS with the W, X, Y, Z code of the first routing digit marked in the second position bank contacts of the code switch KS in the overflow trunk. Relay P at contacts 1065 again completes the circuit to time relay TB which operates only after a two second delay. Relay D operates in response to the operation of contacts 1066 of relay P at a time when pulsing contacts 1340 are closed as previously described.

Relay D at contacts 1323 closes its locking circuit, at 1322 prepares the circuit to relays J and K, at contacts 1325 removes the short around pulsing contacts 1230 to enable transmission of outgoing pulses to selector 1S5 over conductors 881 and 486. At contacts 1321 relay D closes the previously traced circuit for operating stepping magnet SSM of the sender switch.

The routing digits are marked in the banks of the overflow code switch KS in accordance with the available route. In this case since the first available alternate route is via Regina, the routing digits are 5 and 7 to route the call to the Regina trunks. These digits are marked in the code switch KS by the operation of relay RA2. Contacts 733 and 736 of relay RA2 ground the second bank contacts in the X and Z banks to code mark the digit 5 (XZ) and as a result of the operation of relay P these ground markings are extended to the fifth bank contacts accessible to both wipers 1621 and 1622 of sending switch SS.

In the same manner as previously described pulsing contacts 1230 transmit pulses to selector 1S5 and pulsing contacts 1330 transmit corresponding pulses to the sending switch SS to step these switches in unison. When sending switch SS steps its wipers to the marked contacts, in this case the fifth contacts, the shunt-field relay F is operated. Relay F, as previously described, completes circuits for differential relays J and K for operating only relay K since relay J is energized over both its windings while relay K is energized only at its lower winding.

Relay K at back contacts 1261 opens the circuit of relay D and at front contacts 1261 prepares a new circuit for relay D. At contacts 1262 relay K closes a new circuit for the lower windings of relays K and J before contacts 1263 open and at contacts 1264 closes a new circuit for the upper winding of relay J. At contacts 1266 relay K completes a new circuit for operating relay JC from grounded conductor 1120. At back contacts 1267 relay K opens the locking circuit of relay D which now restores and prepares a new circuit for relay D at front contacts 1267. Relay D at contacts 1268 closes a shunt around the pulsing contacts 1230 to prevent further pulse transmission to the line relay of selector 1S5.

Relay D, upon restoring, at front contacts 1321 opens the pulsing circuit to stepping magnet SSM and completes the restoring circuit for switch SS at back contacts 1321. Switch SS restores in the same manner as previously described to cause relay F to restore.

Relay JC, upon operating, at contacts 921 again operates stepping magnet CSM, at contacts 922 opens relay P which restores, at contacts 923 again completes its locking circuit and again grounds conductor 876 to operate overflow relay SP, and at contacts 925 opens a further point in the circuit to relay D. Relay P, upon restoring, disconnects the code markings from the banks of the sending switch. When sending switch SS is restored off-normal springs 1625 opens the circuit through the upper winding of differential relay J thereby causing relay J to operate since its lower winding alone is now energized. Relay J, upon operating, at contacts 1311 and 1313 grounds the fifth bank contacts of sending switch SS for the inter-digital pause and at contacts 1317 shunts pulsing contacts 1230 to prevent pulse transmission to the selector 1S5 during the inter-digital pause.

Stepping magnet CSM of control switch CS at contacts 1512 opens the circuit of relay JC which restores. Relay JC at contacts 923 again causes overflow relay SP to restore and step the overflow code switch KS to its third position which is marked in code for the second routing digit (digit 7 or code W). At contacts 921 relay JC restores magnet CSM to step the control switch CS to its third position.

The inter-digital pause between the transmission of the first and second routing digits is identical to that previously described and will not be repeated. It will be remembered that relay D, sending switch SS and relay F were operated and restored and that differential relays K and J were both restored, the latter relay completing a circuit to reoperate relay P to initiate the transmission of the second routing digit after the inter-digital pause.

The second routing digit is transmitted in the same manner as previously described and in this case since the second routing digits is "7" the operation of relay P marks the code "W" in both banks of sending switch SS at their seventh bank contacts and relay P reoperates relay D. In response to the operation of relay D, pulsing contacts 1230 transmit step-by-step, or decimal, pulses through selector 1S5 to a second selector, such as selector 2S2, and pulsing contacts 1330 operate the sending switch SS until the wipers 1621 and 1622 simultaneously engage a grounded bank contact (seventh in this case) to operate relay F. Relay F again operates only differential relay K which shunts pulsing contacts 1230 to prevent further pulsing to selector 2S2. Relay K causes relay D to restore and reoperate relay JC. Relay D, upon restoring, causes the sending switch to be restored to normal and open the circuit of relay F. When fully restored, the sending switch causes differential relay J to operate. Relay JC reoperates and again causes the overflow code switch magnet KSM and the stepping magnet CSM to operate and again restores relay P to remove the code marking from the sending switch banks. The operation of stepping magnet CSM causes relay JC to restore and relay JC then causes both the code switch KS and the control switch to take one step to their fourth positions. Relay J again marks the banks of the sending switch for the inter-digital pause and again shunts pulsing contacts 1230. Relay JC again operates relay D for initiating the inter-digital pause between the second and third routing digits. The inter-digital pause is the same as previously described and when relay P reoperates in response to the restoration of relay J, the director is in condition to transmit the third routing digit.

In this case as previously described contacts 739 has grounded the fourth bank contact of skip wiper SK of code switch KS to cause the third routing digit to be skipped. In this case relay JC is operated from ground contacts 739, terminals and jumper of CMF, fourth bank contact and skip wiper SK, resistance H1, conductor 770, contacts 840, wiper 856 and bank contact, conductor 876, wiper 1530 and its fourth bank contact, contacts 1512, conductor 995, and lower winding of relay JC to battery. Relay JC again energizes stepping magnet CSM and overflow relay SP to in turn energize the stepping magnet KSM. Magnet CSM causes relay JC to restore which in turn opens the circuits to relay SP and magnet CSM to cause the code switch KS and the control switch to step to their next bank contacts, or their fifth position.

*Multi-frequency transmission*

The circuit operations for the director are different from here on because the second routing digit has operated the selector, such as selector 2S2, to the seventh level to select an outgoing trunk to Regina and the remaining digits to be transmitted must now be multi-frequency digits in order to route the call through Regina to Winnipeg. It was previously described how relays MF and MA were operated because some of the digits to be transmitted by the director are to be multi-frequency digits. Now when the control switch CS reaches its fifth position, a circuit is completed for operating relay MC as follows: grounded conductor 1100, back contacts 1311, contacts 1333, conductor 987, contacts 922, conductor 986, contacts 1292 and 1243, conductor 1201, wiper 1525, conductor 1071, contacts 1013, conductor 900, contacts 961, conductor 981 and relay MC to battery.

Relay MC at contacts 1021 and 1022 connects the 1700 cycle and 1100 cycle sources to the right-hand windings of repeat coil RC to transmit a special signal, hereinafter referred to as "KP" signal, to the distant switches in Regina to cause said switches to be prepared to receive multi-frequency digits and at contacts 1023 opens the locking circuit of relay MA which now restores. The circuit for connecting the 1700 cycle and 1100 cycle sources to the repeat coil RC may be traced as follows: from the 1700 cycle source, conductor 1403, contacts 1021, conductor 1081, to the right-hand winding of repeat coil RC and from the 1100 cycle source, conductor 1406, contacts 1022, conductor 1070 to the right-hand winding of repeat coil RC. This "KP" frequency signal is induced into the left-hand winding of repeat coil RC and may be traced through switches 1S5 and 2S2 as follows: from the left-hand winding of repeat coil RC, conductors 903 and 904, make contacts 912 and 914, conductors 877 and 879, bank contacts and wipers 857 and 859 of switch SSW, contacts 812 and 813, conductors 490 and 492 to selector 1S5, through selector 1S5 to selector 2S2 which has seized a trunk extending to Regina and over the seized trunk to the apparatus in Regina. The apparatus in Regina is conditioned in the well known manner to receive multi-frequency digits in response to this "KP" signal.

Relay MA, upon restoring, at contacts 1012 opens its own own locking circuit and at contacts 1013 opens the circuit to relay MC which now restores. At contacts 1012 and 1013 relay MC disconnects the "KP" signal and at contacts 1024 operates stepping magnet CSM as follows: ground contacts 1014 and 1024, conductor 1073, fifth bank contact and wiper 1528, conductor 983, interrupter contacts 1511, conductor 984, contacts 971, conductor 985 and winding of magnet CSM to battery. Magnet CSM at contacts 1511 interrupts its own circuit, thereby stepping control switch CS to its sixth position in the well known manner. In position six the control switch completes a circuit through the lower winding of differential relay CU to cause this relay to quickly restore so as to prevent the operation of relay PF. It will be remembered that the upper winding of differential relay CU is energized from grounded conductor 1100 and the circuit for restoring relay CU may now be traced as follows: grounded conductor 1100, wiper 1526 and its sixth bank contact, conductor 999, contacts 910 of relay MF, conductor 900, the first or second bank contacts and wiper 1765 of digit switch DSW, conductor 1206 and lower winding of differential relay CU to battery. Relay CU at contacts 1292 prevents the operation of relay PF until all but the last digit of the subscriber's number is dialled into the director. It should also be remembered that the digit switch is not stepped from its second position until after the direction has received and registered the third office code digit and therefore differential relay CU is held in restored position. At this time it appears advisable to trace the circuits for holding relay CU restored until all but the last digit is received by the director. After the third office code digit is registered, the digit switch DSW is stepped to its third position to enable registration of the first digit of the subscriber's number and in this position the differential relay is held restored by circuits through its upper and lower windings. The circuit through the lower winding may be traced as follows: grounded conductor 1100, wiper 1526 and its sixth bank contact, conductor 999, contacts 910 and 919 of relay MF, either contacts 943 or 953 of relays MW and MX, conductor 998, third bank contact and wiper 1765 of digit switch DSW, conductor 1206 and lower winding of differential relay CU to battery. After registration of the first digit of the subscriber's number the digit switch DSW is stepped to its fourth position where a similar circuit is completed for the lower winding of differential relay CU over contacts 910 and 918 of relay MF, contacts 942 or 952 of relays MW or MX, conductor 996 and wiper 1765. In a similar manner relay CU is held restored while the third and fourth subscriber's digits are being registered over contacts 910 and 918 of relay MF, contacts 942 or 952 of relays MW or MX, conductor 994 and wiper 1765. Therefore as long as relay CU is held restored, contacts 1292 maintains the circuit to relay PF open, and since relay PF is the relay which initiates frequency sending, the director does not start frequency sending until the next to the last digit has been registered. In cases where there are three office code digits and only four subscriber digits (instead of five) frequency sending starts after all the digits have been dialled into the director.

Incoming pulses operate the director to register the last two digits of the office code and the digits of the subcriber's number in the same manner as previously described. After the fourth digit of the subscriber's number has been registered in the director, the digit switch DSW is stepped to its seventh position and the circuit through the lower winding of differential relay CU is opened with the result that relay CU now operates its contacts 1292 to complete the circuit for operating relay PF. This circuit may be traced as follows: grounded conductor 1100, back contacts 1311 and 1333, conductor 987, contacts 922, conductor 986, contacts 1292 and 1243, conductor 1201, wiper 1525 and the sixth bank contact, conductor 902, make contacts 911 of relay MF, conductor 907, winding of relay PF and through the associated resistance to battery. Relay PF, upon operating, initiates multi-frequency digit transmission through switches 1S5 and 2S2 to the cross bar equipment in Regina which have been conditioned by the "KP" signal to receive these multi-frequency digits. It should possibly be mentioned at this time that relay PF instead of relay P is energized due to relay MF being operated and since relay P is not operated and contacts 1066 are not closed, then relay D cannot be operated to initiate the transmission of step-by-step pulses, or decimal digits.

Relay PF at contacts 1055 grounds conductor 982 to operate relay PL through contacts 933. With the director control switch CS in its sixth position and the overflow code switch KS in its fifth position the code markings of the fourth routing digit registered in the overflow code switch banks are now connected to the frequency code relays WF, XF, YF and ZF by contacts 1051, 1052, 1053 and 1054 of the operated relay PF.

The digits necessary for routing the call through the Regina network are digits three and four and therefore relay RA2 at contacts 732 and 737 grounds the W and Z fifth banks of code switch KS to mark the fourth routing digit "3" (WZ). In response to the operation of relay PF the frequency code relays WF and ZF are now operated. The circuit for operating relay WF may be traced as follows: ground, contacts 732, fifth bank and W wiper of switch KS, conductor 703, contacts 818, wiper 852 and bank contact, conductor 872 of cable 800, sixth bank contact and wiper 1524 of control switch CS, conductor 1002, back contacts 1041, contacts 1051 of relay PF, conductor 1088 and winding of relay WF to battery. The circuit for operating relay ZF may be traced from grounded contacts 737, fifth bank contact and Z wiper, conductor 709, contacts 830, wiper 855 and bank contact, conductor 875 of cable 800, sixth bank contact and wiper 1521, conductor 1003, contacts 1052 of relay PF, conductor 1089, winding of relay ZF to battery.

Relay PL, upon operating, at contacts 932 prepares its own holding circuit and, being slow to release, maintains its contacts closed until relay JC is operated to complete this holding circuit. At contacts 931 relay PL closes a short circuit including conductors 907 and 908 around the winding of relay PF to cause relay PF to restore after a short interval. At contacts 935 relay PF prepares a point in the circuit to relay LF which circuit is completed in case only one of the code frequency relays WF, XF, YF or ZF is energized. If two of these code frequency relays are simultaneously energized then relay LF is not operated. Since relays WF and ZF are both energized for the fourth routing digit, relay LF is not operated. Relay PL at contacts 934 completes a circuit for operating relay JC as follows: grounded conductor 1120, back contacts 1313, conductor 997, contacts 934 and through the lower winding of relay JC to battery.

In response to the operation of relays WF and ZF the multi-frequency digit "3," comprising frequencies 900 and 1100 cycles, is transmitted through the inter-toll selector 1S5 to the distant multi-frequency receiver in Regina. These circuits may be traced as follows: from 900 cycles source, conductor 1404, contacts 1444 and 1453, conductor 1070 to the right hand lower winding of repeat coil RC and from the 1100 cycle source, conductor 1406, contacts 1442 and 1451, conductor 1081 to the right hand upper winding of repeat coil RC. These frequencies are induced into the left hand windings of repeat coil RC and are sent over conductors 903 and 904, contacts 912 and 914, conductors 877 and 879, bank contacts and wipers 857 and 859, contacts 812 and 813, conductors 490 and 492 to selector 1S5, through selector 1S5 to selector 2S2 and over the trunk seized by selector 2S2 to Regina where the apparatus responds to this multi-frequency digit to prepare a route through Regina.

Relay JC, upon operating, at contacts 923 locks itself through interrupter springs 1512 and grounds conductor 876 to cause the operation of overflow relay SP and stepping magnet KSM, at contacts 924 shorts its upper winding in order to release slowly when its circuit is opened, at contacts 922 opens the circuit to relay PF, at contacts 921 operates stepping magnet CSM and completes a locking circuit for relay PL over contacts 1511 and 932, and at contacts 924 opens a further point in the circuit to relay D as previously described.

After a short interval of time relay PF restores due to its short-circuited winding and at contacts 1051 and 1052 opens the circuits to code frequency relays WF and ZF, thereby causing these relays to restore and disconnect the 900 and 1100 cycles to stop the multi-frequency digit transmission for the fourth routing digit.

Slow-to-release relay PL restores after interrupter springs 1511 open in response to the operation of magnet CSM and at contacts 931 removes the short from relay PF to enable its reoperation. At contacts 934 relay PL opens the circuit to relay JC and this relay, due to its short-circuited upper winding restores slowly. Contacts 923 open first to cause overflow relay SP to quickly restore and relay SP opens the circuit of magnet KSM to cause the code switch KS to step to its sixth position to mark the code for the fifth routing digit. Contacts 931 open next to cause stepping magnet CSM to restore and operate the control switch CS to its seventh position in preparation to sending the fifth routing digit. Contacts 924 now open the short circuit around the upper winding of relay JC and contacts 922 close last to complete the circuit for operating relay PF. The circuit for operating relay PF is the same as previously described except that the circuit is now completed by way of the seventh bank contact instead of the sixth.

Relay PF operates and closes circuit for operating the code frequency relays in accordance with the markings for the fifth routing digit designated in the banks of the overflow code switch KS. In this case since the fifth routing digit is "4" the code frequency relays XF and YF are now operated to transmit the multi-frequency digit comprising 700 and 1300 cycles. The circuit for operating relay XF may be traced as follows: ground, contacts 734, switch bank contact and X wiper of code switch KS, conductor 705, contacts 819, wiper 853 and bank contact, conductor 873, seventh bank contact and wiper 1523, conductor 1005, contacts 1042 and 1053, conductor 1084 and winding of XF relay to battery. The circuit for operating relay YF may be traced as follows: ground, contacts 735, sixth bank contact and Y wiper of code switch KS, conductor 707, contacts 820, wiper 854 and bank contact, conductor 874, seventh bank contact and wiper 1522, conductor 1008, contacts 1043 and 1054, conductor 1086 and winding of relay YF to battery. Relay PF at contacts 1055 again energizes the slow-to-release relay PL to prepare a circuit for relay LF which, however, is not energized at this time since two of the code frequency relays are operated. At contacts 932 relay PL again prepares its locking circuit and at contacts 934 again energizes relay JC.

Relay JC at contacts 921 again completes the locking circuit for relay PL over contacts 1511 and 932 and also completes the circuit for energizing stepping magnet CSM. At contacts 922 relay JC opens the circuit to relay PF, at contacts 923 again closes the circuit for operating overflow relay SP which in turn energizes stepping magnet KSM and at contacts 924 again shorts the upper winding of relay JC.

In response to the operation of relays XF and YF the multi-frequency digit "4" is transmitted to the distant Regina receiver in a manner similar to that previously described, this time connecting the 700 cycle source to the upper right hand winding of repeat coil RC through contacts 1411 and 1421 and connecting the 1300 cycle source to the lower right hand winding of repeat coil RC by way of contacts 1414 and 1424. These frequencies are induced in the left hand windings of repeat coil RC and are transmitted over the circuits previously traced to route the call through Regina to select an idle trunk extending from Regina to Winnipeg.

Relay PF restores a short interval of time after its winding is short circuited and at contacts 1053 and 1054 opens the circuits to relays XF and YF which then restore to terminate the transmission of the fifth routing digit. Slow-to-release relay PL restores causing the relay JC to restore and the latter relay in restoring causes the control switch CS and the code switch KS to step to their next positions to control the transmission of the sixth routing digit in the same manner as previously described for the fifth routing digit. In this position (eighth) of the control switch wiper 1526 completes a circuit for operating relay MA in order to subsequently send a signal indicating the end of frequency transmission. The circuit for operating relay MA extends from grounded conductor 1100, wiper 1526 and its eighth bank contact, conductor 909, contacts 915, conductor 906, contacts 1033 and 1023, and winding of relay MA to battery. Relay MA to contacts 1012 completes its previously traced locking circuit including conductor 1010, contacts 1334 and grounded conductor 1100.

As previously described the sixth routing digit is skipped as only two routing digits are required to route the call through Regina and, in this case contacts 738 grounds the seventh bank contact accessible to the skip wiper SK of the code switch KS thereby causing relay JC to be operated over conductor 876, wiper 1530 and eighth bank contact, and interrupter springs 1512 as previously described. Relay JC again causes the control switch to be stepped to its ninth position and relay JC restores as a result of the energization of magnet CSM. The differential relay CU is now restored due to the closure of a circuit for the lower winding of relay CU from grounded conductor 1100, wiper 1526, ninth bank contact and conductor 1206.

Since the office code digits have been dialled, the overflow digit switch is operated and the eighth bank contact of the skip wiper SK is grounded from off-normal contacts 826 to again ground conductor 876 to cause the reoperation of relay JC as previously described. Relay JC and stepping magnet CSM operate as previously described to step the wipers of the control switch to their tenth positions. Relay JC again operates and restores relay SP to cause the overflow code switch KS to step to its ninth position which is marked in code with the first dialled office code digit. In this instance, since frequency pulsing is not initiated until all but the last digit is dialled, the digit switch DSW is advanced beyond its seventh position with the result that differential relay CU is operated over only its upper winding when the control switch is advanced to its tenth position. Relay CU at contacts 1292 now completes the previously traced circuit over wiper 1525 and its tenth bank contact for reoperating relay PF and relay PL reoperates in response to the operation of relay PF.

Multi-frequency transmission now takes place in accordance with the first digit of the Winnipeg office code stored in the overflow digit switch DS. The first digit of the office code being digit "9," the Y wiper of the code switch is grounded by way of ground, ninth bank and wiper 843 of digit switch DS, conductor 708, ninth bank contact and Y wiper of code switch KS. This ground is now extended over conductor 707, contacts 820, wiper 854 and bank contact, conductor 874, tenth bank contact and wiper 1522, conductor 1008, contacts 1043 and 1054, conductor 1086 and winding of code frequency relay YF to battery. In this case, since only one code frequency relay is operated, relay LF is now operated over the following circuit: grounded conductor 1120, contacts 916 and 935, conductor 969, back contacts 1447 and 1417, make contacts 1427, back contacts 1457 and winding of relay LF to battery. 1100 cycle and 1500 cycle sources are now connected to the right hand windings of repeat coil RC by way of contacts 1423—1432 and 1435—1426 to transmit multi-frequency digit "9" to Regina.

Since the switches in the Winnipeg area are assumed to be controlled by "step-by-step," or "dial" pulses, translation of the multi-frequency digits may take place in the trunk circuits interconnecting Regina and Winnipeg in any well known manner to extend the connection.

The operation of relay PL again shorts relay PF and again operates relay JC. Relay JC again operates relay SP and stepping magnet CSM. Relay SP operates stepping magnet KSM. Relay PF restores after an interval, due to its short circuit, to open the circuit to relay YF which restores and opens the circuit to relay LF which likewise restores. Multi-frequency transmission of 1100 and 1500 cycles is terminated in response to the restoration of relays YF and LF. The circuit to relay PL is opened at interrupter springs 1511 in response to the operation of magnet CSM and relay PL restores after an interval. When relay PL restores the circuit to relay JC is opened at contacts 934 to cause relay JC to restore. In the same manner as previously described the stepping magnets CSM and KSM are restored in response to relay JC restoring to step the control and code switches to their next positions. The control switch CS is stepped to its eleventh position and the code switch KS is stepped to its tenth position. With the control switch CS in its eleventh position relay JC at contacts 922 again reoperates relay PF, relay PF reoperates relay PL, and the director is now in condition to transmit the frequencies corresponding to the second office code digit "8" which is registered in the first set of storage relays.

The transmission of the second office frequency code digit is similar to that described for the first office code except that the code markings for this second digit is registered in the first set of storage relays which has been set to register the digit "8" by the operation of relay X. Contact 1721 of relay X in addition to completing a locking circuit for relay X also grounds conductor 1502 thereby grounding the eleventh bank contact and wiper 1523. When relay PF reoperates this ground is extended on conductor 1005, contacts 1042 and 1053, conductor 1084 and winding of relay XF to battery. At contacts 1417 relay XF completes a circuit for operating relay LF from grounded conductor 1120, contacts 916 and 935, conductor 969, back contacts 1447, make contacts 1417 and contacts 1428 and 1457 to relay LF and battery. With both relays XF and LF operated, the frequency code digit "8," comprising frequencies 900 and 1500 cycles, is connected to the right hand windings of repeat coil RC by contacts 1413—1433 and 1435—1416 and transmitted over the previously traced circuits to Regina. This multi-frequency digit is translated back into "step-by-step," or decimal, pulses to control the Winnipeg switches in a well known manner.

Relay PL again shorts relay PF and again operates relay JC. Relay JC again operates stepping magnet CSM. Relay PF restores after an interval to open the circuit to relay XF which in turn restores to cause relay LF to restore and stop the code frequency transmission for the second office code digit. The circuit to relay PL is again opened at contacts 1511 in response to the operation of magnet CSM and relay PL restores after an interval. When relay PL restores relay JC restores and opens the circuit to stepping magnet CSM to cause the control switch to step to its twelfth position. At contacts 922 relay JC reoperates relay PF over wiper 1525 and its twelfth bank contact. Relay PF again reoperates PL and the director is in condition to transmit the frequencies corresponding to the stored third office code digit.

The transmission of the code frequency digits for the third office code digit and the subscriber's number are similar to that described for the transmission of the second office code digit. The code frequency relays being controlled by the stored digits in the storage relay sets on successive operations of the control switch to transmit the code frequency digits as illustrated in the chart of Fig. 14A.

When the director has finished transmitting all the stored digits, which in this case includes the three office code digits and the five subscriber digits, the control switch CS is advanced to its eighteenth position and the digit switch DSW is in position eight. A circuit is now completed through the lower winding of differential CU with the result that relay CU now restores its armatures. The circuit for the lower winding of relay CU may be traced as follows: grounded conductor 1100, wiper 1526 and eighteenth bank contact, conductor 1507, eighth bank contact and wiper 1765, conductor 1206 and lower winding of differential relay CU to battery. Relay CU at contacts 1292 opens the circuit to relay PF to prevent its reoperation and at contacts 1291 opens the circuit to time relay TC. Due to the condenser DC and resistance DR connections, relay TC releases after an interval of approximately two seconds and at contacts 1243 opens a further point in the circuit of relay PF. Relay TC closes contacts 1242 to complete a stepping circuit for automatically advancing the wipers of control switch CS to their twenty-first position. This circuit may be traced from ground, contacts 1242, conductor 1304, multipled contacts including the eighteenth, nineteenth and twentieth bank contacts, wiper 1528, conductor 983, interrupter contacts 1511, conductor 984, contacts 971, conductor 985 and winding of stepping magnet CSM to battery. Stepping magnet energizes and opens its own circuit at contacts 1511 thereby operating in a manner of a buzzer to advance the wipers of the control switch to their twenty-first bank contacts. As soon as wiper 1526 is advanced from its eighteenth position the circuit through the lower winding of differential relay CU is opened with the result that relay CU now operates its armatures to prepare a circuit for reoperating relay TC at contacts 1291. With control switch CS in its twenty-first position relay TC is reoperated over the following circuit: grounded conductor 1100, rectifier RT, resistance RR, wiper 1527 and at its twenty-first bank contact, conductor 1202, contacts 1291, and windings of relay TC to battery. Relay TC closes its contacts 1243 to complete a circuit for operating relay MB as follows: grounded conductor 1100, back contacts 1311 and 1333, conductor 987, contacts 922, conductor 986, contacts 1292 and 1243, conductor 1201, wiper 1525 and twenty-first bank contact, conductor 1079, contacts 1011, and winding of relay MB to battery. Relay MB at contacts 1031 connects the 1500 cycle source to the right hand winding of repeating coil RC by way of conductors 1401 and 1081 and at contacts 1032 connects the 1700 cycle source to the right hand winding of repeat coil RC by way of conductors 1403 and 1070 to transmit the end of dialling signal, commonly known as the "ST" signal. This signal is transmitted over the established connection and operates apparatus to indicate completion of transmission. Relay MB at contacts 1033 opens the circuit to slow-to-release relay MA which restores after a short interval. When relay MB restores, the "ST" signal of 1500 and 1700 cycles is disconnected at contacts 1031 and 1032 and at contacts 1035 completes a circuit for operating release relay SW in the overflow trunk. This circuit may be traced from grounded conductor 1100, pulsing springs 1330, conductor 1090, contacts 1035 and 1015, conductor 1076, twenty-first bank contact and wiper 1530, conductor 876, bank contact and wiper 856, contacts 840, conductor 770, high resistance H1, SK wiper and tenth bank contact, conductor 605 and lower winding of release relay SW to battery. A branch of this circuit extends from conductor 770 through the winding of SP, resistance 780 to battery for also energizing relay SP.

Release relay SW, in the same manner as previously described, locks itself at contacts 654, open the circuits to relays CO and CK at contacts 652, connects the EC control leads of the selectors 1S5 and 3S1 at contacts 654 and 656, opens the circuit to director relays AD and E at contacts 655 and 657, and closes the circuit to hold KSM energized at contacts 659. Relay CO restores and opens the circuit of relay R2, interconnects the two selectors and disconnects the director to open the circuit of director start relay ST. Relay CK disconnects the code switch from the director and relay R2 causes relay RA2 to restore to remove the code markings from the code switch. All relays except relays SC, SD and SW in the overflow trunk are now restored to normal until the talking connection is released.

In the same manner as previously described relays AD, E and ST in the director restore, causing relay B to restore and the latter relay causes all the switches in the director to restore to normal. The director is now fully restored and may be used on subsequent calls.

*Third alternate route*

In case all the Winnipeg trunks, all the fisrt choice Calgary alternate trunks, and all the second choice Regina trunks are busy when the overflow trunk is seized then relays HG, AR1 and AR2 are operated and a circuit is completed for operating the third choice Saskatoon-Brandon alternate route relay R3 over contacts 415, 422, 432, 442 and 455. At contacts 473 relay R3 operates its slave relay RA3 over conductor 408. In a manner apparent from the foregoing description relay RA3 marks the six routing digits 9, 8, 9, 8, 8 and 9 in the X and Y banks of the code switch KS. The first three routing digits 9, 8 and 9 routing the call to Saskatoon, the next two routing digits 8 and 8 routing the call through Saskatoon to Brandon, and the last routing digit 9 routing the call through Brandon to Winnipeg. In this instance, since the Saskatoon and Brandon exchanges have the well known Strowger step-by-step switches, step-by-step pulses, or decimal digits, are transmitted by the director instead of coded frequency digits.

*All trunks busy*

Another condition may arise in which all the direct trunks as well as all three alternate trunk routes are busy in which case relays HG, AR1, AR2 and AR3 are all operated. The circuit to relay NB is opened at contacts 421, 431 and 441 and relay NB is prevented from operating if this overflow trunk has not yet been seized and, if seized, relay NB restores. In case this overflow trunk has been seized under this all-trunks-busy condition, then a circuit is completed for operating relay OF in its first step to close only its X contacts 465 over make contacts 415, 422, 432, 442 and 454 and lower winding of relay OF. The lower winding of relay OF, when energized, produces only enough magnetism to cause the relay armature to close only the X contacts 465 without operating the other contacts. Relay OF remains in this condition until relay SE restores and relay SE restores shortly after the overflow trunk has seized an idle director. When relay SE restores relay OF operates fully in its second step over the following circuit: from ground contacts 561, conductor 485, contacts 452, conductor 489, contacts 532, 522, 512, conductor 404, contacts 472, X contacts 465, contacts 466 and upper winding of relay OF to battery. At contacts 461 relay OF disconnects ground from conductor 488 and selector 1S5 and at back contacts 462 opens the circuit to the time-out relay TO which restores and to relay ST in the director which restores. At front contacts 462 closes a locking circuit for relay OF as follows: ground contacts 563, conductor 496, contacts 462 and upper winding of relay OF to battery. At contacts 463 relay OF opens the circuit to relays CO and CK which restore; at contacts 464 opens the circuit to relay A which restores; at contacts 466 opens the circuit to its upper winding after the locking circuit was closed at contacts 462; and at contacts 467 connects the interrupter signal at 120-I. P. M. to the EC pulse lead of selector 3S1 to give the calling toll operator an indication that the call cannot be completed and that she should release and try again. Relay A restores and incidentally energizes magnet DSM without effect at this time. Relay CO restores and at contacts 551 reoperates relay SE without effect at this time. At contacts 552 and 554 disconnects the selector 1S5 from the director; at contacts 553 and 555 connects the selector 3S1 to selector 1S5 and at contacts 559 again short-circuits relays CO and CK. Relay CK, upon restoring, at contacts 811 recloses the all-director-busy circuit, at contacts 812 and 814 disconnects the director from selector 3S1, at contacts 813 disconnects the director from selector 1S5 to restore relay E in the director, at contacts 817 closes the restoring circuit of the code switch KS if operated, and at contacts 818, 819, 820, 830 and 840 disconnects the code switch KS from the director. The director is now freed and may be used on other calls.

*Special codes*

It was previously described how and when the director initiated retransmission of the stored digits when seven or eight digits were dialled into the director for retransmission. In extending calls involving only "step-by-step" offices it will be remembered that after the transmission of the necessary routing digits, the director initiates transmission of the office code digits only after the last office code digit has been stored in the director and that the succeeding subscriber digits are each transmitted after each has been stored in the director. It was also explained, due to the speed of frequency sending, how the sending of multi-frequency digits by the director was delayed after transmission of the first three routing digits until all, or all but the last digit of the dialled number was stored in the director.

The director is capable of receiving a variable number of dialled incoming digits, storing these digits, then retransmitting these digits either as "step-by-step" pulses or as multi-frequency digits dependent upon the route the call is extended over. For example, the director may receive an "operator code" which comprises only three or four digits or may receive ten or eleven digits which in addition to the usual office code digits and the subscriber digits, also includes "area" code digits, all of which are required to route the call to its destination. The first digit of the "operator" code is always digit "1" and this digit is stored in the overflow trunk and transmits a special marking to the director to inform the director that an "operator" code is being dialled comprising only three or four digits. This special marking controls relays MW and MX in the director and these relays control circuits to enable the initiation of frequency sending after the third digit of the "operator" code has been stored in the director. When ten or eleven digits are to be dialled and retransmitted the second digit is always "1" or "0" and this causes the operation of relay FC which controls circuits in the director which delays transmission of multi-frequency digits until after the tenth digit has been stored in the director. When seven and eight digits are dialled the first digit is never "1" and the second digit is never "1" or "0" and in these seven and eight digit codes the relays MX, MW and FC are never operated. The relays MX, MW and FC are therefore controlled in accordance with the dialled first and second digits to inform the director of the number of dialled digits it is to receive for each call. These relays are effective to delay the initiation of multi-frequency transmission at a time when relay MF is operated and has closed contacts 910.

In order to describe how the initiation of multi-frequency transmission is delayed until after the tenth digit of a ten digit code is stored in the director, it will be assumed that the director is seized over the overflow trunk and that the call is being routed through Regina over the second choice alternate route as previously described. It will be remembered that relay MF is operated and, since the first dialled code digit is not "1," the relays MX and MW are not operated. The second dialled code digit is stored in the first set of director storage relays and in case the second digit is the digit "1" relays W and X of the first set of storage relays are operated and locked, while if the second dialled code digit is the digit "0" then relay Z alone is operated and locked. Relay FC is operated by relays W and X in storing the digit "1" and is also operated by relay Z in storing the digit "0." These circuits may be traced as follows: grounded conductor 1120, contacts 916 of relay MF, conductor 962, make contacts 1712 and 1722 of relay FC to battery when relays W and X are operated and by way of back contacts 1712 and 1732, contacts 1742 and 1722 to relay FC when relay Z alone is operated. At contacts 1751, 1752 and 1753 relay FC completes circuits through the seventh, eighth and ninth bank contacts and wiper 1765 of digit switch DSW for maintaining the lower winding of differential relay CU energized until after the tenth digit of the dialled code has been stored in the director. The upper winding of differential relay CU is energized over grounded conductor 1100 and it was previously described how the lower winding was energized over wiper 1526 and its sixth bank contact, the contacts 910, 919, 918 and 917 of relay MF and the wiper 1765 in the first six positions of the digit switch DSW. Relay FC, in a similar manner, maintains the lower winding of differential relay CU energized while the digit switch DSW is in its seventh position as follows: grounded conductor 1100, wiper 1526 and its sixth bank contact, conductor 999, contacts 910, conductor 900, contacts 1751 of relay FC, seventh bank contact and wiper 1765, conductor 1206 and lower winding of relay CU to battery. With the digit switch DSW in eighth position the lower winding of relay CU is energized over a similar circuit this time including contacts 1752 of relay FC and the eighth bank contact and wiper 1765. With the digit switch in ninth position the lower winding of relay CU is energized over contacts 1753 of relay FC, the ninth bank contact and wiper 1765. After the tenth digit of the dialled code is stored in the ninth storage relay set the digit switch DSW steps to its tenth position where a circuit is no longer completed for the lower winding of relay CU, with the result that differential relay CU now closes its contacts 1292 to initiate multi-frequency transmission as previously described. When the ten stored digits have been retransmitted as multi-frequency digits, the control switch CS is in its twentieth position and the digit switch DSW is in its tenth position where a circuit is completed for the lower winding of relay CU in order to delay the release of the director for approximately two seconds to enable the storage and retransmission of an eleventh digit in case an eleven digit code is being dialled. The circuit for energizing the lower winding of relay CU may be traced from grounded conductor 1100, wiper 1526 and its twentieth bank contact, conductor 1505, tenth bank contact and wiper 1765, conductor 1206 and lower winding of relay CU to battery. Differential relay CU now restores its armatures and at contacts 1292 opens the circuit to relay PF to prevent its operation and at contacts 1291 opens the circuit to timer relay TC which restores its armatures after approximately a two seconds delay. Relay TC at contacts 1243 opens a further point in the circuit of relay PF and at contacts 1243 completes a circuit for operating stepping magnet CMS to advance the control switch CS to its twenty-first position. This circuit may be traced from grounded contacts 1242, conductor 1304, twentieth bank contact and wiper 1528, interrupter contacts 1511, conductor 984, contacts 971, conductor 985 and magnet CMS to battery. The operation of interrupter contacts 1511 by magnet CSM interrupts this circuit to cause magnet CSM to advance the control switch to its twenty-first position. When wiper 1526 of switch CS advances to its twenty-first position the circuit through the lower winding of relay CU is opened with the result that differential relay CU now reoperates its armatures. At contacts 1291 relay CU recloses the circuit to reoperate relay TC and the latter relay at contacts 1243 completes the previously traced circuit for operating relay MB. Relay MB transmits the "ST" signal as previously described and causes relay MA to restore. When relay MA restores relay MB is restored and a ground pulse is transmitted to the overflow trunk to operate relay SW as previously described. The overflow trunk partially releases and causes the release of the director as previously described.

In case an eleven-digit code is received by the director there is no delay in releasing the director because the digit switch DSW is advanced, after storing the eleventh digit, to its normal position and no circuit is completed for energizing the lower winding of relay CU. Relays CU and TC, therefore, maintain their contacts 1292 and 1243 closed and, since the control switch CS is advanced to its twenty-first position after retransmitting the eleventh digit of the dialled code, the relay MB is immediately operated without a two-second delay to transmit the "ST" signal and release the director as previously described.

When an "operator" code is dialled and the call is being routed through offices requiring transmission of multi-frequency digits, the relays MW and MX are effective to initiate the transmission of the multi-frequency digits after the third digit of the "operator" code is stored in the director. As previously stated, the first digit of the "operator" code is always the digit "1," and when this digit is registered in the overflow digit switch DS, relays MW and MX are operated from the overflow trunk in response to the operation of relay MD while the control switch CS is in its first position. The circuit for operating relay MX may be traced as follows: ground, first bank contact and wiper 841 of digit switch DS, conductor 704, first bank contact and W wiper of code switch KS, conductor 703, contacts 818, wiper 852 and engaged bank contact, conductor 872, first bank contact and wiper 1524 of contact switch CS, conductor 1002, make contacts 1041, conductor 967 and upper winding of relay MW to battery. The circuit for operating relay MX extends from ground, first bank contact and wiper 842 of digit switch DS, conductor 706, first bank contact and X wiper of code switch KS, conductor 705, contacts 819, wiper 853 and engaged bank contact, conductor 873, first bank contact and wiper 1523 of contact switch CS, conductor 1005, make contacts 1042, conductor 968 and upper winding of relay MX to battery. Relays MW and MX complete locking circuits for themselves through their lower windings, contacts 944 and 954, conductor 962, contacts 916 to grounded conductor 1120. At contacts 941, 942, 943, 951, 952 and 953 relays MW and MX open points in the previously traced circuits (including wiper 1526 and sixth bank contact, contacts of relay MF, wiper 1765 and the third, fourth, fifth and sixth positions of digit switch DSW) for maintaining the lower winding of differential relay CU energized until after the seventh digit of the dialled code is stored in the director. In this case when an "operator" code is being stored the relays MW and MX are operated, and therefore the circuit through the lower winding of differential relay CU is now opened as soon as wiper 1765 of digit switch DSW is advanced to its third position after storing the third digit of the "operator" code. Relay CU operates its armatures as soon as the circuit through its lower winding is opened in order to initiate the transmission of the multifrequency digits, including the three marked routing digits and the stored digits of an "operator" code in a manner apparent from the foregoing description.

When the three stored digits of the "operator" code has been retransmitted, the control switch CS is in its thirteenth position and the digit switch DSW is in its third position where a circuit is completed to the lower winding of differential relay CU in order to delay the release of the director for approximately two seconds to determine if another digit is to be received and retransmitted. This circuit is similar to the previously traced circuits and includes wiper 1526 of switch CS and its thirteenth bank contact, conductor 998, third bank contact and wiper 1765 of digit switch DSW, conductor 1206 and lower winding of differential relay CU. Relay CU restores and opens the circuit to timer relay TC at contacts 1291. Relay TC restores after a two-second delay and completes at contacts 1242 a circuit for intermittently operating stepping magnet CMS until the control switch reaches its twenty-first position. When wiper 1526 was advanced to its thirteenth position, the circuit through the lower winding of relay CU is opened and relay CU again operates its armatures. At contacts 1291 relay CU reoperates relay TC. At contacts 1243 relay TC completes the circuit for operating relay MB. Relay MB transmits the "ST" signal as previously described and causes relay MA to restore. When relay MA restores relay MB is restored and a ground pulse is transmitted to the overflow trunk to operate release relay SW as previously described. The overflow trunk partially releases and causes the release of the director as previously described.

In case the "operator" code comprises four digits, instead of three as just described, the operations are the same as described with the exception that the digit switch DSW is advanced to its fourth position and the control switch CS is advanced to its fourteenth position and the lower winding of the differential relay CU is energized over wiper 1526 and its fourteenth bank contact, conductor 996, fourth bank contact and wiper 1765.

When the "operator" code is dialled and the call is routed solely through the "step-by-step" offices, the operation of relays MW and MX perform no function, since, in such routing, the relay MF is not operated, impulse transmission takes place in the same manner as described for the seven and eight digit codes. That is the six routing digits are transmitted, or some are skipped, and the sending is delayed until after the third digit is dialled and the digit switch DSW steps to its third position.

*Call abandoned*

In case the call is abandoned at any time after seizure of the overflow trunk and director, the holding ground is removed from the C lead 401 to open the holding circuit of overflow relay SC to cause it to restore. Relay SC at contacts 611 opens the circuits to relays CO and CK and at contacts 612 opens the circuit to relay DS and disconnects the holding ground for selector 1S5 to cause this selector and the selectors beyond to restore. Relay CO, upon restoring, at contacts 551 opens the locking circuit of any operated relay, such as relays R3, R2, R1 or H, to cause it to restore and in turn causes its slave code marking routing relay, such as relay RA3, RA2, RA1, or HA, to restore and remove the code marking of the routing digits from the banks of the code switch KS. At contacts 552 to 555 relay CO disconnects the director from selector 1S5, at contacts 556 and 558 opens the circuits of relays TO and director start relay ST. Relay CK, upon restoring, disconnects the director from selector 1S5, at contacts 814 opens the circuit to the director relay E, at contacts 815 opens the circuit to the director relay AD, at contacts 818—840 disconnects the code switch KS from the director, and at contacts 817 closes a self-restoring circuit through off-normal contacts 751 and interrupter contacts 752 to restore the code switch KS to normal if relay SW is not operated to hold magnet KSM energized over conductor 660 and contacts 659.

Relay SD, upon restoring after its circuit is opened by relay SC, at contacts 561 opens the locking circuit of release relay SW which restores if operated, at contacts 562 opens the all-director-busy lead ADB, at contacts 563 opens a further point in the circuit of director start relay ST, at contacts 564 closes a self-restoring circuit for the digit switch DS, at contacts 565 extinguishes the busy lamp BL, at contacts 566 marks the overflow trunk bank contacts of selector 3S1 with a ground busy potential, and at contacts 567 opens another point in the circuit of relay SC. The circuit for restoring digit switch DS to normal may be traced from ground, closed off-normal contacts 821 of switch DS, conductor 500, contacts 564, conductor 599, interrupter contacts 824 and winding of stepping magnet DSM to battery. DSM operates at contacts 824 to interrupt its own circuit thereby causing the stepping magnet to intermittently operate until the wipers of DS are restored to normal at which time the off-normal contacts 821 open when the digit switch is restored to normal. Relay SW restores, if operated, and at contacts 659 opens the circuit of stepping magnet KSM. The self-restoring circuit for the code switch KS is now effective to restore the code switch to normal. This circuit extends from ground contacts 817, conductor 702, off-normal contacts 751 of switch KS, interrupter contacts 752 and magnet KSM to battery. Stepping magnet intermittently operates over this circuit until the wipers of the code switch KS are returned to normal at which time off-normal contacts 751 open to open the self-restoring circuit. The selecting switch SSW remains in the position last used. All of the overflow trunk relays and switches are now restored to normal.

In the director relays AD and E restore and the latter relay opens the circuit of relay EB which also restores as previously described. Start relay ST also restores and opens the circuit of relay B at contacts 1341 and the latter relay in the same manner as previously described closes the self-restoring circuit for the control switch CS at contacts 1111, disconnects ground from conductor 1100 controlling the circuits of relays P or PF, CU and TB at contacts 1112, opens the locking circuit of magnet DSWM at contacts 1113 to cause magnet DSWM to restore and step the digit switch another step, at contacts 1114 closes the shunt around its upper winding, at contacts 1115 opens the stepping circuit to magnet PSM, at contacts 116 opens the locking circuits to the operated storage relays to cause their release, at contacts 1117 recloses one of the circuits to the common relay ADB, and at contacts 1118 and 1119 opens the circuit of motor M to stop the operation of pulsing contacts 1230, 1330 and 1340.

The control switch CS is restored as previously described to complete the self-restoring circuit for switch PS at off-normal contacts 1513. Switch PS, when it reaches normal position and closes back contacts 1357, completes the self-restoring circuit for the digit switch DSW as described. When the digit switch DSW reaches normal relays C, CD restore and cause the register switch RS to restore as previously described. The director is now fully restored and may be again used on subsequent calls.

*Director fault*

It was previously described how wiper 1352 is stepped to its multipled bank contacts and how the wipers of time switch PS are stepped one step every ten seconds over the ten second pulse lead. It was also described how the circuit to the slow-to-operate relay TB had its circuit closed every time relay P operated to initiate pulse transmission, and that during the normal operation, the relay P was released to open the circuit to relay TB before relay TB had time to operate. When relay P restores the charge on the condenser CT is discharged over a circuit including resistance R100 and back contacts 1065 of relay P, and relay TB, under proper operating conditions, is never operated. However, in case of a fault, in which case relay P is not restored to open the circuit to relay TB, the condenser CT becomes fully charged after a two second delay and relay TB is operated over its lower winding alone.

Relay TB, upon operating, at back contacts 971 opens the circuit to magnet CSM and at front contacts 971 closes a circuit over conductor 985 for operating the alarm lamp AL in series with magnet CSM. An alarm (not shown) is also sounded for the attendant. At contacts 972 relay TB grounds conductor 988 to maintain relay B in operated position independent of contacts 1341 of start relay ST. At contacts 973 relay TB completes a locking circuit for itself through the attendant's key TK and at contacts 974 opens the stepping circuit to magnet PSM to stop switch PS. In this case the alarm is sounded within two seconds after a fault occurs and the attendant then checks the trouble by operating the hand switch (Fig. 15) to light a trouble lamp, such as TL7, over wiper 1529 in accordance with the position of the control switch. A similar hand switch and wiper of the digit switch (not shown) may be provided for controlling a lamp to indicate the position of the digit switch. After the trouble is cleared, or in case the attendant wishes to release the director, the attendant operates the trouble release key TK' to intermittently ground conductor 966 to operate and restore magnet PSM to step the wipers of switch PS to their tenth contact. Wiper 1351 holds relay ST operated over its tenth bank contact and lead PA to operate the permanent alarm in series with relay ST. Wiper 1351, after leaving its multipled bank contacts, disconnects relay ST from conductor 871 thereby opening the circuit of the overflow time out relay TO. Relay TO at contracts 541 opens the locking circuit of the operated code relay, such as R3, R2, R1 or H, and completes a circuit for operating relay OF as follows: ground, contacts 561, make contacts 551, conductor 485, contacts 452, conductor 489, contacts 541, conductor 497 and the upper winding of relay OF to battery. Relay OF at contacts 462 closes a new circuit for relay OF including contacts 563 and conductor 496, at contacts 463 opens the circuit of relays CO and CK which now restore, and at contacts 467 connects the 120-I. P. M. signal to the EC pulse lead extending to selector 3S1 to thereby inform the calling operator that the call cannot be completed. The operated code marking slave relay, such as HA, RA1, RA2 or RA3, restores when its parent relay restores to remove the ground code markings from the banks of code switch KS. Relays CO and CK restore to perform the same functions as previously described. A further operation of release key TK' causes switch PS to restore to normal position where the circuit to director relay ST is opened to cause the release of the director as previously described.

In case a fault occurs during multi-frequency transmission, in which relay P is not operated, the relay TB is also not operated with the result that the circuit to stepping magnet PSM is not opened. In this case (as well as for decimal transmission), if the director has not completed its transmission and restored within ninety seconds, the switch PS is stepped to its tenth bank contact. Wiper 1351 completes the circuit for maintaining relay ST operated in series with the permanent alarm relay (not shown) over lead PA and this alarm relay sounds an alarm in the usual manner. Wiper 1352 completes a circuit for flashing the busy lamp BL from the 120— I. P. M. source over its tenth bank contact. The attendant may operate the hand switches to determine the location of the control and digit switches CS and DSW as previously described. After clearing the trouble the attendant operates key TK' to operate switch PS to normal to thereby restore the director as previously described. When wiper 1351 leaves its ninth bank contact the circuit of time out relay TO over conductor 871 is opened to cause the relay OF to operate and send the trouble signal to the calling operator as previously described.

What is claimed is:

1. In an automatic telephone system, a local exchange, a distant exchange, a plurality of other exchanges, a group of direct trunks extending from said local exchange to said distant exchange, a similar group of direct trunks for each of said other exchanges extending from said local exchange to each said other exchange, other trunks extending from said other exchanges to said distant exchange, overflow trunks individual to each group of direct trunks, register senders common to all said overflow trunks, local switches in said local exchange, other switches in said other exchanges, certain of said local switches operated by incoming digits on a call to said distant exchange to seize a direct trunk to said distant exchange if available or operated to seize an overflow trunk individual thereto in case all said direct trunks to said distant exchange are busy, means responsive to the seizure of said overflow trunk for seizing one of said common register senders, all trunk busy means in said overflow trunk operated in accordance with the busy condition of said groups of direct trunks, route determining means in said overflow trunk controlled by said all trunk busy means for determining the first available alternate route to said distant exchange by way of said direct trunks to one of said other exchanges, code marking means in said overflow trunk operated in accordance with said route determining means, transmitting means in said register sender controlled by said code marking means for transmitting switch controlling pulses to operate some of said local switches to route the call over a direct trunk to said one exchange and for operating some of said other switches in said one exchange to further extend the call over one of said other trunks to said distant exchange.

2. In an automatic telephone system as claimed in claim 1 wherein said code marking means includes a further code marking means operative only in case the alternate route chosen requires the transmission of some multi-frequency digits, and means in said register sender controlled by said further code marking means for transmitting multi-frequency digits over said local switches to operate said other switches by multi-frequency digits.

3. In an automatic telephone system as claimed in claim 2 including means whereby said register sender transmits decimal pulses to operate said local switches and thereafter transmits multi-frequency digits to operate said other switches.

4. In an automatic telephone system as claimed in claim 3 wherein said register sender includes means to delay the transmission of multi-frequency digits until it has been determined how many multi-frequency digits are to be transmitted by the register sender.

5. In an automatic telephone system as claimed in claim 3 wherein said register sender includes means for interpolating a multi-frequency signal to condition said other switches to respond to multi-frequency transmission after decimal transmission and before transmission of multi-frequency digits and for transmitting a terminating multi-frequency signal after the last transmitted multi-frequency digit to indicate completion of transmission.

6. In an automatic telephone system as claimed in claim 3 including means in said register sender for disabling the decimal transmitting means during the transmission of multi-frequency digits.

7. In an automatic telephone system wherein a local exchange has a first group of direct trunks to a distant exchange and a group of direct trunks to each of a plurality of other exchanges which have other trunks extending to said distant exchange and wherein a plurality of alternate routes including the direct trunks to said other exchanges and said other trunks are provided for completing calls from said local exchange to said distant exchange when all the direct trunks of said first group are busy, an overflow trunk individual to each group of direct trunks, a register sender common to said overflow trunks, means for seizing the overflow trunk individual to said first direct trunk group in response to a call from said local exchange to said distant exchange at a time when all said direct trunks of said first group are busy, means responsive to said seizure for connecting said register sender to said seized overflow trunk, route determining means in said seized overflow trunk operated in accordance with the busy condition of all said direct trunks for determining the first available one of said alternate routes, code marking means in said seized overflow trunk operated by said route determining means to mark the first available alternate route in said seized overflow trunk, and transmitting means in said register sender controlled by said alternate route marking for routing said call to said distant exchange over a direct trunk to one of said other exchanges and over one of said other trunks to said distant exchange.

8. In a telephone system as claimed in claim 7 wherein automatic switches of different types are used in some of said alternate routes, said transmitting means including means for transmitting different types of switch controlling digits for controlling said different types of switches, and said code marking means including further markings to control said transmitting means to transmit different types of switch controlling digits dependent upon the alternate route determined by said route determining means.

9. In a telephone system as claimed in claim 8 wherein one of said different types of switch controlling digits each comprise decimal pulses and the other type of switch controlling digits each comprise a single pulse of a plurality of different multi-frequency currents.

10. In an automatic telephone system, an overflow trunk, means for seizing said overflow trunk in response to a call when certain busy conditions prevail, a register sender, means for connecting said overflow trunk to said register sender in response to the seizure of said overflow trunk, decimal transmitting means in said register sender for transmitting outgoing decimal pulses, multi-frequency transmitting means in said register sender for transmitting outgoing multi-frequency digits, marking means in said overflow trunk effective under predetermined busy conditions prevailing at the time of said seizure for causing the operation of only said decimal transmitting means to complete said call, and additional marking means in said overflow trunk effective under different predetermined busy conditions prevailing at the time of said seizure for causing first the operation of said decimal transmitting means followed by the operation of said multi-frequency transmitting means to complete said call.

11. In a telephone system, the combination of an overflow trunk which is seized in response to a call directed to a first group of outgoing trunks at a time when all trunks of said first trunk group are busy and a register sender operatively connected to said overflow trunk in response to the seizure of said overflow trunk, a first transmitting means in said register sender for transmitting decimal digits each comprising one or a train of direct current pulses, a second transmitting means in said register sender for transmitting multi-frequency digits each comprising a single pulse of two different voice frequency currents, marking means in said overflow trunk for controlling said first transmitting means to transmit a predetermined number of decimal digits to partially extend said call over an alternate route, and further marking means in said overflow trunk effective after said decimal transmission for controlling said second transmitting means to transmit multi-frequency digits over said partially extended connection to further extend said call.

12. In an automatic telephone system, a plurality of different routes including automatic switches for extending a call to a desired destination, means for selecting any one of said routes to complete said call, a register sender, means in said register sender controlled by said selecting means when taken into use on said call for transmitting only decimal digits to control some of said switches to route said call to said desired destination in case a first one of said routes is selected by said selecting means, and means in said register sender controlled by said selecting means when taken into use on said call for transmitting decimal digits followed by multi-frequency digits to control other of said switches to route said call to said desired destination in case a different one of said routes is selected by said selecting means.

13. In a telephone system as claimed in claim 12 wherein said selecting means controls said register sender to transmit variable numbers of digits dependent upon the route selected.

14. In a telephone system as claimed in claim 12 wherein said selecting means is controlled by and operated in accordance with the all trunk busy condition of said different routes.

15. In a telephone system as claimed in claim 12 wherein said first selected route includes direct trunks to said desired destination and said one selected different routes includes other trunks and at least one or more tandem exchanges.

16. In a telephone system as claimed in claim 14 wherein said first selected route includes direct trunks to said desired destination in case one of said direct trunks becomes idle before said register sender is taken into use, or includes other trunks and one or more tandem exchanges in case said direct trunks remain busy, and said one selected different route including further trunks and one or more different tandem exchanges.

17. In an automatic telephone system employing a first transmitting means normally effective to direct the setting up and completion of connections over any one of a plurality of direct trunk groups to different exchanges by digit transmission, and overflow trunk individual to each said trunk group, means effective depending upon an all trunk busy condition being encountered at any selected one of said trunk groups during the setting up of a connection for seizing the overflow trunk individual to said selected trunk group, a register sender common to all said overflow trunks, means for connecting said register sender to said seized overflow trunk in response to the seizure thereof, means in said register sender for registering digits transmitted by said first transmitting means and for thereafter retransmitting said registered digits to complete said connection, and marking means in said seized overflow trunk for operating said register sender to transmit routing digits before the retransmission of said registered digits to route said connection over another route including another of said trunk groups and another one of said different exchanges in tandem.

18. In an automatic telephone system, a local exchange, a plurality of distant exchanges, a corresponding plurality of groups of direct trunks, each said trunk group being individual to a distant exchange and extending from said local exchange to said respective distant exchanges, means responsive to a call from said local exchange to any called one of said distant exchanges for extending such calls over one of the direct trunks individual to said called exchange in case one of said direct trunks to said called exchange is idle, an overflow trunk individual to each group of trunks, said means operative to seize the overflow trunk individual to said called exchange in response to said call in case all of said direct trunks individual to said called exchange are busy, a register sender common to all of said overflow trunks, means in each overflow trunk responsive to seizure thereof for connecting said register sender thereto, and transmitting means in said register sender controlled from said connected overflow trunk to route said call to said called distant exchange over a route including the direct trunks of any other of said distant exchanges and such other distant exchange in a tandem connection.

19. In an automatic telephone system including overflow trunks and a register sender for use in setting up connections over alternate trunk groups when all the trunks of the direct trunk groups normally used for setting up said connections are busy, means in said overflow trunks for determining if there is an idle trunk in any of said trunk groups, routing means in said overflow trunks controlled by said determining means to select one of said alternate trunk groups in dependence upon said determination, code marking means in said overflow trunks operated by said routing means, and transmitting means in said register sender controlled by said code marking means to transmit routing digits to route the connection over said selected trunk group.

20. In a telephone system, direct trunks between a first exchange and a second exchange, indirect trunks including a tandem exchange between the first exchange and the second exchange, switches at said first exchange having access to said trunks, an overflow trunk in said first exchange individual to said direct trunks, means including one of said switches operated in response to a call to said second exchange for seizing said overflow trunk in case all of said direct trunks are busy, busy determining means in said overflow trunk for determining the condition of said direct and indirect trunks to said second exchange, route determining means in said overflow trunk operated in accordance with the operated condition of said busy determining means, code marking means in said overflow trunk operated in accordance with the operated condition of said route determining means in response to the seizure of said overflow trunk, a register sender in said first exchange, means in said overflow trunk for seizing said register sender in response to the seizure of said overflow trunk, and transmitting means in said register sender controlled by said code marking means for transmitting routing digits to control the extension of said call over said switches and said indirect trunks in case one indirect trunk is idle.

21. In a telephone system as claimed in claim 20 wherein said operated route determining means is changed by a change in said busy determining means in case one of said direct trunks becomes idle before seizure of said register sender by said overflow trunk and wherein said code marking means is also changed under control of said changed route determining means to control said transmitting means to transmit routing digits to control the extension of said call over said switches and said direct trunks.

22. In an automatic telephone system, a first overflow trunk corresponding to a first direct trunk route, a second, third and fourth overflow trunk each corresponding respectively to a second, third and fourth direct trunk route, means for seizing said first overflow trunk in response to a call directed to said first trunk route in case all the trunks in said first trunk route are busy, for seizing said second overflow trunk in case said call is directed to said second trunk route at a time all the trunks in said second trunk route are busy, for seizing said third overflow trunk in case said call is directed to said third trunk route at a time all the trunks of said third trunk route are busy, or for seizing said fourth overflow trunk in case said call is directed to said fourth trunk route at a time all the trunks in said fourth trunk route are busy, a register sender common to all said overflow trunks, means controlled from the seized overflow trunk for operatively connecting said register sender to the seized overflow trunk, route determining means in said seized overflow trunk operated in accordance with the all trunk busy condition of said first, second, third and fourth trunk routes for determining which one of said trunk routes will be used as an alternate trunk route, code marking means in said seized overflow trunk operated by said route determining means in accordance with the alternate route determined by said route determining means, and transmitting means in said register sender controlled by said code marking means for transmitting routing digits corresponding to said determined alternate route.

23. In a telephone system as claimed in claim 22 wherein said transmitted routing digits for the determined alternate route include digits to extend the call over any one of said direct trunk routes and further digits to extend the call to the desired destination.

24. In a telephone system as claimed in claim 23 wherein said transmitted routing digits for extending the call over said direct trunks comprise decimal digits and said further digits for extending the call to the desired destination comprise multi-frequency digits.

25. In a telephone system as claimed in claim 22 wherein said route determining means is operative to select the desired direct trunk route to which the call is initially directed in case one of these desired direct trunks becomes idle before seizure of said register sender by said seized overflow trunk, wherein said code marking means is operated by said route determining means in accordance with said desired direct trunk route, and wherein said transmitting means is controlled by said code marking means to transmit routing digits corresponding to said desired direct trunk route.

26. In a telephone system, a direct group of trunks connecting a first exchange with a second exchange, a plurality of alternate trunk routes including trunks between said first exchange and other exchanges, an overflow trunk individual to said direct trunks, a busying circuit normally marking said overflow trunk busy, a first means in said overflow trunk operated when all said direct trunks are busy for opening said busying circuit to enable seizure of said overflow trunk, means for seizing said overflow trunk in response to a call at a time when all said direct trunks are busy, a register sender, means in said overflow trunk operative after seizure of said overflow trunk for controlling said register sender to extend said call over any one of said alternate trunk routes dependent upon the all trunk busy condition of said trunk routes, and further means in said overflow trunk operated in case all said trunks in all said alternate trunk routes are busy for disabling said first means to reclose said busying circuit and prevent seizure of said overflow trunk.

27. In a telephone system, a first exchange, a second exchange, trunk connections between said first and second exchanges, an overflow trunk, means responsive to a call from said first exchange to said second exchange for seizing said overflow trunk only when all said trunk connections between said first and second exchanges are busy, a plurality of alternate routes including trunk lines connecting said first exchange to a corresponding plurality of other exchanges and including further connecting means connecting said other exchanges to said second exchange, said alternate routes being arranged in a first choice, a second choice, and a third choice alternate route to complete said call between said first and second exchanges, route determining means in said overflow trunk operated in accordance with the busy condition of said trunk lines of said respective alternate routes for determining which one of said alternate routes is to be used to extend said call, code marking means in said overflow trunk operated by said route determining means to provide code markings corresponding to the determined one of said alternate routes, and a register sender taken into use in response to the seizure of said overflow trunk and controlled by said code markings for transmitting routing digits corresponding to said code markings of said determined alternate route to route said call over one of said trunk lines, the corresponding other exchange, and one of said further connecting means to said second exchange.

28. In a telephone network, a first exchange in which outgoing selectors have access both to a first group of trunk lines extending to a second exchange and to a second group of trunk lines extending to a third exchange, other trunk lines extending between said second and third exchanges, a first transmitting means in said first exchange normally effective for operating said outgoing selectors to extend a first connection from said first exchange to said second exchange over said first group of trunk lines and normally effective for operating said outgoing selectors to extend a second connection from said first exchange to said third exchange over said second group of trunk lines, a first overflow trunk individual to said first trunk line group seized by one of said outgoing selectors in an attempt to extend said first connection in case all said trunk lines in said first group are busy, a second overflow trunk individual to said second trunk line group seized by one of said outgoing selectors in an attempt to extend said second connection in case all said trunk lines in said second group are busy, a first marking means in said first overflow trunk for code marking routing digits corresponding to said second trunk group and said other trunk lines dependent upon the all trunk busy condition of said first trunk group at the time of seizure of said first overflow trunk, similar marking means in said second overflow trunk for code marking routing digits corresponding to said first trunk group and said other trunk lines dependent upon the all trunk busy condition of said second trunk group at the time of seizure of said second overflow trunk, a register sender common to said overflow trunks, means responsive to the seizure of either one of said overflow trunks for operatively connecting the seized overflow trunk to said register sender, sending means in said register sender controlled by said first marking means for transmitting routing digits corresponding to said marked routing digits in said first overflow trunk to operate one of said selectors to extend said first connection over an idle one of said trunks in said second trunk group to said third exchange and over one of said other trunk lines to said second exchange, said sending means also controlled by said similar marking means for transmitting routing digits corresponding to said marked routing digits in said second overflow trunk to operate one of said selectors to extend said second connection over an idle one of said trunks in said first trunk group to said second exchange and over one of said other trunks to said third exchange.

29. In a telephone network as claimed in claim 28 wherein said first marking means in said first overflow trunk is effective in case one of said trunk lines in said first trunk group becomes idle before said register sender is operatively connected to said first overflow trunk for code marking routing digits corresponding to said first trunk group, and wherein said sending means thereafter is controlled by said last mentioned code markings to transmit routing digits corresponding to said first trunk group to operate one of said selectors to extend said first connection over said idle trunk in said first trunk group to said second exchange.

30. In a telephone system including an overflow trunk which is seized in response to a call directed to a first group of outgoing trunks at a time when all trunks of said first trunk group are busy, a plurality of other outgoing trunk groups, a plurality of interconnecting trunk groups, a first plurality of marking positions in said overflow trunk, a second plurality of marking positions in said overflow trunk, all trunk busy means individual to each said outgoing trunk group in said overflow trunk operated in case all of the trunks of its respective outgoing trunk group are busy, routing means in said overflow trunk controlled by the operated condition of said all trunk busy means dependent upon the first one of said outgoing trunk groups which has an idle trunk therein for determining the outgoing trunk group and the interconnecting trunk group to be used to extend said call, and code marking means in said overflow trunk controlled by said routing means for code marking a plurality of routing rigits in said first positions to route said call over one of said idle outgoing trunks in the trunk group determined by said routing means and for further code marking a plurality of routing digits in said second positions to further route said call over one of said interconnecting trunk groups determined by said routing means.

31. A telephone system as claimed in claim 30 wherein said code marking means code marks all or only a part of said positions with routing digits dependent upon the determined outgoing trunk group selected by said routing means, a register sender, means in said overflow trunk responsive to its seizure for operatively connecting said register sender to said overflow trunk, transmitting means in said register sender controlled by said code marking means to successively transmit said routing digits marked in successive ones of said positions to extend said call, and skip marking means in said code marking means for skip marking the unmarked ones of said positions to thereby skip such unmarked positions during transmission of said routing digits by said register sender.

32. In an overflow trunk for use in a telephone system which is seized in response to a call directed to a first group of outgoing trunks at a time when all trunks of said first trunk group are busy, a code switch in said overflow trunk having a plurality of successive marking positions, means in said overflow trunk for simultaneously marking some of said positions each with a code designating a routing digit and the remaining ones of said positions each with a code designating a skip condition in response to the seizure of said overflow trunk, and means in said overflow trunk for operating said switch to successive positions to successively read said coded routing digit designations on said positions having marked coded routing digits and for automatically skipping over said positions having marked coded skip conditions to control the extension of said call.

33. In a telephone system, a first exchange, a second exchange, a direct route from said first exchange to said second exchange including direct trunks interconnecting said exchanges, an overflow trunk individual to said direct route, a plurality of alternate trunk routes for completing calls between said first and second exchanges, an all trunk busy means in said overflow trunk individual to each of said routes, means for operating each individual all trunk busy means in case all the trunks in each respective route are busy, means for seizing said overflow trunk in response to a call originated by a calling party and directed from said first exchange to said second exchange over said direct route in case all of said direct trunks are busy, and means in said overflow trunk controlled by said individual all trunk busy means for transmitting a busy flash signal back to said calling party in case all of said direct trunks and all trunks of all said alternate routes are busy.

34. In an automatic telephone system, a first and second exchange, a group of trunks interconnecting said exchanges, outgoing selectors in said first exchange having access to said trunk group, a first transmitting means normally effective for operating one of said selectors to seize an idle one of said trunks and for transmitting digits thereover to complete a connection to a called party in said second exchange, an overflow trunk seized by said one selector in response to an attempt to extend said connection in case all of said trunks are busy, a register sender having means for registering some of said digits transmitted by said first transmitting means, means in said overflow trunk responsive to its seizure for sending a stop-in-dial signal back over said one selector to said first transmitting means to stop the transmission of said digits, means in said overflow trunk responsive to its seizure for seizing said register sender if idle, and means in said overflow trunk responsive to the seizure of said register sender by said overflow trunk for disabling said stop-in-dial signal to permit said first transmitting means to transmit said digits.

35. In an automatic telephone system, a first exchange, a second exchange, a third exchange, a first group of trunks directly interconnecting said first and second exchanges, a second group of trunks directly interconnecting said first and third exchanges, other trunks interconnecting said third and second exchanges, outgoing selectors in said first exchange having access to said first and second trunk groups, a first transmitting means normally effective for operating one of said selectors to seize an idle one of said trunks in said first trunk group and for transmitting digits thereover to complete a connection to a called party in said second exchange, an overflow trunk seized by said one selector in response to an attempt to extend said connection in case all of said trunks in said first trunk group are busy, code marking means in said overflow trunk operated in response to its seizure for code marking routing digits designating said second trunk group and said other trunks in case an idle trunk in said second trunk group is available, a register sender, means in said overflow trunk responsive to its seizure for operatively connecting said register sender to said overflow trunk, register means in said register sender for registering said digits transmitted by said first transmitting means, and sending means in said register sender controlled by said code marking means to first transmit the routing digits designating said second trunk group to operate another of said selectors to route the connection over said second trunk group to said third exchange, for then transmitting the routing digits designating said other trunks to further route said connection over one of said other trunks to said second exchange, and finally to transmit the digits registered in said register means to complete said connection to said called party in the second exchange.

36. In an automatic telephone system, a first exchange, a second exchange, a first group of trunks directly interconnecting said first and second exchanges, outgoing selectors in said first exchange having access to said first trunk group, a first transmitting means normally effective for operating one of said selectors to seize an idle one of said trunks in said first trunk group and for transmitting digits thereover to complete a connection to a called party in said second exchange, an overflow trunk individual to said first trunk group seized by said one selector in response to an attempt to extend said connection in case all of said trunks in said first trunk group are busy, a digit switch in said overflow trunk for registering the first of said digits transmitted by said first transmitting means, a register sender having means for registering the remaining ones of said digits, means in said overflow trunk responsive to its seizure for seizing said register sender when idle, and means in said overflow trunk for transmitting a busy flash signal back over said one outgoing selector in case said digit switch has completed the registration of said first further digit before said register sender is seized.

37. In an automatic telephone system, a first and a second exchange, a group of trunks interconnecting said exchanges, outgoing selectors having access to said trunk group, a first transmitting means normally effective for operating one of said selectors to seize an idle one of said trunks and for transmitting digits thereover to complete a connection to a called party in said second exchange, an overflow trunk seized by said one selector in response to an attempt to extend said connection in the event all of said trunks are busy, a register sender having sending means for retransmitting said digits transmitted by said first transmitting means, means in said overflow trunk responsive to its seizure by said one selector for seizing said register sender, a digit switch in said overflow trunk operated by the first digit transmitted by said first transmitting means after seizure of said overflow trunk to register said first digit, a registering means in said register sender operated by the remaining digits transmitted by said first transmitting means to register said remaining digits, code marking routing means in said overflow trunk operated in response to the seizure of said overflow trunk for marking coded designations designating routing digits to be transmitted by said sending means, means in said register sender controlled by said coded designation markings designating routing digits for first operating said sending means to successively transmit said designated routing digits to partially extend said connection, and means in said register sender controlled by said digit switch and said registering means for subsequently transmitting said registered digits to complete said connection to said called party.

38. In an automatic telephone system, a first and second exchange, a group of trunks interconnecting said exchanges, outgoing selectors having access to said trunk group, a first transmitting means normally effective for operating one of said selectors to seize an idle one of said trunks and for transmitting digits thereover to complete a connection to a called party in said second exchange, an overflow trunk seized by said one selector in response to an attempt to extend said connection at a time when all of said trunks are busy, a register sender having sending means for retransmitting said digits transmitted by said first transmitting means, means in said overflow trunk responsive to its seizure by said one selector for seizing said register sender, a code switch in said overflow trunk having a plurality of positions for controlling the operation of said sending means to transmit a plurality of routing digits, a first code marking means in said overflow trunk operated in response to the seizure of said overflow trunk for marking the first of said positions in case some of said routing digits and said retransmitted digits are to be transmitted as multi-frequency digits by said sending means, code marking routing means in said overflow trunk operated in response to the seizure of said overflow trunk for marking some of said positions with coded designations designating the routing digits to be transmitted by said sending means, means in said register sender controlled by said markings on said positions designating routing digits for operating said sending means to successively transmit said designated routing digits before the transmission of said retransmitted digits, and auxiliary means in said register sender controlled by said marking on said first position for operating said sending means to transmit a portion of said routing digits as decimal digits to operate another one of said selectors and the remainder of said routing digits and said retransmitted digits as multi-frequency digits to extend said connection to the called party in said second exchange.

39. In a telephone system as claimed in claim 38 wherein in the absence of any marking on said first position of said code switch said auxiliary means is ineffective to control the transmission of multi-frequency digits and wherein said sending means is thereby operated to transmit all routing digits and all retransmitted digits as decimal digits.

40. In a telephone system as claimed in claim 38 including registering means for registering all of said digits transmitted by said first transmitting means, and delay means in said register sender for delaying the transmission of said multi-frequency digits after transmitting said decimal digits until all, or all but the last one, of said digits transmitted by said first transmitting means is registered in said registering means.

41. In an automatic telephone system, a first transmitting means for transmitting a plurality of call directing digits, means including a register sender having registering means, means for seizing said register sender, means for operating said registering means to register all the digits transmitted by said first transmitting means, decimal digit sending means and multi-frequency digit sending means in said register sender, means in said register sender controlled by said seizing means for determining whether said decimal digit sending means or said multi-frequency sending means will be effective to retransmit said registered digits, transmission delay means in said register sender; said delay means being effective, in the event said decimal sending means is to be operated to transmit decimal digits in accordance with said registered digits, to delay decimal transmission until after a predetermined portion of said digits have been registered and to thereafter delay further decimal transmission of each succeeding digit until each said succeeding digit is registered; and said delay means being effective, in the event said multi-frequency sending means is to be operated to transmit multi-frequency digits in accordance with said registered digits, to delay multi-frequency transmission until after all, or all but one, of said digits have been registered.

42. In a telephone system as claimed in claim 41 wherein after it is determined that multi-frequency digits are to be transmitted said delay means is normally effective, only after a predetermined number of digits have been registered, to initiate multi-frequency transmission.

43. In a telephone system as claimed in claim 41 wherein after it is determined that multi-frequency digits are to be transmitted said delay means is normally effective to initiate multi-frequency transmission only after a predetermined number of digits have been registered, and means for controlling said delay means to be effective after less than said predetermined number of digits have been registered in the event said last mentioned registered digits comprise a special code.

44. In a telephone system as claimed in claim 41 wherein after it is determined that multi-frequency digits are to be transmitted said delay means is normally effective, only after a predetermined number of digits have been registered, to initiate multi-frequency transmission, and means for controlling said delay means to be effective after less than said predetermined number of digits have been registered in the event the first of said last mentioned registered digits corresponds to a particular digit.

45. In a telephone system as claimed in claim 41 wherein after it is determined that multi-frequency digits are to be transmitted said delay means is normally effective, only after a predetermined number of digits have been registered, to initiate multi-frequency transmission, and means for controlling said delay means to be effective only after more than said predetermined number of digits have been registered in the event the second of said registered digits corresponds to a particular digit.

46. In a telephone system as claimed in claim 41 wherein after it is determined that multi-frequency digits are to be transmitted said delay means is normally effective, only after a predetermined number of digits have been registered, to initiate multi-frequency transmission, connecting means operated by said transmitted multi-frequency digits to extend a call, means in said register sender for transmitting a conditioning multi-frequency signal prior to the transmission of said multi-frequency digits to condition said connecting means to respond to said multi-frequency digits, and further means in said register sender for transmitting a stop multi-frequency signal after the transmission of all said multi-frequency digits to indicate completion of multi-frequency transmission.

47. In a telephone system as claimed in claim 41 wherein after it is determined that multi-frequency digits are to be transmitted said delay means is normally effective, only after a predetermined number of digits have been registered, to initiate multi-frequency transmission, wherein said delay means includes a digit switch operated in response to digit transmission by said first transmitting means, a control switch which is operated to successively engage successive ones of said registering means to successively retransmit said registered digits, and a differential relay jointly controlled by said digit switch and said control switch.

48. In an automatic telephone system, a plurality of routing trunk circuits, register senders common to said rounting trunk circuits, means for seizing an idle one of said routing trunk circuits in response to a call, means responsive to the seizure of said one routing trunk circuit for seizing an idle one of said common register senders, a plurality of routing relays in each routing trunk circuit for code marking a plurality of different trunking routes, each routing relay corresponding to a different trunking route, means for selectively operating one of said routing relays in said seized trunk circuit in response to the seizure of said routing trunk circuit, code marking means in said seized routing trunk circuit operated by the selectively operated routing relay to code mark the route corresponding to the selectively operated routing relay, automatic switches, and transmitting means in said seized register sender controlled by said coded markings of the operated code marking means for transmitting switch controlling pulses to operate said switches to route the call over the route corresponding to the operated routing relay and said code means.

49. In an automatic telephone system, a routing trunk circuit, a register sender, means for seizing said trunk circuit in response to a call, means in said trunk circuit for seizing said register sender in response to the seizure of said trunk circuit, a plurality of routing relays in said trunk circuit, each routing relay corresponding to a different trunking route, means for selectively operating one of said routing relays in response to the seizure of said trunk circuit, a code switch in said trunk circuit having a plurality of successive marking positions, means including contacts on said relays for marking said positions with coded markings designating routing digits of said different routes, the contacts of said selectively operated routing relay marking the successive positions of said code switch with the coded digit markings of the corresponding trunking route, automatic switches, means in said routing trunk circuit and in said register sender for operating said code switch to successive positions to read said successive coded digit markings, and transmitting means in said register sender controlled by said successive readings of said coded digit markings for transmitting switch controlling pulses to operate said switches with the routing digits corresponding to said coded digit markings and the operated routing relay.

50. In a telephone system, a routing trunk circuit, a plurality of automatic selector switches having access to said routing trunk circuit, means for seizing said routing trunk circuit from any one of said automatic selector switches in response to a call, a register sender having sending means for retransmitting digits, means in said routing trunk circuit responsive to said seizure for seizing said register sender, a first transmitting means for transmitting digits to said routing circuit and to said register sender by way of said automatic selector switches, a digit switch in said routing trunk circuit operated by the first digit transmitted by said first transmitting means after seizure of said routing trunk circuit to register said first digit, registering means in said register sender operated by the remaining digits transmitted by said first transmitting means to register said remaining digits, code marking routing means in said routing trunk circuit selectively operated in response to the seizure of said routing trunk circuit for marking coded designations designating routing digits to be transmitted by said sending means, means in said register sender controlled by said coded designation markings designating routing digits for first operating said sending means to successively transmit said designated routing digits to partially extend said call, and means in said register sender controlled by said digit switch and said registering means for subsequently transmitting said registered digits to complete said call.

51. In an automatic telephone system, a plurality of different routes including automatic switches for extending a call to a desired destination, means including a routing trunk circuit for selecting any one of said routes to complete said call, a register sender, means in said register sender controlled by said routing trunk circuit when taken into use on said call for transmitting only decimal digits to control some of said automatic switches to route said call over one of said routes to one of said destinations in case said one route is selected by said routing trunk circuit, and means in said register sender controlled by said routing trunk circuit when taken into use on said call for transmitting decimal digits followed by multi-frequency digits to control other of said switches to route said call over another of said routes in case said other route is selected by said routing trunk circuit.

52. In a telephone system, as claimed in claim 51 wherein said routing trunk circuit controls said register sender to transmit variable numbers of digits dependent upon the route selected by said routing trunk circuit.

53. In a telephone system, including a routing trunk circuit which is seized in response to a call, a first plurality of marking positions in said routing trunk circuit, a second plurality of marking positions in said routing trunk circuit, a plurality of outgoing trunk groups, a plurality of interconnecting trunk groups, routing means in said routing trunk circuit for selecting the outgoing trunk groups and the interconnecting trunk groups to be used to extend said call in response to the seizure of said routing trunk circuit, and code marking means in said routing trunk circuit selectively controlled by said routing means for code marking a plurality of routing digits in said first positions to route said call over said outgoing trunk groups and for further code marking a plurality of routing digits in said second positions to further route said call over said interconnecting trunk groups.

54. In a telephone system, as claimed in claim 53 wherein said code marking means code marks all or only a part of said positions dependent upon the trunk groups selected by said routing means, a register sender, means in said routing trunk circuit responsive to its seizure for operatively connecting said register sender to said routing trunk circuit, transmitting means in said register sender controlled by said code marking means to successively transmit said routing digits marked in successive ones of said positions to extend said call, and skip marking means in said code marking means controlled by said routing means for skip marking the unmarked ones of said positions to thereby skip such unmarked positions during transmission of said routing digits by said register sender.

55. In a telephone system, a called line, a register sender having an outgoing pulsing path and an incoming path, impulse transmitting means in said sender for transmitting decimal digits each comprising one or a train of direct current impulses and for transmitting multi-frequency digits each comprising a single pulse of a plurality of different frequency currents, means for seizing said sender over said incoming path in response to an incoming call, means in said sender for controlling said transmitting means to transmit a number of decimal digits followed by the transmission of a plurality of multi-frequency digits over said outgoing path, and switching apparatus operated over said outgoing path in response to said transmitted decimal and multi-frequency digits to extend said call to said called line.

56. In a telephone system as claimed in claim 55 including means in said sender for interpolating a multi-frequency conditioning signal between said decimal digit transmission and said multi-frequency digit transmission to enable certain of said switching apparatus to be controlled by said multi-frequency digit transmission.

57. In a telephone system as claimed in claim 56 including means in said sender for transmitting a multi-frequency terminating signal after said multi-frequency transmission to indicate completion of said digit transmission.

58. In a telephone system, a called line, a register sender having an outgoing pulsing path and an incoming path, impulse transmitting means in said sender for transmitting decimal digits each comprising one or a plurality of direct current impulses and for transmitting multi-frequency digits each comprising a single pulse of a plurality of different frequency currents, means for seizing said sender over said incoming path in response to the receipt of an incoming call, means in said sender controlled over said incoming path for controlling said transmitting means to transmit digits over said outgoing path for controlling the extension of said call to said called lines, and means in said sender controlled over said incoming path for determining that only a portion of said digits transmitted over said outgoing path are to be decimal digits and the other portion of said transmitted digits are to be multi-frequency digits.

59. In a telephone system, a called line, a register sender having an outgoing pulsing path and seizable over an incoming path, transmitting means in said sender for transmitting both decimal digits and multi-frequency digits over said outgoing path, means for seizing said sender over said incoming path in response to an incoming call for said line, means for operating said transmitting means to transmit both decimal and multi-frequency digits over outgoing path, and switching apparatus operated over said outgoing path by said transmitted decimal and multi-frequency digits to extend said call to said called line.

60. In a telephone system, a called line, a register sender having an outgoing path and an incoming path, means for seizing said sender over said incoming path in response to the receipt of a call for said line, receiving means in said sender for receiving digits identifying said called line over said incoming path and for storing said digits in code form, impulse transmitting means in said sender for transmitting decimal digits and for transmitting multi-frequency digits over said outgoing path, a first trunking path and a second trunking path available for routing said call to said called line, and means for operating said transmitting means to retransmit said stored digits as decimal digits in case said first trunking path is available, or for retransmitting said stored digits as multi-frequency digits in case only said second trunking path is available to extend said call to said called line.

61. In a telephone system, a called line, a register sender having an outgoing pulsing path and an incoming path, decimal transmitting means in said sender for transmitting decimal digits each comprising one or a train of direct current impulses, multi-frequency transmitting means in said sender for transmitting multi-frequency digits each comprising a single pulse of a plurality of different frequency currents, means for seizing said sender over said incoming path in response to the receipt of a call for said called line, control means in said sender controlled over said incoming path for operating said decimal transmitting means to transmit a predetermined number of decimal pulses over said outgoing path and for operating said multi-frequency transmitting means to transmit multi-frequency digits over said outgoing path after transmission of said predetermined number of decimal digits, first switching apparatus operated by said transmitted decimal digits to partially extend said call towards said called line, and second switching apparatus operated in response to said transmitted multi-frequency digits to complete the extension to said called line.

62. In a telephone system as claimed in claim 61 wherein said control means includes a control switch common to both said transmitting means, a digit transmission control level of bank contacts in said control switch, a wiper of said control switch having access to said bank contacts, stepping means for operating said wiper to successively engage said bank contacts during transmission of said digits, and relay means controlled over said wiper and certain of said bank contacts to cause the transfer of said digit transmission from said decimal transmitting means to said multi-frequency transmitting means.

63. In a telephone system, a called line, a register sender having an outgoing pulsing path and an incoming path, means for seizing said sender over said incoming path in response to the receipt of a call for said line; receiving means in said sender for receiving routing digit designations over said incoming path, for receiving digits identifying said called line over said incoming path, and for storing said called line digits in code form; impulse transmitting means in said sender for transmitting decimal digits and multi-frequency digits over said outgoing path, a plurality of different trunking routes available for routing said call to said called line, control means in said sender controlled by said receiving means for operating said transmitting means to transmit routing digits corresponding to said received routing digit designations and to transmit digits corresponding to said stored called line digits over said outgoing path; said control means including means for transmitting said routing digits and said stored digits solely as decimal digits in case a particular one of said trunking routes is available, for transmitting said routing digits as decimal digits followed by the transmission of said stored digits as multi-frequency digits in case another of said trunking routes is used to extend said call to said called line, and for transmitting a first portion of said routing digits as decimal digits, and the remaining portion of said routing digits and said stored digits as multi-frequency digits in case a different one of said trunking routes is used to extend said call to said called line; and switching apparatus operated over said outgoing path in response to said transmitted digits for extending said call to said called line.

64. In a telephone system as claimed in claim 63 wherein said control means includes a step by step control switch operable during said digit transmission for determining the time said impulse transmitting means is converted from decimal digit transmission to multi-frequency transmission.

65. In a telephone system as claimed in claim 64 wherein said control switch also includes means for successively reading said routing digit designations and said stored digits to control said transmitting means to transmit corresponding digits.

References Cited in the file of this patent

UNITED STATES PATENTS

| | | |
|---|---|---|
| 2,301,822 | Shepherd | Nov. 10, 1942 |
| 2,597,209 | Walsh | May 20, 1952 |
| 2,629,018 | Wicks | Feb. 17, 1953 |
| 2,631,195 | Ostline | Mar. 10, 1953 |